US010592564B2

(12) United States Patent
Razon et al.

(10) Patent No.: US 10,592,564 B2
(45) Date of Patent: Mar. 17, 2020

(54) REAL-TIME OUTAGE ANALYTICS AND RELIABILITY BENCHMARKING SYSTEM

(71) Applicant: Aerinet Solutions, L.L.C., Tamuning, GU (US)

(72) Inventors: Alvin M. Razon, Ashburn, VA (US); Eduardo Ilao, Tamuning, GU (US); John Ilao, Tamuning, GU (US)

(73) Assignee: AERINET SOLUTIONS, L.L.C., Tamuning, GU (US)

(*) Notice: Subject to any disclaimer, the term of this patent is extended or adjusted under 35 U.S.C. 154(b) by 347 days.

(21) Appl. No.: 15/400,633

(22) Filed: Jan. 6, 2017

(65) Prior Publication Data

US 2017/0212157 A1    Jul. 27, 2017

Related U.S. Application Data

(60) Provisional application No. 62/281,852, filed on Jan. 22, 2016.

(51) Int. Cl.
*G06F 16/951* (2019.01)
*G06Q 50/06* (2012.01)

(52) U.S. Cl.
CPC .......... *G06F 16/951* (2019.01); *G06Q 50/06* (2013.01); *Y04S 20/36* (2013.01)

(58) Field of Classification Search
CPC ...... G06Q 50/06; G06F 16/951; G01R 21/133
USPC .................................................. 702/60, 62
See application file for complete search history.

(56) References Cited

U.S. PATENT DOCUMENTS

| | | | | |
|---|---|---|---|---|
| 7,272,516 | B2* | 9/2007 | Wang | H02J 3/00 702/60 |
| 9,557,720 | B1* | 1/2017 | Woods | G01R 19/02 |
| 2009/0281673 | A1* | 11/2009 | Taft | G01D 4/002 700/286 |
| 2013/0274933 | A1* | 10/2013 | Kelly | G05F 3/04 700/286 |
| 2016/0259357 | A1* | 9/2016 | Wepman | G06F 16/29 |
| 2016/0343093 | A1* | 11/2016 | Riland | G06Q 10/04 |
| 2017/0006135 | A1* | 1/2017 | Siebel | H04L 67/02 |
| 2017/0032436 | A1* | 2/2017 | DiSalvo | G06Q 30/0613 |
| 2017/0185698 | A1* | 6/2017 | Marean | G06Q 50/06 |
| 2018/0107941 | A1* | 4/2018 | Siebel | H04B 17/391 |
| 2019/0207388 | A1* | 7/2019 | Li | G06Q 10/06 |

* cited by examiner

*Primary Examiner* — Eman A Alkafawi
(74) *Attorney, Agent, or Firm* — Thompson Hine LLP

(57) ABSTRACT

System and method for providing electric utilities and utility benchmarking organizations with an integrated real-time outage analytics and benchmarking solution. The system includes a powerful data importing apparatus that allows uploading of outage data from the utilities outage databases, confidential aggregation of utility outage data, real-time comparison of reliability metrics, real-time outage analytics and messaging capabilities. The system includes a communication link for receiving raw outage data uploaded from the outage management systems of participating utilities which couples the data to an analytics server which automatically recalculates standard reliability indices and analytics in real-time. A database server aggregates and stores the data and indices. The analytics server makes data and reports available to user utilities in real-time via the internet while using a unique ID for each user utility to maintain user anonymity and data confidentiality.

16 Claims, 76 Drawing Sheets

FIG 1

IRDB Tool – Higher
Level Process Overview

| Steps | Brief Description |
|---|---|
| 1. Importing | Import Utility Outage Data |
| 2. Trending | Visualize Past and Present Yearly Reliability Performance |
| 3. Economic Analysis | Outage cost (past) and Potential Savings by improving Reliability (future) |
| 4. Reports | Failure patterns & focus improvement |
| 5. Benchmarking | Where am I compared to others? |
| 6. Predictive Analysis | Forecast & reality check |
| 7. Goal Settings | set my target metrics |
| 8. Utility Connection | Connect with Benchmarked Utilities that are doing well |
| 9. Application of Best Practices In-House | Implement lessons learned from other utilities |

| ID | Outage DateTime Off | Outage Date On | Outage Cause | IEEE Cause Code | Customers | Duration Minutes | Total Outage | Feeder | Sul |
|---|---|---|---|---|---|---|---|---|---|
| 17417071 | 12/31/2013 8:10 PM | | 999 Cause unknown | I - Unknown | 1 | 54 | 54 | F0801D | PEN |
| 17417070 | 12/31/2013 3:49 PM | | 300 Material or equipment fault/failure | A - Equipment | 192 | 198 | 38016 | F2204D | PEN |
| 17417069 | 12/30/2013 3:34 PM | | 502 Animal/squirrel | J - Other | 2 | 34 | 68 | F1902D | HAI |
| 17417068 | 12/30/2013 8:32 AM | | 999 Cause unknown | I - Unknown | 1 | 140 | 140 | F1001D | ALA |
| 17417057 | 12/29/2013 7:51 AM | | 800 Other | J - Other | 1 | 205 | 205 | F0801D | PEN |

FIG. 4

FIG 6 (Continuation from Previous page)

| Outage.DateTime Off | Outage.Cause | Customers | Duration Minutes | Total Outage | Feeder | Substation | Region | Equipment |
|---|---|---|---|---|---|---|---|---|
| 1/1/2008 12:53 PM | 430 Tree failure from overhang or dead tree without ice/snow | 69 | 147 | 10143 | F0904D | FLORIDA | Region3 | 999 No Equipment |
| 1/1/2008 1:25 PM | 400 Decay/age of material/equipment | 1 | 183 | 183 | F0102D | LOUISIANA | Region4 | 500 Transformer b |
| 1/1/2008 5:00 PM | 430 Tree failure from overhang or dead tree without ice/snow | 1 | 61 | 61 | F0601D | RHODE ISLAND | Region4 | 999 No Equipment |
| 1/1/2008 7:54 PM | 300 Material or equipment fault/failure | 1 | 71 | 71 | F0201D | DELAWARE | Region3 | 360 Fuse cutout (c |
| 1/2/2008 7:23 AM | 340 Overload | 2 | 109 | 218 | F1501D | MARYLAND | Region4 | 500 Transformer b |
| 1/2/2008 6:28 PM | 340 Overload | 3 | 60 | 180 | F0801D | PENNSYLVANIA | Region1 | 999 No Equipment |
| 1/2/2008 6:36 PM | 340 Overload | 5 | 156 | 780 | F1003D | ALASKA | Region1 | 500 Transformer b |
| 1/2/2008 6:53 PM | 340 Overload | 3 | 49 | 147 | F0204D | DELAWARE | Region3 | 999 No Equipment |
| 1/2/2008 7:02 PM | 340 Overload | 1 | 80 | 80 | F0902D | GEORGIA | Region3 | 999 No Equipment |
| 1/2/2008 8:54 PM | 340 Overload | 4 | 153 | 612 | F1403D | SOUTH CAROLINA | Region4 | 999 No Equipment |
| 1/3/2008 8:24 AM | 400 Decay/age of material/equipment | 522 | 145 | 75690 | F1802D | GEORGIA | Region3 | 400 Primary Cable |
| 1/3/2008 8:33 AM | 300 Material or equipment fault/failure | 2 | 63 | 126 | F1003D | ALASKA | Region1 | 360 Fuse cutout (c |
| 1/4/2008 3:52 PM | 999 Cause unknown | 1 | 51 | 51 | F1203D | CALIFORNIA | Region2 | 999 No Equipment |
| 1/4/2008 8:41 PM | 340 Overload | 3 | 82 | 246 | F1603D | COLORADO | Region2 | 999 No Equipment |

FIG. 7

| Outage Date Time Off | Outage Cause | Customers | Duration Minutes | Total Outage | Feeder | Sub-station | Region | Equipment | Equipment Code | Weather | Weather Code | Voltage | Voltage Code |
|---|---|---|---|---|---|---|---|---|---|---|---|---|---|
| 1/1/2008 12:33 PM | 430 Tree failure from overhang or dead tree without ice/snow | 89 | 147 | 10143 | F0304D | FLORIDA | Region3 | 999 No Equipment failure | | | | | |
| 1/1/2008 1:25 PM | 400 Decay/age of materials/equipment | 1 | 183 | 183 | F0102D | LOUISIANA | Region4 | 500 Transformer bad | | | | | |
| 1/1/2008 5:30 PM | 430 Tree failure from overhang or dead tree without ice/snow | 1 | 61 | 61 | F0301D | RHODE ISLAND | Region4 | 999 No Equipment failure | | | | | |
| 1/1/2008 7:54 PM | 300 Material or equipment fault/failure | 1 | 71 | 71 | F2201D | DELAWARE | Region3 | 330 Fuse cutout (damaged, malfunction, maintenance) | | | | | |

FIG. 18 pwrMetrix.com
Innovative Data Analytics and Benchmarking Solutions

Outage Records ▸ | Upload Data ▸ | Dashboard | Benchmarking ▸ | Economic Analysis ▸ | Predictive Analysis ▸ | Goal Settings ▸ | Reports ▸ | Setup ▸ | Logout Client Name: Client Alvin 5

Recalculate Indices | Note: Click this button if the charts are either blanks or not showing up correctly on the webpage.

Reliability Charts | Comparative Outage Trends | Rel. Comp. Part 6 | Outage Causes

Year Values

| Year | ItemName | PowerSupply | MED | Planned | AllOther | Total |
|---|---|---|---|---|---|---|
| 2013 | Year 2013 | 0 | 1004.18 | 0 | 126.51 | 1130.68 |
| 2012 | Year 2012 | 0 | 298.16 | 0 | 104.18 | 402.33 |
| 2011 | Year 2011 | 0 | 40.04 | 0 | 72.46 | 112.49 |
| 2010 | Year 2010 | 0 | 229.63 | 0 | 12.4 | 242.03 |
| 2009 | Year 2009 | 0 | 997.1 | 0 | 101.05 | 1098.15 |
| 2008 | Year 2008 | 0 | 303.41 | 0 | 83.55 | 306.96 |
| 2007 | Year 2007 | 0 | 0 | 0 | 104 | 104 |

Please analyze at least 3 years of data to see the average values below.

| Year | ItemName | PowerSupply | MED | Planned | AllOther | Total |
|---|---|---|---|---|---|---|
| 2013 | Average as of 2013 | 0 | 311.39 | 0 | 79.61 | 391 |
| 2012 | Average as of 2012 | 0 | 314.03 | 0 | 74.69 | 306.73 |
| 2011 | Average as of 2011 | 0 | 382.53 | 0 | 75.25 | 457.79 |

From:
Subject:

Browse Excel Mailing List
[Choose File] No file chosen
Enter column number to map excel columns First Name: 1     Email: 4
Last Name: 2     State: 5
Utility Name: 3  Unique ID: 6

PwrmetrixID: [  ] Leave it empty if there is no corresponding PwrmetrixID column, this will enable the recipient to signup to pwrmetrix. Leave it blank if there is no unique id.

Message:
You are invited by ABC Group to join reliability benchmarking group by entering your outage data through Pwmetrix web app. Please click the pwrmetrix link below and login by using your credentials. Please read the attached 'Guide for First Time Client PwrMetrix webtool DEMO.pdf' to learn how to import your outage data. Feel free to contact info@aerinet.com if you have any questions.

Attachment: [Choose File] No file chosen

Fig 26E

| Utility ID | SAIDI PowerS | SAIDI MED | SAIDI Planned | SAIDI All Other | SAIDI All | SAIFI PowerS | SAIFI MED | SAIFI Planned | SAIFI All Other | SAIFI All | CAIDI All | SAIDI IEEE | SAIFI IEEE | CAIDI IEEE |
|---|---|---|---|---|---|---|---|---|---|---|---|---|---|---|
| NR2108 | 0.00 | 0.00 | 0.00 | 8.03 | 8.03 | 0.00 | 0.00 | 0.00 | 0.09 | 0.09 | 89.22 | 8.03 | 0.09 | 89.22 |
| NR2040 | 0.00 | 32.70 | 0.00 | 112.41 | 145.11 | 0.00 | 0.50 | 0.00 | 1.80 | 2.29 | 63.37 | 112.41 | 1.80 | 62.45 |
| NR2101 | 0.00 | 10.08 | 0.00 | 47.98 | 58.06 | 0.00 | 0.19 | 0.00 | 0.70 | 0.89 | 65.24 | 47.98 | 0.70 | 68.54 |
| NR2113 | 43.15 | 116.77 | 9.58 | 138.44 | 307.94 | 0.48 | 0.34 | 0.10 | 1.32 | 2.23 | 138.09 | 181.59 | 1.80 | 104.88 |
| NR2099 | 0.00 | 26.40 | 0.00 | 60.51 | 86.91 | 0.00 | 0.39 | 0.00 | 0.83 | 1.22 | 71.24 | 60.51 | 0.83 | 72.90 |
| NR2085 | 0.00 | 76.13 | 0.00 | 104.02 | 180.15 | 0.00 | 0.74 | 0.00 | 1.10 | 1.84 | 97.91 | 104.02 | 1.10 | 94.56 |
| NR2036 | 0.00 | 0.00 | 0.00 | 42.53 | 42.53 | 0.00 | 0.00 | 0.00 | 0.50 | 0.50 | 85.06 | 42.53 | 0.50 | 85.06 |
| NR2136 | 0.00 | 21.93 | 0.00 | 137.31 | 159.24 | 0.00 | 0.10 | 0.00 | 1.41 | 1.50 | 106.16 | 137.31 | 1.41 | 97.38 |
| NR2027 | 11.18 | 0.00 | 3.99 | 199.65 | 214.81 | 0.15 | 0.00 | 0.06 | 1.35 | 1.57 | 136.82 | 210.83 | 1.50 | 147.89 |
| NR2058 | 0.00 | 0.00 | 0.00 | 146.27 | 146.27 | 0.00 | 0.00 | 0.00 | 1.42 | 1.42 | 103.01 | 146.27 | 1.42 | 103.01 |
| NR2039 | 0.00 | 131.25 | 0.00 | 95.69 | 226.94 | 0.00 | 0.54 | 0.00 | 0.92 | 1.46 | 155.44 | 95.69 | 0.92 | 104.01 |
| NR2002 | 0.00 | 79.25 | 0.00 | 173.16 | 252.41 | 0.00 | 0.23 | 0.00 | 2.16 | 2.39 | 105.61 | 173.16 | 2.16 | 80.17 |
| NR2012 | 40.79 | 283.35 | 0.00 | 160.96 | 485.10 | 0.62 | 1.08 | 0.00 | 2.39 | 4.09 | 118.61 | 201.75 | 3.01 | 67.35 |
| NR2119 | 0.00 | 53.88 | 0.00 | 58.10 | 111.98 | 0.03 | 0.19 | 0.00 | 0.95 | 1.14 | 98.23 | 58.10 | 0.95 | 61.16 |
| NR2069 | 0.00 | 0.00 | 0.00 | 215.18 | 215.18 | 0.00 | 0.00 | 0.00 | 2.35 | 2.35 | 91.57 | 215.18 | 2.35 | 91.57 |
| NR2068 | 0.00 | 7.97 | 0.00 | 91.47 | 99.45 | 0.00 | 0.06 | 0.00 | 1.59 | 1.65 | 60.27 | 91.47 | 1.59 | 57.53 |
| 2013000026 | 0.00 | 64.59 | 0.00 | 145.01 | 209.60 | 0.00 | 0.38 | 0.00 | 1.72 | 2.10 | 99.81 | 145.01 | 1.72 | 84.31 |
| NR2056 | 0.00 | 9.48 | 0.00 | 18.40 | 27.88 | 0.00 | 0.11 | 0.00 | 0.27 | 0.39 | 71.49 | 18.40 | 0.27 | 68.15 |
| NR2023 | 0.00 | 400.85 | 0.00 | 95.37 | 496.23 | 0.00 | 1.13 | 0.00 | 1.21 | 2.34 | 212.06 | 95.37 | 1.21 | 78.82 |
| NR2059 | 0.00 | 114.51 | 0.00 | 129.06 | 243.57 | 0.00 | 0.53 | 0.00 | 1.63 | 2.15 | 113.29 | 129.06 | 1.63 | 79.18 |
| NR2100 | 0.00 | 294.89 | 0.00 | 134.16 | 429.05 | 0.00 | 0.62 | 0.00 | 1.13 | 1.76 | 243.78 | 134.16 | 1.13 | 118.73 |
| NR2025 | 0.00 | 34.34 | 0.00 | 155.81 | 190.14 | 0.00 | 0.12 | 0.00 | 1.77 | 1.90 | 100.07 | 155.81 | 1.77 | 86.03 |
| NR2071 | 0.00 | 5.58 | 0.00 | 75.96 | 81.54 | 0.00 | 0.07 | 0.00 | 1.12 | 1.19 | 68.52 | 75.96 | 1.12 | 67.82 |
| NR2024 | 0.00 | 149.01 | 0.78 | 116.55 | 266.33 | 0.00 | 1.09 | 0.01 | 1.06 | 2.16 | 123.30 | 116.55 | 1.06 | 109.95 |

NRECA Group Benchmarking Report for Year 2015 Excluded outage codes [Planned, MED]

Entry Year: 2013

| | Residential Rates | Commercial Rates |
|---|---|---|
| kW/Cust. | | |
| Average KW System Demand | 5.00 | 10 |
| per KWH ($X.XX) | | |
| (System Rate $ per KWH) | 0.13 | 23 |
| Line Crew T&E/hr | 500 | 500 |
| Tree Crew T&E/hr | 450 | 450 |
| Troubleman T&E/hr | 450 | 450 |
| Customer Type Ratio | 30 % | 20 % |
| (Residential/Commercial) | | |

Fill in the numeric value between 0-100 for line crew, tree crew and troubleman. This is the percent of time that the crew is involved in the restoration. For example, linecrew=100 means that line crew was there 100 percent of the time.

| Cause | Year | Line Crew | Tree Crew | Troubleman | Commercial Line Crew | Commercial Tree Crew | Commercial Troubleman |
|---|---|---|---|---|---|---|---|
| Aircraft | 2013 | 100 | 0 | 100 | 0 | 0 | 100 |
| Animal damage - gnawing or boring | 2013 | 100 | 0 | 100 | 0 | 0 | 100 |
| Animals, other | 2013 | 100 | 0 | 100 | 0 | 0 | 100 |
| Borrower crew cuts tree | 2013 | 100 | 100 | 100 | 0 | 100 | 100 |
| Cause unknown | 2013 | 100 | 0 | 100 | 0 | 0 | 100 |
| Conductor sag or clearance not adequate | 2013 | 100 | 0 | 100 | 0 | 0 | 100 |
| Construction | 2013 | 100 | 0 | 100 | 0 | 0 | 100 |
| Contamination (leakage/external) | 2013 | 100 | 0 | 100 | 0 | 0 | 100 |
| Customer-caused | 2013 | 100 | 0 | 100 | 0 | 0 | 100 |
| Flood | 2013 | 100 | 0 | 100 | 0 | 0 | 100 |
| Installation fault | 2013 | 100 | 0 | 100 | 0 | 0 | 100 |
| Large animals | 2013 | 100 | 0 | 100 | 0 | 0 | 100 |
| Lightning | 2013 | 100 | 0 | 100 | 0 | 0 | 100 |

Cost of Outages

| Cause | Number of Interruption | Customers | Hours (CAIDI) | Outage Minutes | Residential Lost Rev Cost ($) | Residential Restore Cost ($) | Commercial Lost Revenue ($) | Commercial Restore Cost ($) | Total Cost ($) | Event Co |
|---|---|---|---|---|---|---|---|---|---|---|
| Motor vehicle | 22 | 1,029 | 9.94 | 601,909 | $5,217 | $173,352 | $4,915 | $43,448 | $227,031 | $9,873 |
| Lightning | 22 | 4,311 | 1.62 | 439,200 | $3,806 | $39,464 | $3,267 | $9,966 | $56,504 | $1,786 |
| Cause unknown | 55 | 5,659 | 1.14 | 388,965 | $3,371 | $47,545 | $2,982 | $11,897 | $65,799 | $1,198 |
| Weather, other | 65 | 1,124 | 4.80 | 381,054 | $3,303 | $226,965 | $2,841 | $59,241 | $302,411 | $4,653 |
| Tree growth | 49 | 3,132 | 2.02 | 379,142 | $3,286 | $110,713 | $2,908 | $27,873 | $144,383 | $2,952 |
| Major Storm Disaster | 8 | 3,345 | 0.91 | 182,495 | $1,582 | $5,529 | $1,359 | $1,202 | $9,891 | $1,236 |
| Public, other | 30 | 2,826 | 0.99 | 167,622 | $1,453 | $22,539 | $1,285 | $5,835 | $30,912 | $1,030 |
| Animals, other | 27 | 1,891 | 1.43 | 162,050 | $1,404 | $40,193 | $1,242 | $10,041 | $52,850 | $1,428 |
| Tree failure from overhang or cold tree without topknow | 43 | 2,143 | 1.22 | 157,291 | $1,367 | $58,814 | $1,206 | $14,726 | $76,211 | $1,772 |

Lost Rev cost=estimated revenue lost based on the KW demand, per KWH and total outage duration.
Restore cost=estimated restoration cost based on CAIDI, line crew, tree crew and troubleman hourly rate

3004

Grand Total Cost
$1,301,167
(Sum of all Lost Rev Cost and Restore Cost)

REAL-TIME OUTAGE ANALYTICS AND RELIABILITY BENCHMARKING SYSTEM

CROSS REFERENCE TO RELATED APPLICATION

This application claims priority to U.S. Provisional Patent Application No. 62/281,852, filed Jan. 22, 2016 which is incorporated herein by reference.

FIELD OF INVENTION

The present invention is in the technical field of computer-implemented systems for electric utility analytics and benchmarking of distribution system reliability.

BACKGROUND

Electric utilities ("utilities") worldwide are restructuring and moving toward a competitive environment where accurate information about distribution system performance is required to ensure that capital expenditures and maintenance dollars are spent appropriately to provide safe, reliable and cost effective power to the customers. To measure distribution system reliability performance, the electric utility industry has developed several reliability performance measures. Three of the most commonly used reliability indices/metrics include measures of outage duration (SAIDI System Average Interruption Duration Index), frequency of outages (SAIFI System Average Interruption Frequency Index), and restoration time (CAIDI Customer Average Interruption Duration Index).

Electric distribution reliability benchmarking is completed annually in North America (Canada and United States) by the IEEE Distribution Reliability Working Group (DRWG), consisting of more than 100 plus utility volunteer participants, and the NRECA (National Rural Electric Cooperative Association) Reliability Benchmarking Group (RBG), comprising more than 200 plus volunteer distribution cooperatives. Utility benchmarking members ranges from small distribution systems serving a few thousand customers to several million customers. As a result of the diversity in the type of utilities involved (2000 plus distribution utilities exist in the U.S.), numerous challenges in standardization and consistency issues arise due to the differences in each utility's data collection methods, reliability metrics (SAIDI, SAIFI and CAIDI) calculation methodologies, major event day (MED) or exceptional event definitions, sustain (long) and momentary (short) outage definitions, and other fundamental parameters.

Traditionally, IEEE DRWG collects summary aggregated confidential daily outage data and calculates reliability metrics by using the IEEE 1366 (Guide for Electric Distribution Reliability Indices) methodology to statistically determine the MEDs or exceptional events. In parallel, the NRECA RBG collects higher level and detailed confidential individual outage information per event including pertinent information such as outage cause, feeder/circuit, substation, voltage level, equipment failure and more. Consequently, as more utilities join the benchmarking group and detailed outage data are collected, the labor processing time to complete the tedious data acquisition from various utilities, analysis, and final benchmarking reports results in excess of several months. In addition, the traditional OMS (Outage Management System) that utilities use to track outages only provides limited data analytics and reporting capabilities. Thus, utilities spend a substantial amount of time exporting data from their OMS, creating customized outage technical reports via Microsoft Excel, Access or other programming tools, and maintaining the data integration between the customized tool and the OMS. Such traditional procedures are slow, cumbersome, labor intensive and expensive.

Therefore, a need exists for an improved system with innovative methods for automating and standardizing the data acquisition, aggregation, analytics, data requirements, and benchmarking reports in a fast, scalable and cost-effective manner. A further needs exists for methods for integrating the utility outage analytics and benchmarking solution in real-time and in the cloud/web to solve the standardization of calculation methodology for reliability metrics, data inconsistency, deficiency in data analytics and technical reports, and time consuming benchmarking process.

SUMMARY

A computer implemented system is presented for providing electric utilities and benchmarking organizations an integrated real-time outage analytics and benchmarking web solution framework. The system may be referred to as an Integrated Real-time Data Analytics and Benchmarking ("IRDB") system. The novel system may include: an easy to use but powerful importing method that allows uploading of outage data from the most commonly used utility databases (database agnostic) and automating the connectivity or integration with existing OMS, Excel, MS Access, SQL or other outage database for fast retrieval of new outage data; innovative tool for aggregating confidential utility outage data on the web/cloud in real-time while maintaining security, confidentially and anonymity; World-Wide real-time benchmarking application for comparing reliability metrics of utilities all over the world within minutes instead of months and with the option of filtering the benchmarking results by specific utility features or profiles; structured tool for creating multiple customized focus benchmarking groups in real-time with the ability to invite other utilities to join the customized group via an internal customized messaging system, thus, allowing compilation of outage data in minutes instead of weeks or months; innovative real-time outage analytics tool that dramatically decrease the amount of time to complete benchmarking results and reports from months to minutes; holistic and flexible solution that provides instant access to world-wide utility reliability metrics data, predictive analysis, gap analysis, economic cost benefit analysis, comparative analysis, detailed graphs and reports, and goal setting tools; advance visualization tool for viewing multi-utility GIS outage data aggregated by state, country or continent level; messaging tool to connect utilities worldwide to share best practices in a matter of minutes instead of months; tool for calculating the reliability metrics uniformly as new members join the group in real-time, thus, promoting harmonization of data aggregation, and consistency in metrics calculation methodology, definition and results; suite of tool for Solar Impact Analytics and Distribution Reliability Planning and Operation Benchmarking Solution; utility solution tool for listing the top selections of software, hardware and systems (product vendors) presently used by utilities to improve their reliability and for providing a direct link for the other utilities to connect with the product vendors and purchase the system online; and a mobile phone app for allowing users to report outage locations and type in real-time.

BRIEF DESCRIPTION OF THE DRAWINGS

The novel features of the invention are set forth with particularity in the appended claims. A better understanding of the features and advantages of the present invention may be obtained by reference to the following detailed description that sets forth illustrative embodiments, in which the principles of the invention are utilized, and the accompanying drawings of which:

FIG. 1 shows an example IRDB system process overview list that the utility user may follow to maximize the use of the IRDB system and to improve the utility's reliability performance.

FIG. 2 shows an exemplary screen view of the system IRDB tool (main menu) for providing a visual representation across various components according to an exemplary embodiment.

FIG. 3 shows an exemplary screen view of two submenus consisting of New Data First Time and Auto Upload—Use Preset Template under the Upload Data main menu shown in FIG. 2.

FIG. 4 shows an exemplary screen view of the screen as a result of activating the New Data First Time submenu in FIG. 3.

FIG. 6A shows an exemplary screen view of example imported file unique field names (e.g. outage date time off, outage cause, customers, duration minutes etc.).

FIG. 7 shows an exemplary screen view showing the imported file's unique field names and outage data records according to an exemplary embodiment.

FIG. 10 shows an exemplary screen view for inputting the number of customers served per year for the list of years from the imported file according to an exemplary embodiment.

FIG. 11 shows and exemplary screen view for permitting manual entry of outage data.

FIG. 12 shows an exemplary screen view of the automatic mapping of the RUS (US Department of Agriculture Rural Utility Services) cause outage to the IEEE cause codes (used as a standardized codes when benchmarking utilities) according to an exemplary embodiment.

FIG. 18 shows an exemplary screen view of the RUS FORM7 Part G table results shown under the Dashboard main menu of FIG. 2

FIG. 19 shows an exemplary screen view of the OUTAGE CAUSES shown under the Dashboard main menu of FIG. 2.

FIG. 20 shows an exemplary screen view of the Reporting Filtering Criteria tab/United States submenu shown under the Benchmarking main menu FIG. 2.

FIG. 26C shows an exemplary screen view for inviting non-member utilities to a group.

FIG. 26D shows an exemplary screen view for batch invitations.

FIG. 26E shows an exemplary screen view of a group data summary report.

FIG. 29, FIG. 30 and FIG. 31 show exemplary screen views of the Economic Analysis main menu from FIG. 2.

FIG. 39, FIG. 40, FIG. 40A, FIG. 41 and FIG. 42 show exemplary screen views of the Setup main menu.

DETAILED DESCRIPTION

Figure 1A:
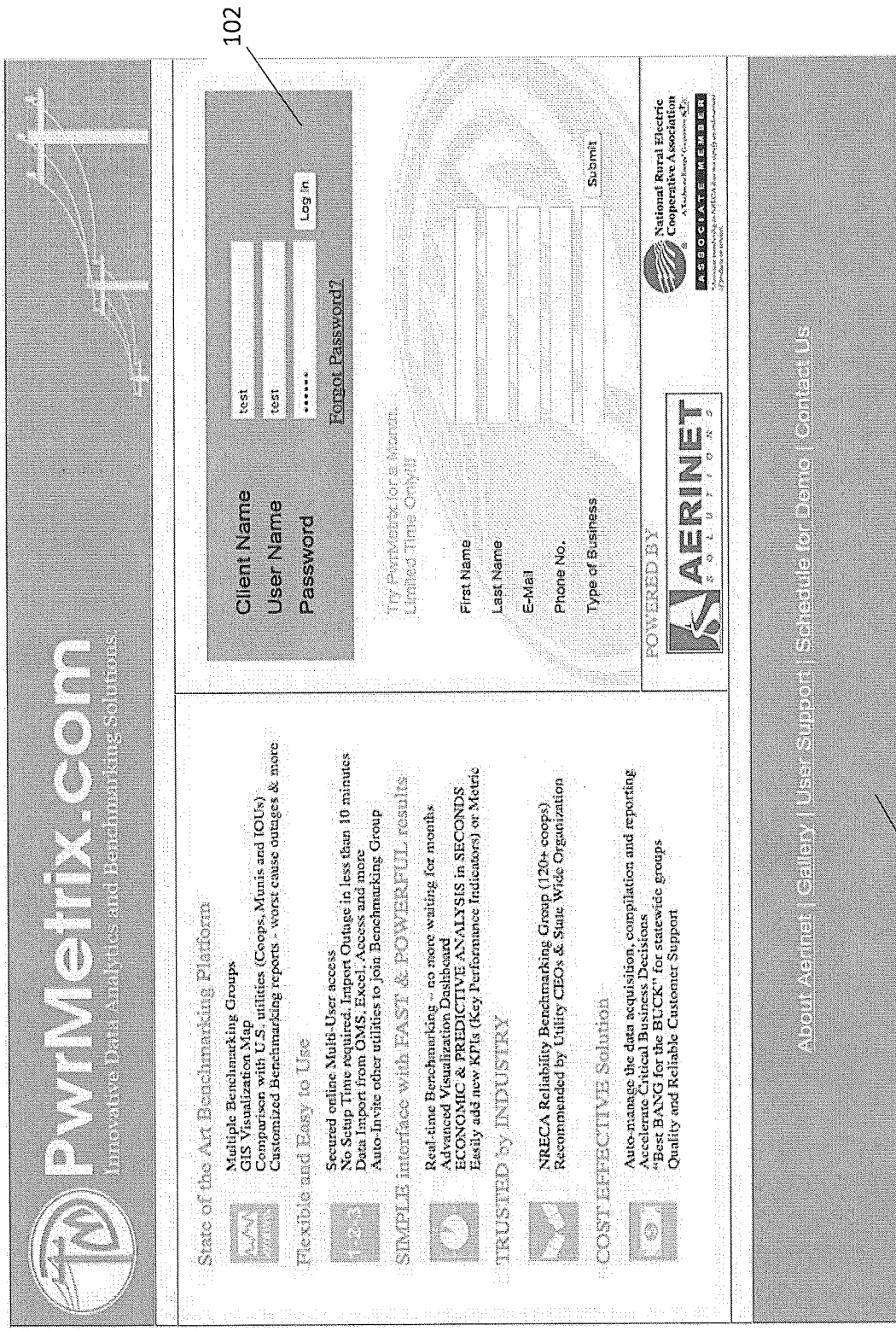
FIG. 1A shows an exemplary screen view for logging-in the IRDB tool with user credential (client name and user name) and password according to an exemplary embodiment.

While preferred embodiments of the invention have been shown and described herein, it may be obvious to those skilled in the art that such embodiments are provided by way of example only. Numerous variations, changes, and substitutions may now occur to those skilled in the art without departing from the invention. It should be understood that various alternatives to the embodiments of the invention described herein may be employed in practicing the invention.

The invention provides is a computer implemented system for providing electric utilities and benchmarking organizations an integrated real-time outage analytics and benchmarking web solution framework in accordance with aspects of the invention. Various aspects of the invention described herein may be applied to any of the particular applications set forth below or for any other types of data analytics and benchmarking system. The invention may be applied as a standalone system or method, or as part of a service, tool, utility hardware-software package, or benchmarking package for various entities/organizations. It shall be understood that different aspects of the invention can be appreciated individually, collectively, or in combination with each other.

In some embodiments, an IRDB system may be a web-based hardware and software system (e.g., such as a Java/Webstart enabled application) and may operate directly through the Internet using a web browser. In some embodiments, a web server/cloud storage database or a dedicated computer server may be used as a digital storage device for live (real-time) and continuous processing of the multiple utility (e.g. electric utility users of IRDB tool) outage databases. Alternatively, the IRDB tool may reside on any computer or other network device in network communication with the web server. The IRDB tool may be accessible by personal computers, servers, laptop, mobile devices, smartphones, tablets (e.g. Ipad and Android) via a web browser (e.g. Internet explorer, Google Chrome, Firefox and others).

The following description describes an IRDB system comprising an innovative real-time Benchmarking Web Solution as the first of two parts of the IRDB's integrated real-time Benchmarking Web Solution and Outage Analytics framework. Because of IRDB's real-time innovative solution, the entire benchmarking data acquisition, analysis and final reports can be completed potentially in hours instead of months. In the past, benchmarking utility participants must wait months (average of 5 to 6 months) before final results and reports are available, and any change in one of the participating utilities' data would require recalculation and re-processing of the entire results from scratch (which could take extra days or weeks). With IRDB's innovative process, users can access real-time results/reports as new additional users enter their outage data from anywhere around the world via any web browser without having to wait months for the results. In addition, the IRDB tool may provide the ability for benchmarking organizations (e.g. IEEE DRWG, NRECA RBG, statewide organizations, etc.) to collaborate and merge their total number of utility participants in real-time on the web. Potentially, this can result in more than 1000 plus utilities combined in a single North American benchmarking project which was unattainable in the past. Ultimately, the IRDB tool's grand vision is to create a world-wide benchmarking collaboration connecting thousands of electric utilities in North & South America, Europe, Asia, Pacific Region, and Africa in real-time, thus, harmonizing the benchmarking methodologies and standards, sharing engineering and management best practices between nations and continents, and ultimately, providing safe, reliable and cost effective power to the customers.

The IRDB real time benchmarking provides a flexible, fast and powerful holistic solution that allows real-time data acquisition of utility raw/detailed outage data and calculates "on the fly" (real-time) the reliability metrics (SAIDI, SAIFI, CAIDI and other metrics) for hundreds or thousands of utility participants based on the definition and calculation methodology define by the host benchmarking organization. By using the detailed raw outage data, the IRDB tool may solve the critical issues of inconsistent definition and reliability metrics calculation methodology experienced by traditional benchmarking groups. In essence, the IRDB tool may allow all participating utility metrics to be calculated uniformly and in real-time as new members join the group, thereby promoting harmonization of data aggregation, and consistency in metrics calculation methodology, definition and reports, which are presently unattainable with existing/traditional benchmarking computer methods. The IRDB may provide a successful assessment of disaggregated continuity indices by region, state, country, continent, voltage level, population density, cause or by any field selected from the outage database imported columns. In some embodiments, techno-economic analysis such as aggregated cost of yearly, monthly or daily outages sorted by type of outages may also be included in the IRDB tool and which presently is not found in existing/traditional OMS and benchmarking methods. Moreover, the IRDB may provide utilities the ability to select their own customized benchmarking group based on parameters such as utility size, region, country, state, continent and more while maintaining anonymity.

Utilities are not willing to provide confidential and sensitive outage data outside of their organizations. Consequently, utilities often do not participate in benchmarking groups/studies because of the fear of disclosing sensitive outage information. This has been one of the critical hindrances why utility distribution reliability benchmarking has been unsuccessful in the U.S and worldwide. IRDB's unique and innovative features/processes solve the issue of anonymity by issuing a unique utility/client ID to each individual utility (similar concept as issuing social security number) which is then used to publish anonymous benchmarking reports to all the participating benchmarking members. No one else would know the unique ID except for the utility that the ID is issued.

In addition, IRDB allows utilities to upload their confidential outage data in the IRDB database without anyone seeing their data except themselves through a unique login credential (they can also authorize a lead organization to view their data in the IRDB Enterprise and Platinum edition/version as discussed in the later part of this document). The secured and unseen outage data are used by IRDB to calculate the reliability indices (SAIDI, SAIFI, CAIDI etc.) and the resulting indices are then shared to all other participants by showing the unique IDs in lieu of the utility name thus, maintaining the anonymity of all the benchmarking participants.

Figure 20:
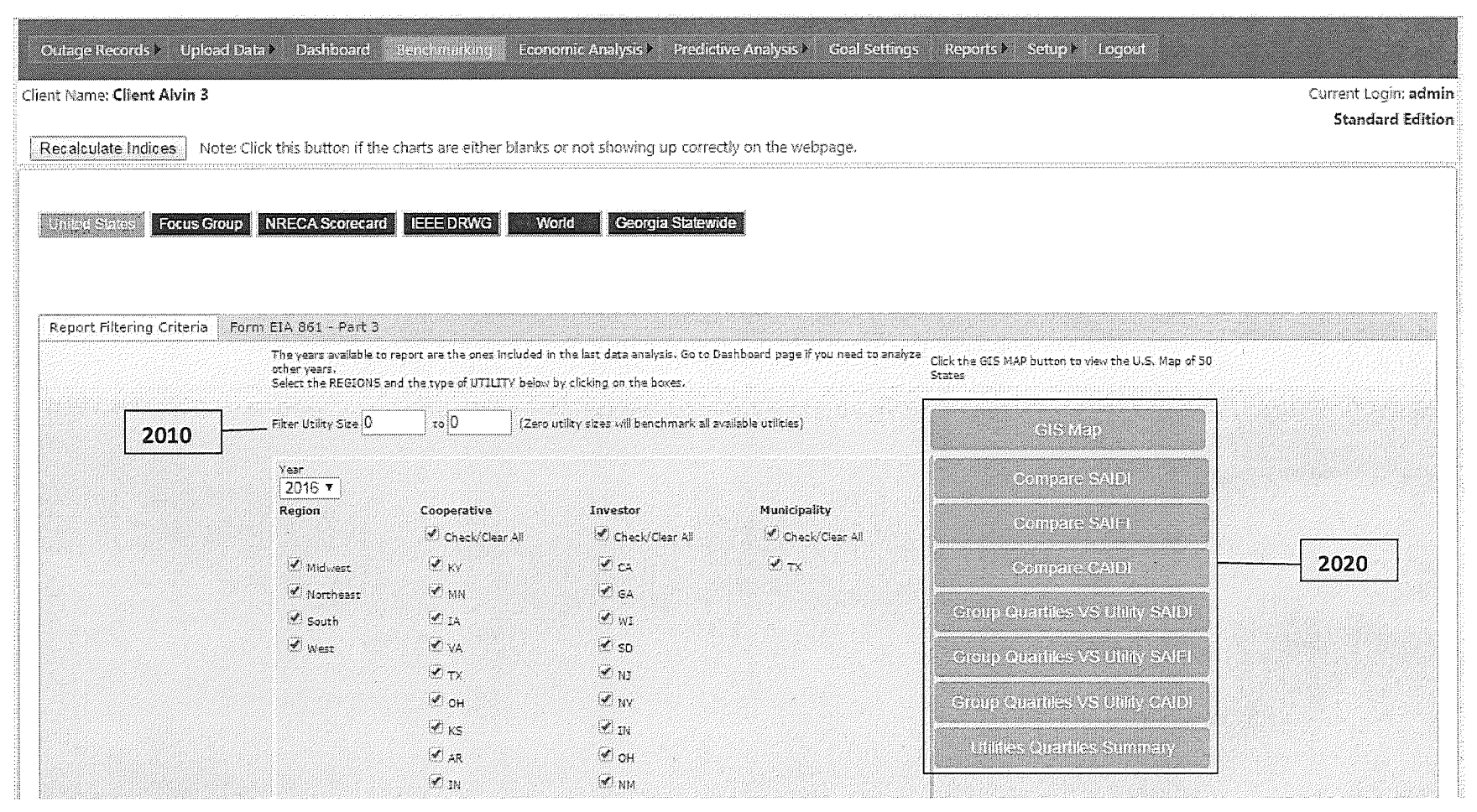
Figure 20A:
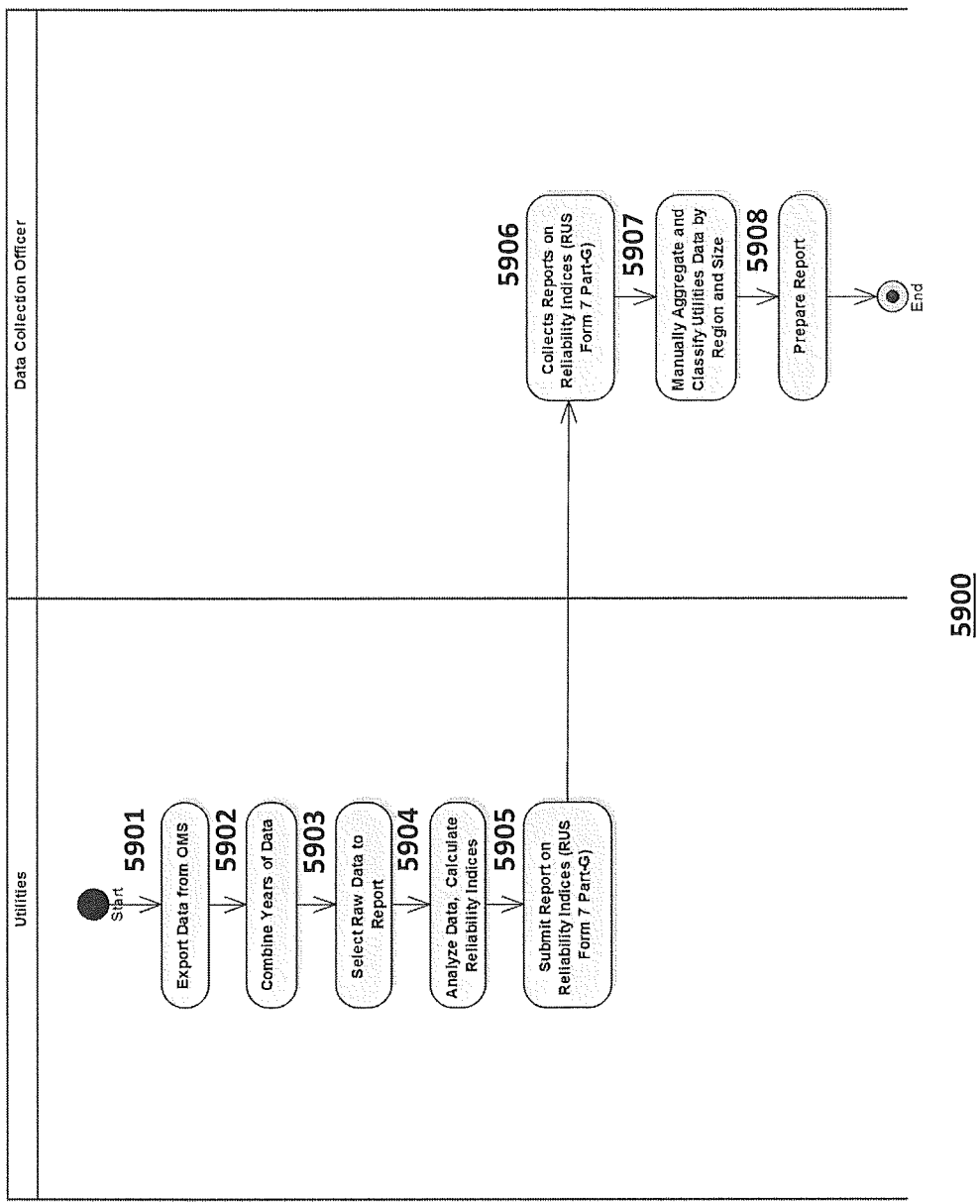
FIG. 20A is a flow diagram illustrating an existing identity process flow of manual aggregation of utilities reliability indices (existing benchmarking process).
Figure 20B:
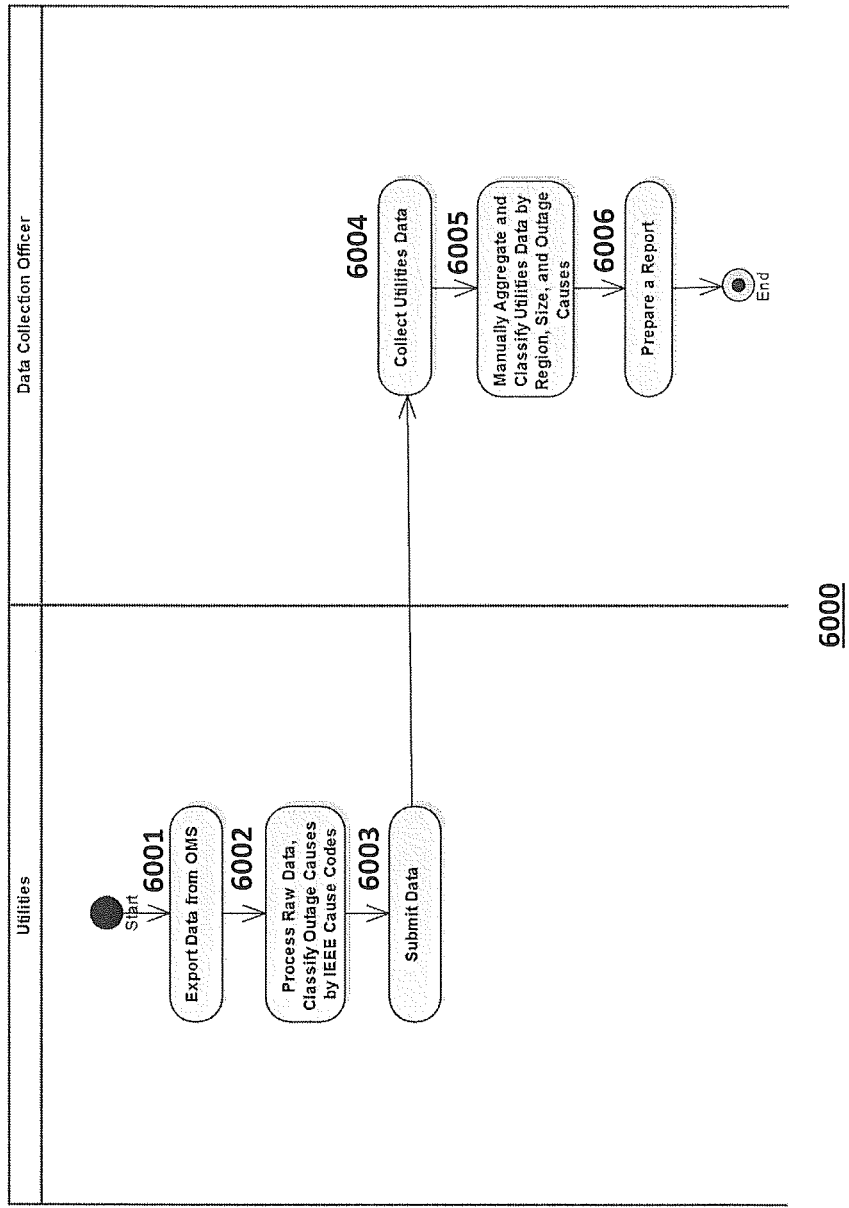
FIG. 20B is a flow diagram illustrating an existing identity process flow of manual aggregation of utilities raw outage data (existing benchmarking process).
Figure 20C:
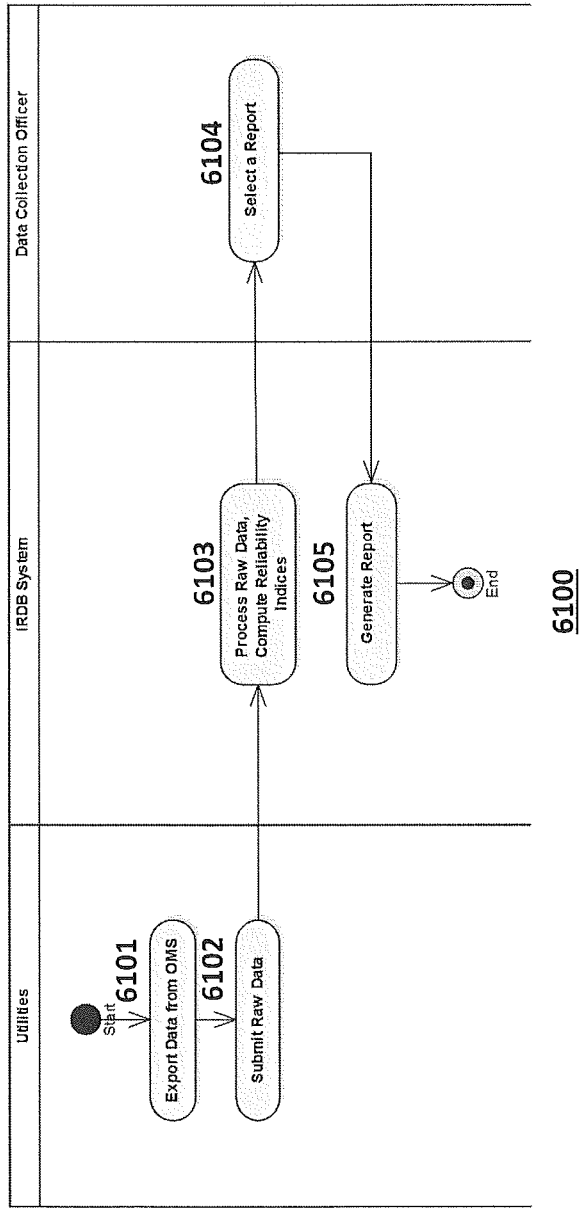
FIG. 20C is a flow diagram illustrating an exemplary semi-automated aggregation of utilities raw outage data and reliability indices (Benchmarking).
Figure 20D:
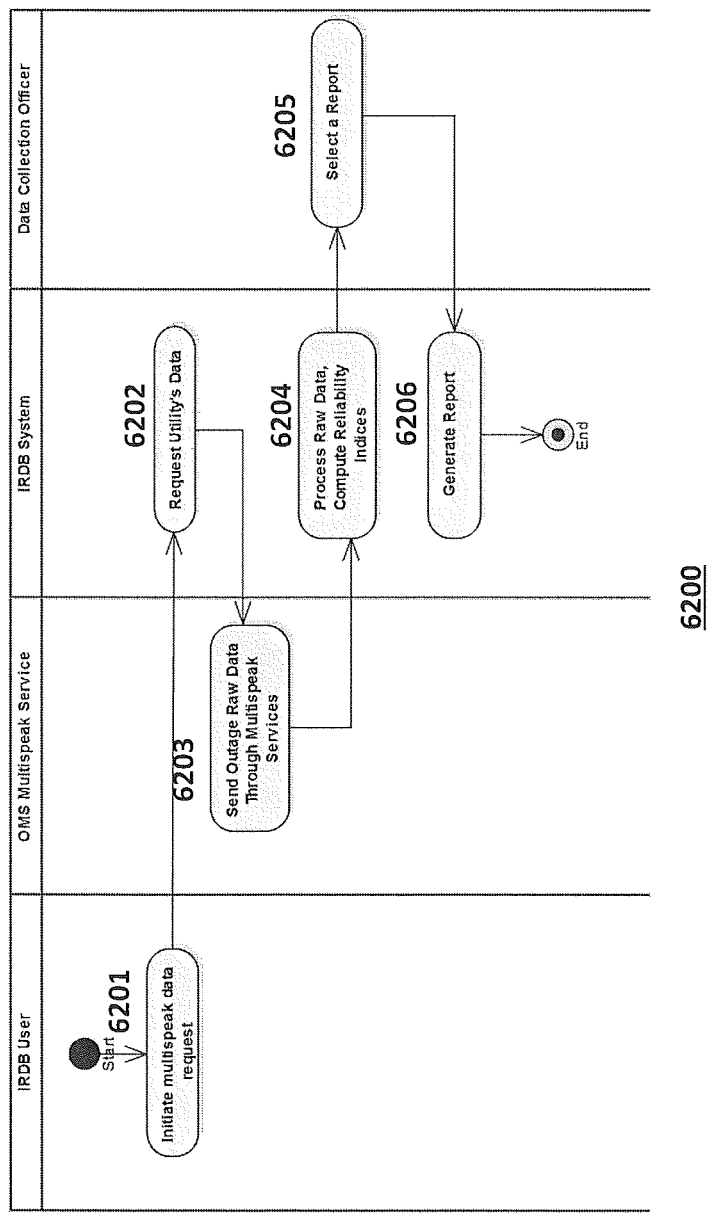
FIG. 20D is a flow diagram illustrating an exemplary process flow of IRDB fully automated aggregation of outage data with MultiSpeak web services.
Figure 20E:
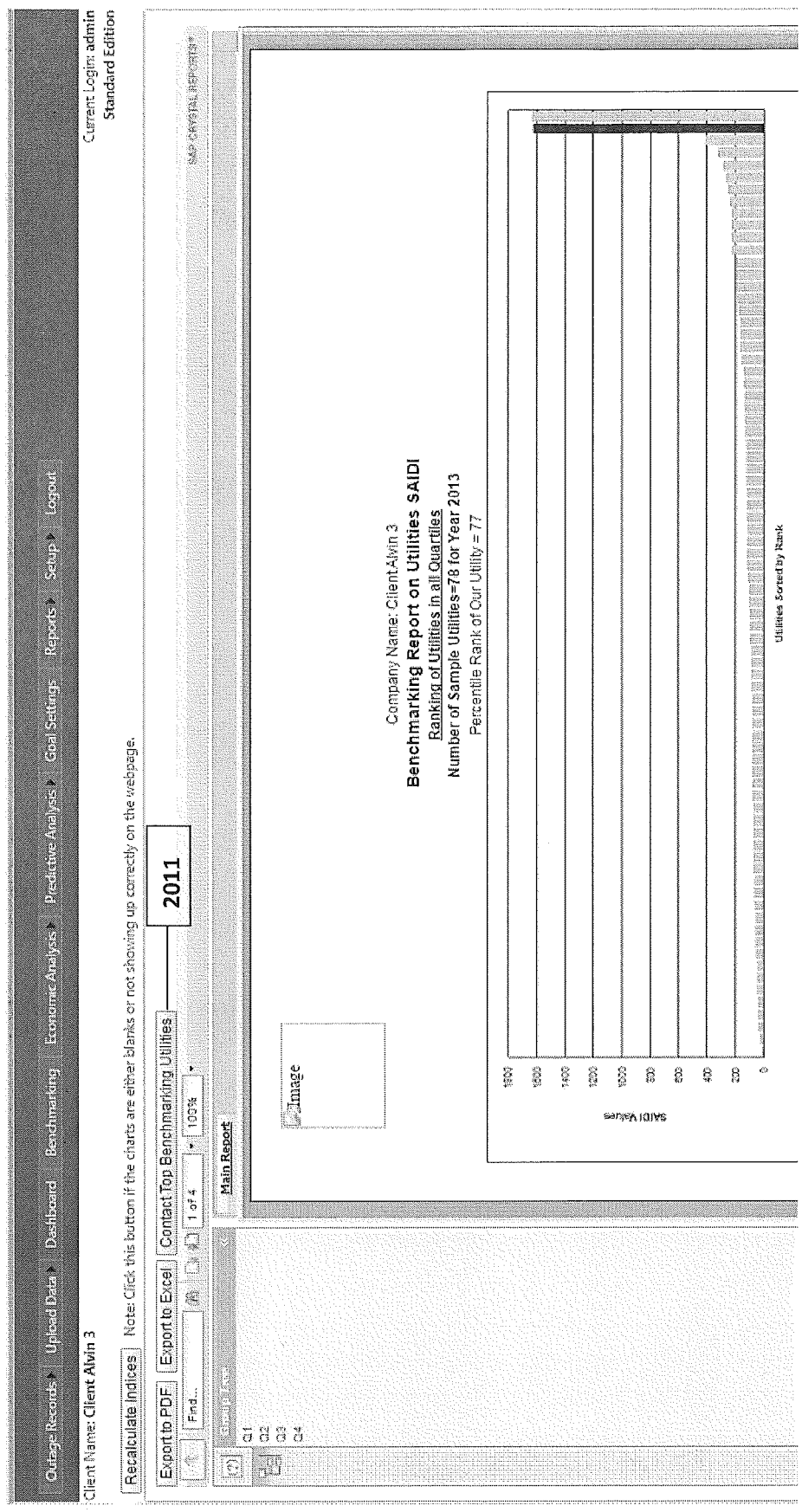
FIG. 20E shows an exemplary screen view of a "Contact Top Benchmarking Utilities" button.
Figure 20F:
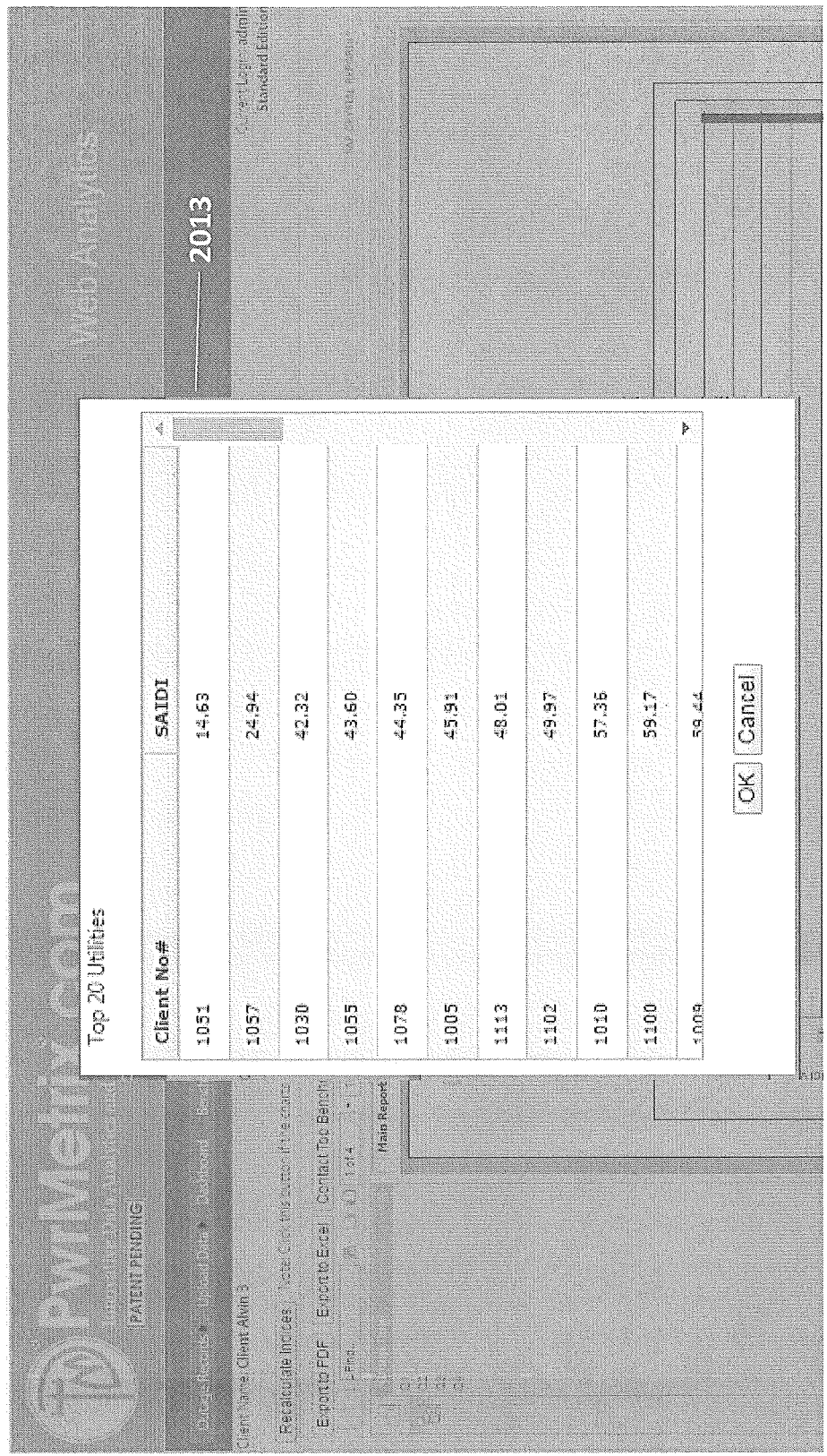
FIG. 20F shows an exemplary screen view of the TOP 20 utility list that may appear after clicking the 2011 "Contact Top Benchmarking Utilities" button 2011 FIG. 20E.

FIG. 20F shows a screen view 2013 of a TOP 20 utility list which shows an example of the unique/utility/client ID under the column headings "Client No#". As a result, utilities are now more willing to participate and join the benchmarking groups/studies because anonymity and data confidentially are kept secured.

FIG. 20A shows the time-consuming process for manually aggregating outage Reliability Indices (SAIDI, SAIFI and CAIDI) from utility benchmarking participants (this shows the benchmarking process presently used in the industry). The process starts with exporting outage data from the utilities' outage management system OMS 5901. Data are combined manually 5902 and selected as final raw data 5903. Reliability indices (SAIDI, SAIFI and CAIDI) are manually computed and often in non-standardized method for each utility 5904, and submitted to a data collection officer 5905 (a person or organization such as a hired consultant collecting all data from all benchmarking utility participants). The data collection officer receives all the participating utilities' calculated reliability indices 5906. If needed, the data are further grouped and classified by region or state 5907. The collection officer is responsible for manually combining reliability indices, collaborating back and forth with utilities for clarification, cleaning-up the data, and performing all manual calculation for a desired chart and ranking reports on collective reliability indices. If at any time a new utility participates or existing utility resubmits modified reliability data, the collection officer must manually redo all calculation for some desired charts and ranking reports. The entire process is cumbersome and may take several months to complete, depending on the number of benchmarking utility participants (and re-submission of data), before the final aggregation and final reports are ready for all utilities. Once all the reports and charts are completed and sent via email as attached Excel document, no additional utility can join the benchmarking group until the process is repeated usually the next year (annually) and the charts/reports remain static and unchanged.

In addition, FIG. 20B shows existing industry practice of time consuming and manual aggregation of utilities' outage raw data (existing benchmarking process used in the industry). The process starts from exporting data from outage management system 6001. Outage data are classified by criteria such as outage cause 6002 before submitted to a data collection officer 6003. The data collection officer manually aggregates all the data from different data structure submitted by different utilities 6005 and compile various benchmarking reports 6006. The collection officer is responsible for combining different data structure, collaborating back and forth with utilities for clarification, cleaning-up the data, and performing all manual calculation for a desired report on collective reliability indices. The entire process is cumbersome and may take several months to complete, depending on the number of benchmarking utility participants (and re-submission of data), before the final aggregation and final reports are ready for all utilities. Once the all the reports and charts are completed and published via email, no additional utility can join the benchmarking group until the process is repeated the next year.

In contrast, FIG. 20C illustrates an IRDB's innovative process of semi-automation and aggregation of utilities' detailed outage data and processing of reports/charts which dramatically improves the benchmarking process. Once data is exported from the utility's (user) outage management system 6101, user's raw outage data can be immediately uploaded to the IRDB System without any need of preprocessing 6102. The IRDB System receives and immediately processes the data and calculate the user's reliability indices 6103(by using IEEE 1366 industry standard calculation/methodology) on the fly (real-time). Afterwards, the user can immediately click any of the numerous reports/charts in the system 6104, and the system will immediately generate the reports 6105 based on the real-time uploaded outage data from all participating utilities. The data and calculated indices from each incoming user are automatically added in the existing IRDB database server. Thus, this facilitates fast and real-time sharing of data among all utilities in the system regardless of their geographical locations while maintaining anonymity and data confidentiality.

Figure 1B:
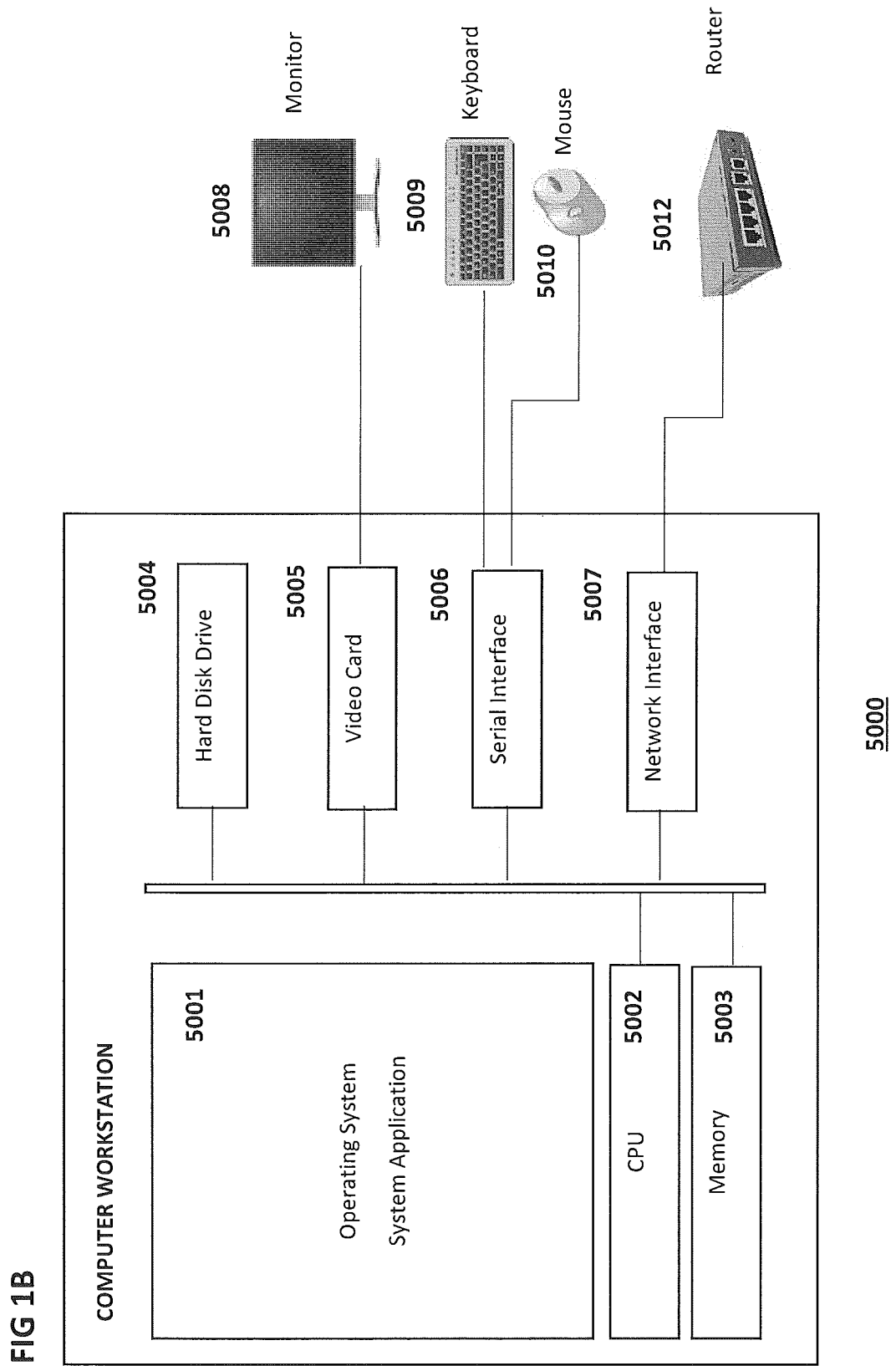
FIG. 1B is a block diagram illustrating the hardware and software components in an exemplary IRDB computer workstation 5000.
Figure 1C:
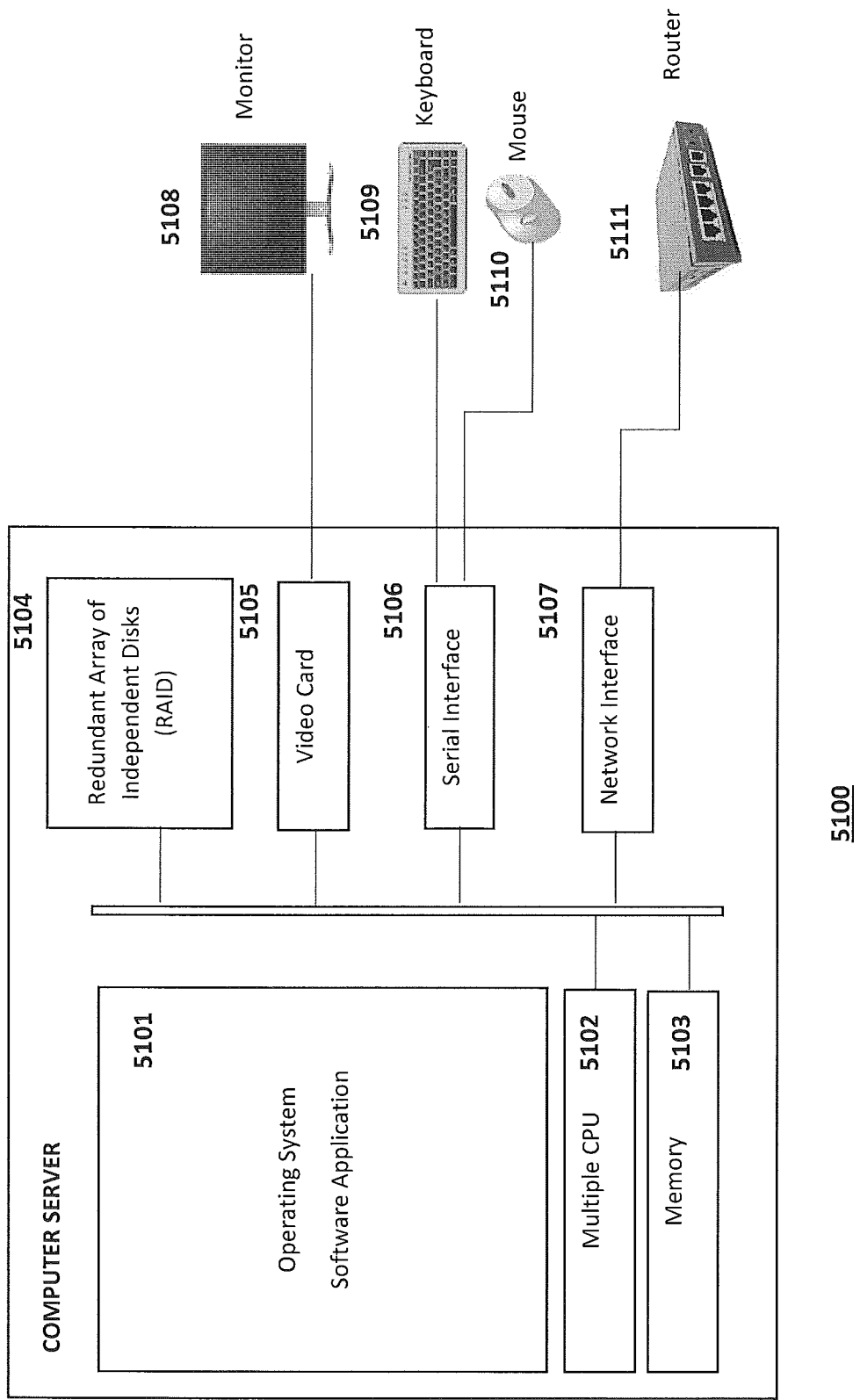
FIG. 1C is a block diagram illustrating the hardware and software components in an exemplary IRDB Computer Server 5100.
Figure 1D:
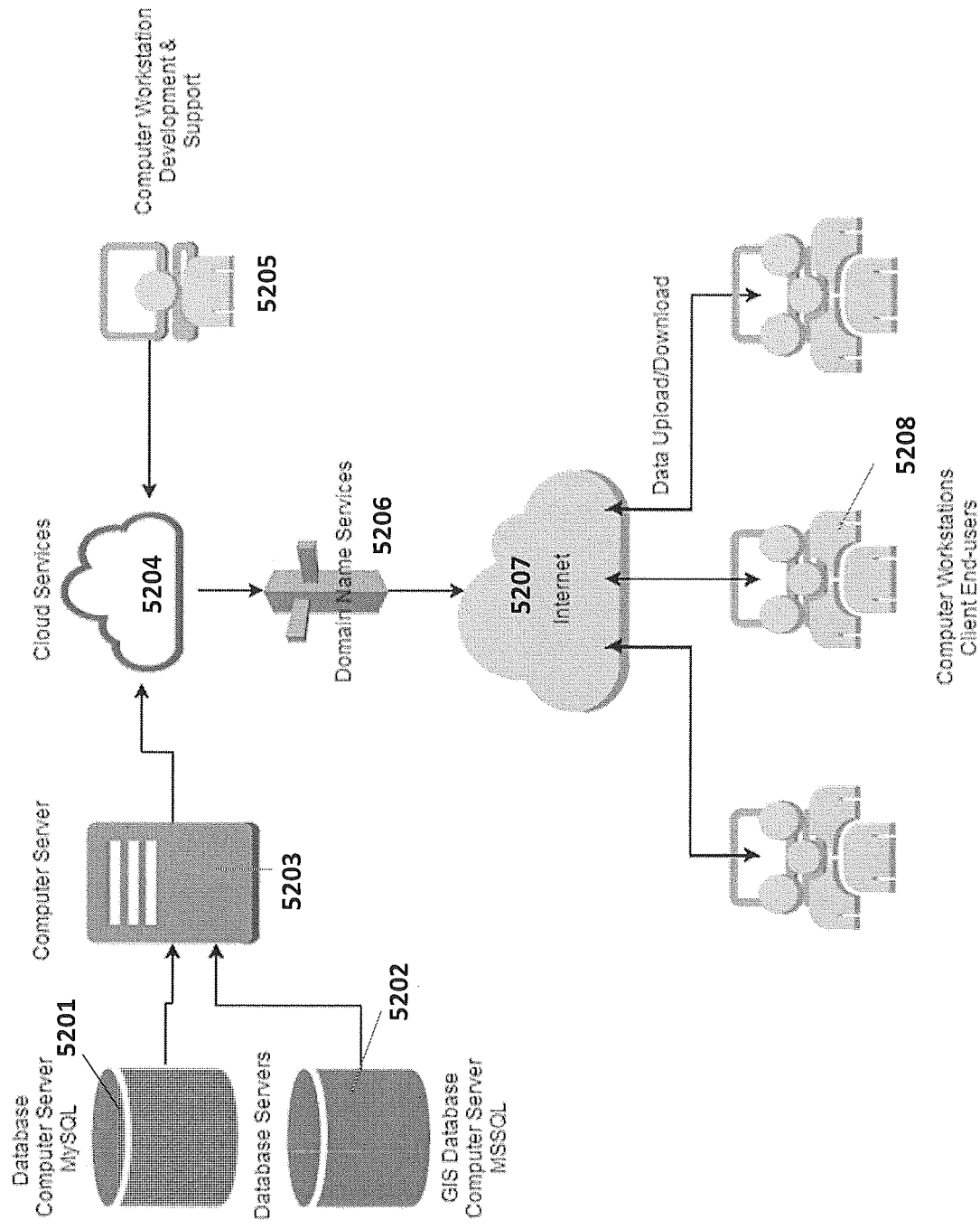
FIG. 1D is a diagram illustrating an example for deploying the IRDB system in a Cloud/internet structure.
Figure 1E:
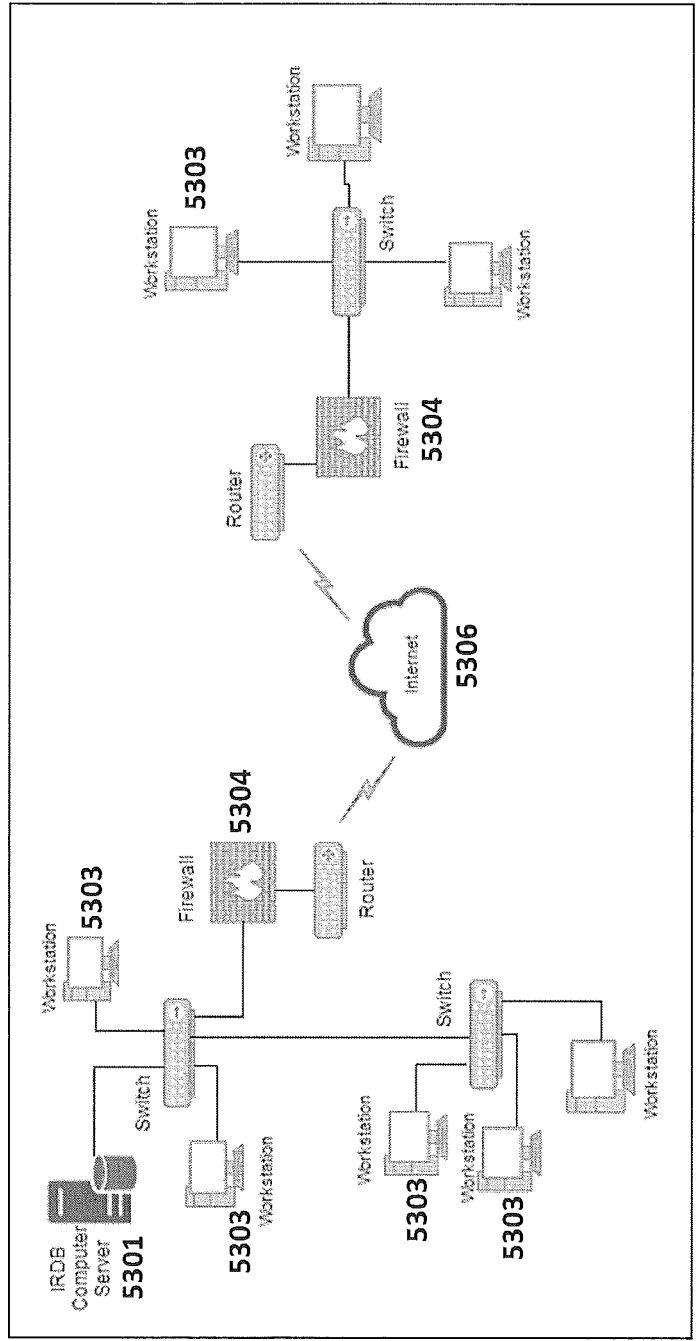
FIG. 1E is a diagram for deploying the IRDB system in local/intranet environment.
Figure 1F:
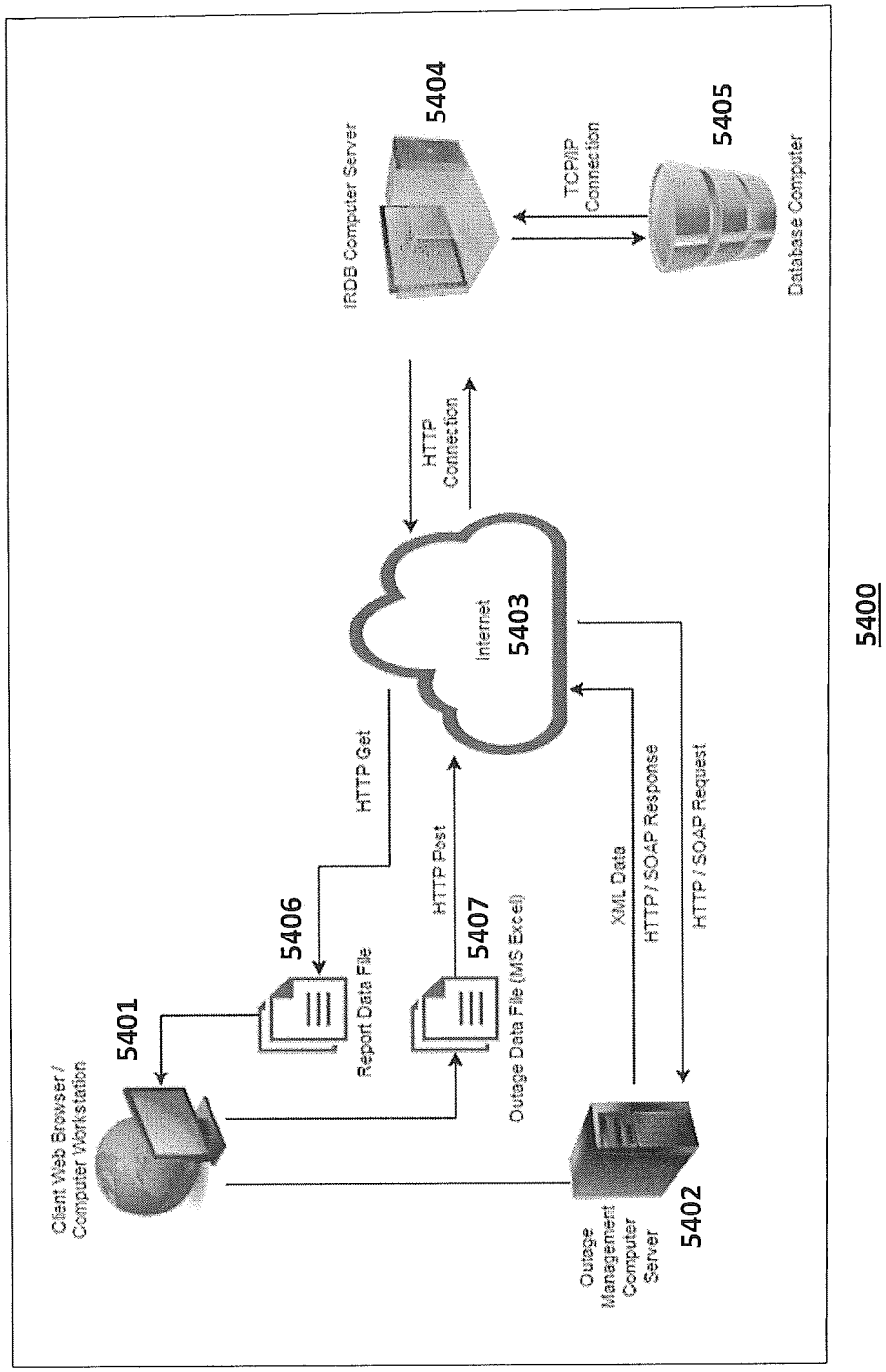
FIG. 1F is a transaction flow diagram on a typical cloud/internet environment.
Figure 1G:
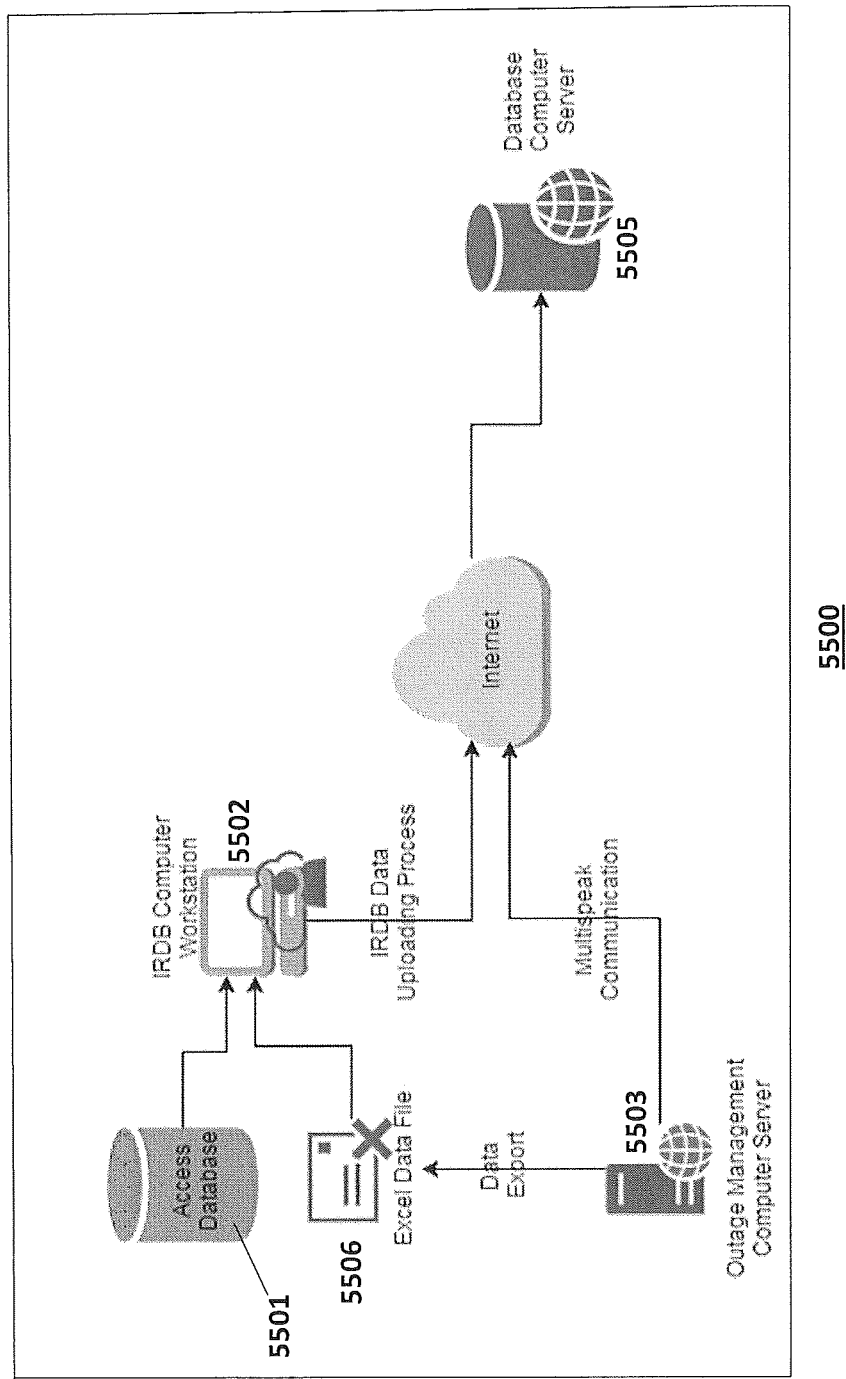
FIG. 1G illustrates an exemplary data storage structure for the IRDB system.

FIG. 1F illustrates a Transaction Flow Diagram 5400 showing how IRDB system facilitates fast and real-time sharing of data among utilities regardless of their geographical locations. Each utility can export the outage data from their outage management system 5402 via their computer workstation 5401. The exported data fields can include outage date, outage cause, duration in minutes, number of customers affected, feeder, substation, equipment and more. These data can be saved, for example, in an Excel, ASCII or CSV file 5407 and then uploaded to, for example, a IRDB system computer server 5404 from their work station 5401 and via the internet 5403 (where different reports on reliability indices and outage analytics are calculated automatically using an applicable industry standardized formula and outage classification). Alternatively, in FIG. 1G there is shown a Data Storage Diagram 5500 wherein a utility's data may also reside or be exported to, for example, a Microsoft access database then uploaded to the IRDB system. FIG. 1D illustrating a Cloud Deployment Diagram shows how multiple users (utilities) can upload their outage data simultaneously (in parallel) from their computer workstations 5208 via the internet 5207 into the IRDB computer server's database 5201. This unique setup is a powerful way to allow hundreds or thousands of utilities worldwide to quickly upload outage data simultaneously and independently without the need to hire an independent person/consultant and to manually aggregate the data and prepare the reports.

FIG. 20C (IRDB Semi-Automated aggregation of utilities raw outage data and reliability indices) illustrates the IRDB's unique real-time capability in automating the collection and aggregation of outage data, and calculating reliability indices for each utility and seamlessly re-calculate rankings and analysis whenever there is a change in the data (e.g. utility adding more outage data in a daily basis or new utilities joining the benchmarking group) permits very fast real time creation of benchmarking reports, charts and analytics that every participating utility may access anytime. This automated process saves a great deal of resources in terms of time and manpower compared to existing manual processes as shown in FIG. 20A and FIG. 20B, which requires manual coordination with individual utility to collect outage data before calculating each reliability indices and generating report. Alternatively, if the user's outage management system has MultiSpeak web services published 5503 (see FIG. 1G), the IRDB client user can connect to these services to obtain data automatically without having to export the data to an external file before transferring it to the IRDB system. This allows for a fully automated uploading of data from OMS to IRDB which permits an even faster data transfer while eliminating accidental data changes or user errors in handling the data before it gets to the IRDB system.

FIG. 20D shows an IRDB example process 6200 fully automating the aggregation of utilities' raw outage data through MultiSpeak web services. MultiSpeak is an interoperability standard that allows a back end software system to share information via web services in a fast, secure and cost-effective way. The process starts with a IRDB client user (utility) initiating a connection to MultiSpeak server 6201 and setting-up an auto-publish request (one time setup that automates the sending of data from OMS to IRDB via MultiSpeak web services whenever new outage data are inputted in the utilities OMS). The system then forwards a request to the MultiSpeak server to obtain data 6202. The MultiSpeak server sends a response containing outage data to the IRDB System 6203, once the data is received, the IRDB System immediately processes and calculates the latest reliability indices 6204 in real-time. As soon as the data are processed, the user can select any report in the system 6205, and the system immediately generates the needed report. This process completely automates and expedites the passing of outage data from the utility OMS to the IRDB system whenever new outage data are added in the OMS. This eliminates the need for personnel intervention and allows the IRDB to completely run independently by itself and securely processes hundreds of thousands of outage data from participating utilities worldwide via the internet.

The second integral part of IRDB's integrated solution framework is real-time Outage Data Analytics that provides easy-to-use and powerful tools for analyzing the individual utility's outage data (these tools do not require the entire benchmarking group's aggregated data) and creating graphs, charts, GIS maps, and reports based on the same outage data used for Benchmarking purposes. As shown in FIG. 1, the tools include Trending/visualization (Visualize Past and Present Yearly Reliability Performance), Economic Analysis (Outage cost and Potential Savings by improving Reliability), Reports (Failure patterns & focus improvement), Predictive Analysis (Forecast and Reality Check), and Goal Settings (Set and monitor target metrics). FIGS. 14-19 and FIGS. 20-28 provide diagrams and specific details of these tools.

Referring now to FIG. 1B, a block diagram of hardware and software components used for an exemplary IRDB end user computer workstation 5000 which includes a Central Processing Unit (CPU) 5002, Memory 5003, Hard Disk Drive 5004, Video Card 5005, I/O (input/output) devices such as Monitor 5008, Keyboard, Mouse 5009, Network Connection (5007 and 5012), and Operating System and System Application 5100.

FIG. 1C shows the hardware and software components used for the IRDB Computer Server 5100 which may include a multiple Central Processing Unit (CPU) 5102, Memory 5103, Redundant Array of Independent Disk (RAID) 5104, Video Card 5106, I/O (input/output) devices such as Monitor 5108, Keyboard 5109, Mouse 5110, Network Connection (5107 and 5111), and Operating System and System Application 5101.

FIG. 1D is a diagram of an exemplary IRDB Cloud Deployment structure 5200. This system 5200 as illustrated utilizes commercial cloud service infrastructure that includes a Computer Server 5203 that host the IRDB system programming codes (algorithms), two database servers for the system, transaction data 5201 and geographic information data 5202, computer workstations 5208 for end users to upload and download data/reports, internet cloud services (5204, 5206 and 5207), and computer workstation development/support 5205 for modifying the IRDB programming codes and algorithms that are saved and hosted in the computer server 5203.

FIG. 1E shows an option to deploy the IRDB system 5300 on intranet/locally hosted environment. This uses a computer server 5301 physically residing in the user's building office to host the programming codes, database, network components 5304 of switches, firewalls, and routers, and computer workstations 5303 for the end users. Connections on a Local Area Network may operate using TCP/IP, while connections to external network may use Virtual Private Network over the internet 5306.

FIG. 1F shows an exemplary process flow 5400 of IRDB transactions on a typical cloud internet environment. Transaction starts with the client end users 5401 exporting outage data from outage management system OMS 5402 in the form, for example, of Excel, Access, CSV or ASCII File 5407 and uploads the exported file into the IRDB server 5404 through the internet 5403 via a link such as an HTTP connection, as shown. The IRDB processes the incoming outage data from the end user 5401 and saves it to its database system 5405. The IRDB server 5405 processes and sends visualization graphs, analysis, tables, charts, GIS maps and various reports 5406 to the end user's work station 5401 through the internet 5403 in real-time as requested by the user 5401.

FIG. 1 shows an IRDB process overview list that a utility user may follow to maximize the use of the IRDB tool and to improve the utility's reliability performance. The process list may include 1. Importing, 2. Trending, 3. Economic Analysis, 4. Reports, 5. Benchmarking, 6. Predictive Analysis, 7. Goal Settings, 8. Utility Connection and 9. Application of Best Practice's In-House. The IRDB tool may embed these important components to the tools, menus, tables, reports, GUI (graphic user interface) and submenus that may be described herein. These processes may be accessed as individual component and may be flexible such that the users do not have to be access the list in particular order.

FIG. 1A shows an exemplary screen view 101 that may be used as part of the IRDB tool for logging-in the IRDB tool menu via a web browser according to an exemplary embodiment. The IRDB tool may include data entry fields 102 such as unique user credentials (client name and user name) and password for authentication and security measure.

Figure 2:
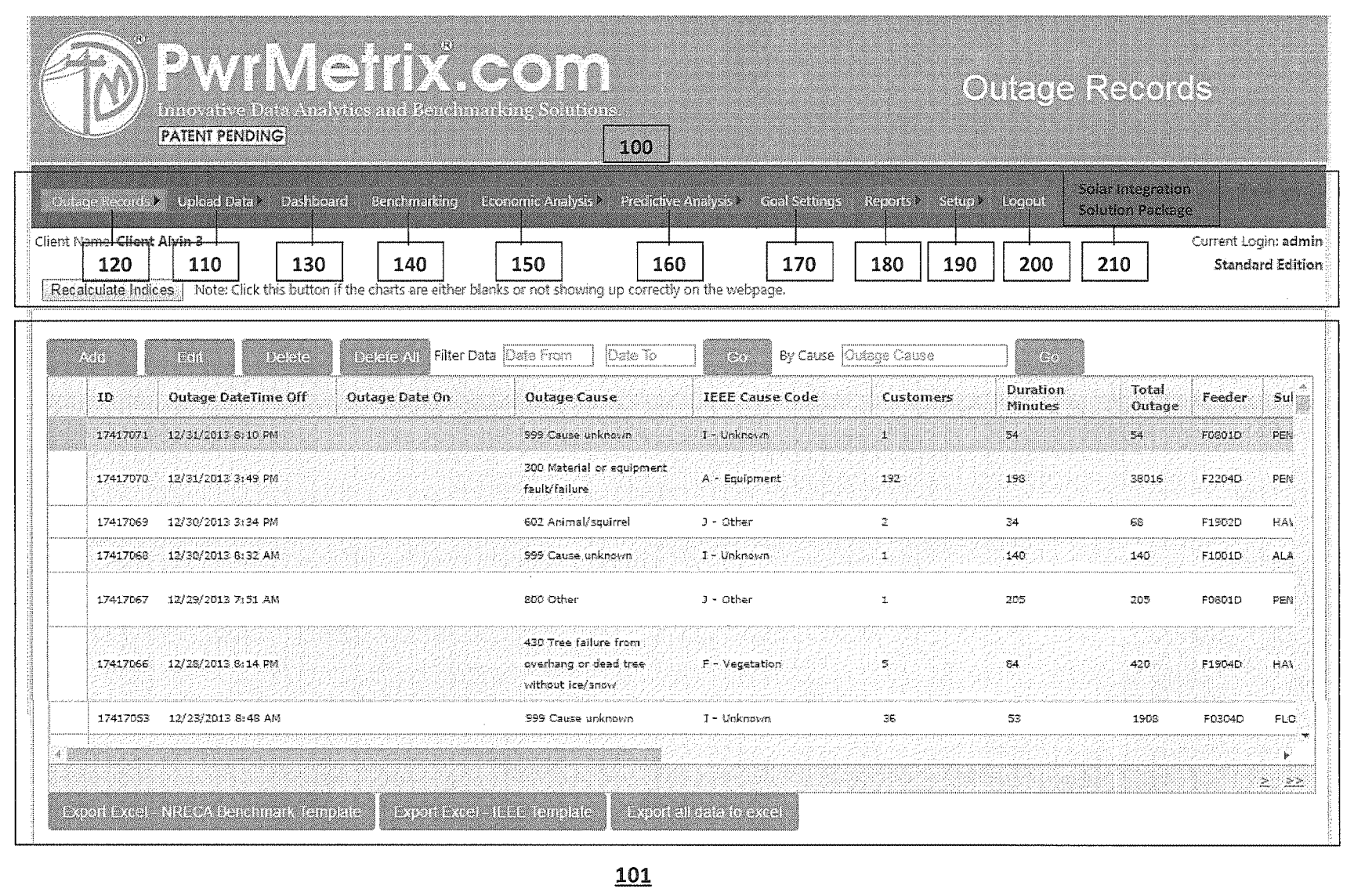

FIG. 2 shows an exemplary screen view of the IRDB system 100 tool for providing a visual representation across various components according to an exemplary embodiment. The IRDB tool may include tools, tables, reports, GUI (graphic user interface), and main menus (top bar main menu), such as an Upload Data 110 for importing outage data, Outage Records 120 for managing outage records, Dashboard 130 for visualizing graphs and trends, Benchmarking 140 for comparing reliability metrics, Economic Analysis 150 for calculating and assessing the financial impact of outages, Predictive Analysis 160 for predicting the future reliability based on existing outage data, Goal Settings 170 for tracking the target reliability metrics, Reports 180 for reporting the numerous results based on the outage data analysis, Setup 190 for customizing user settings, Logout 200 for exiting out of the IRDB tool 100, and Solar Integration Solution Packages 210 for providing a suite of tool for Solar Impact Analytics and Distribution Reliability Planning and Operation Benchmarking Solution. The various top bar main menu may include submenus that are shown when the user hover or click the computer mouse over the main menu. Each of these submenus may also have another layers of submenus. When one of the top bar main menus is selected, the IRDB tool may show detailed tables, tabs, tools, reports, visuals, and other components below the location of the top bar menu 220.

Figure 3A:
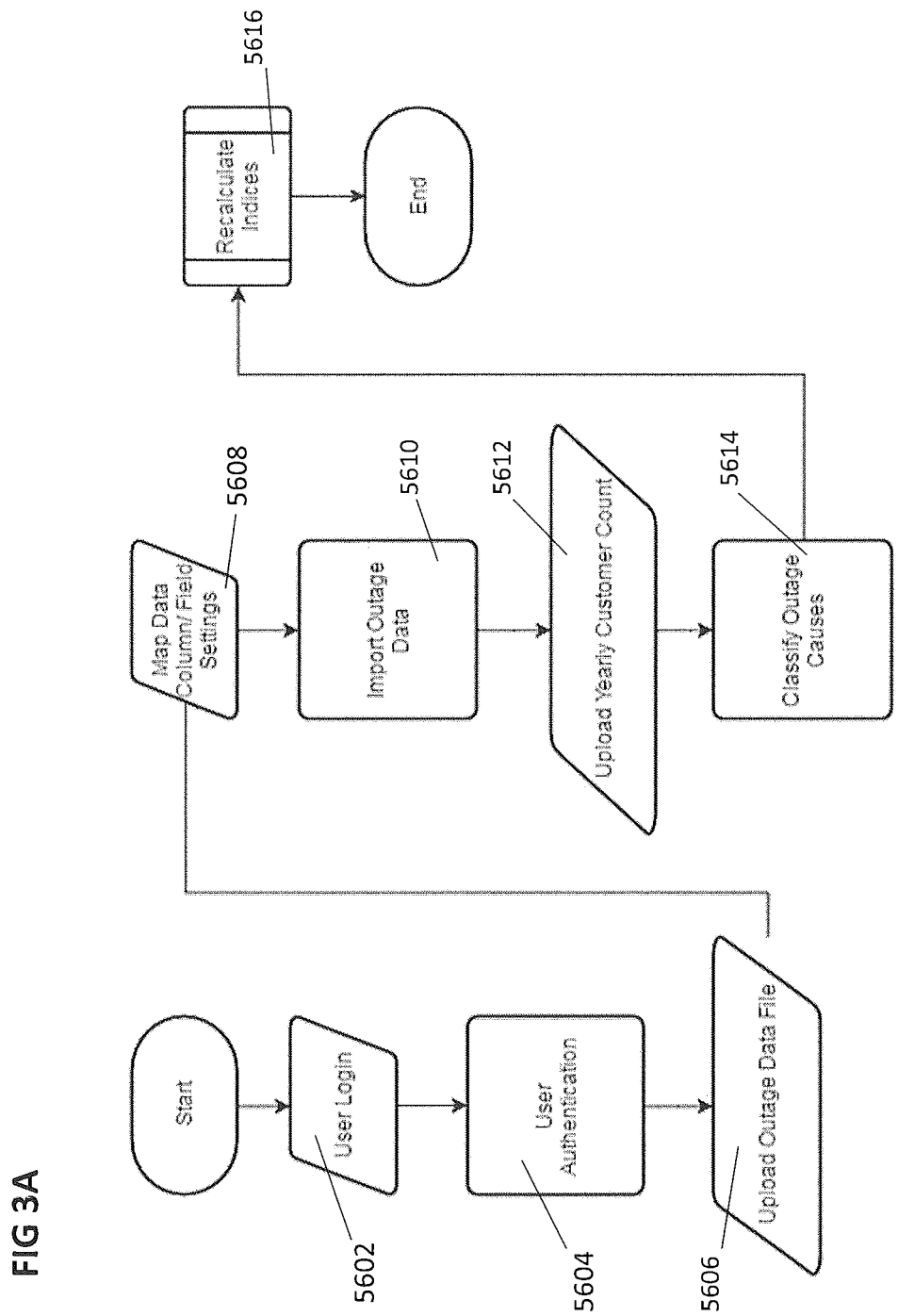
FIG. 3A is a flow chart illustrating an example of uploading the users' outage data into the IRDB tool.

FIG. 3 shows an exemplary screen view of two example submenus consisting of New Data First Time 300 and Auto Upload—Use Preset Template 310 under the Upload Data main menu 110 shown in FIG. 1A. The New Data First Time 300 submenu may be used to import the utility's raw outage data in a flexible way. This may be the first procedure needed when using the IRDB tool for the first time (as described in FIG. 1 list of process called "1. Importing"). The Auto Upload—Use Preset Template 310 may be used for the succeeding future automated importing of the same outage database structure. FIG. 3A shows a flow chart illustrating uploading of client outage data into the IRDB tool. This starts from an end user logging-in the IRDB tool 5602 and the system then authenticates 5604 the supplied user ID and password. The end-user then may upload its data 5606 from, for example, an Excel file (e.g., see FIG. 1G, 5506) or as an access database file (e.g., see FIG. 1G, 5501) once the system received the data completely it prompts the user to map its columns to the system data fields 5608 and start the system to read each line of record 5610 and store its data to the database. After the outage data has been imported, the system then may ask the users to upload their average number of customer for each year 5612, and then present to the user the distinct Outage Causes it reads from their outage which need to be classified 5614 into corresponding IEEE cause codes. After the outage causes have been classified, the last step 5616 is to calculate the latest years indices before it redirect the end user to the dashboard that will show the updated index values.

Figure 4:
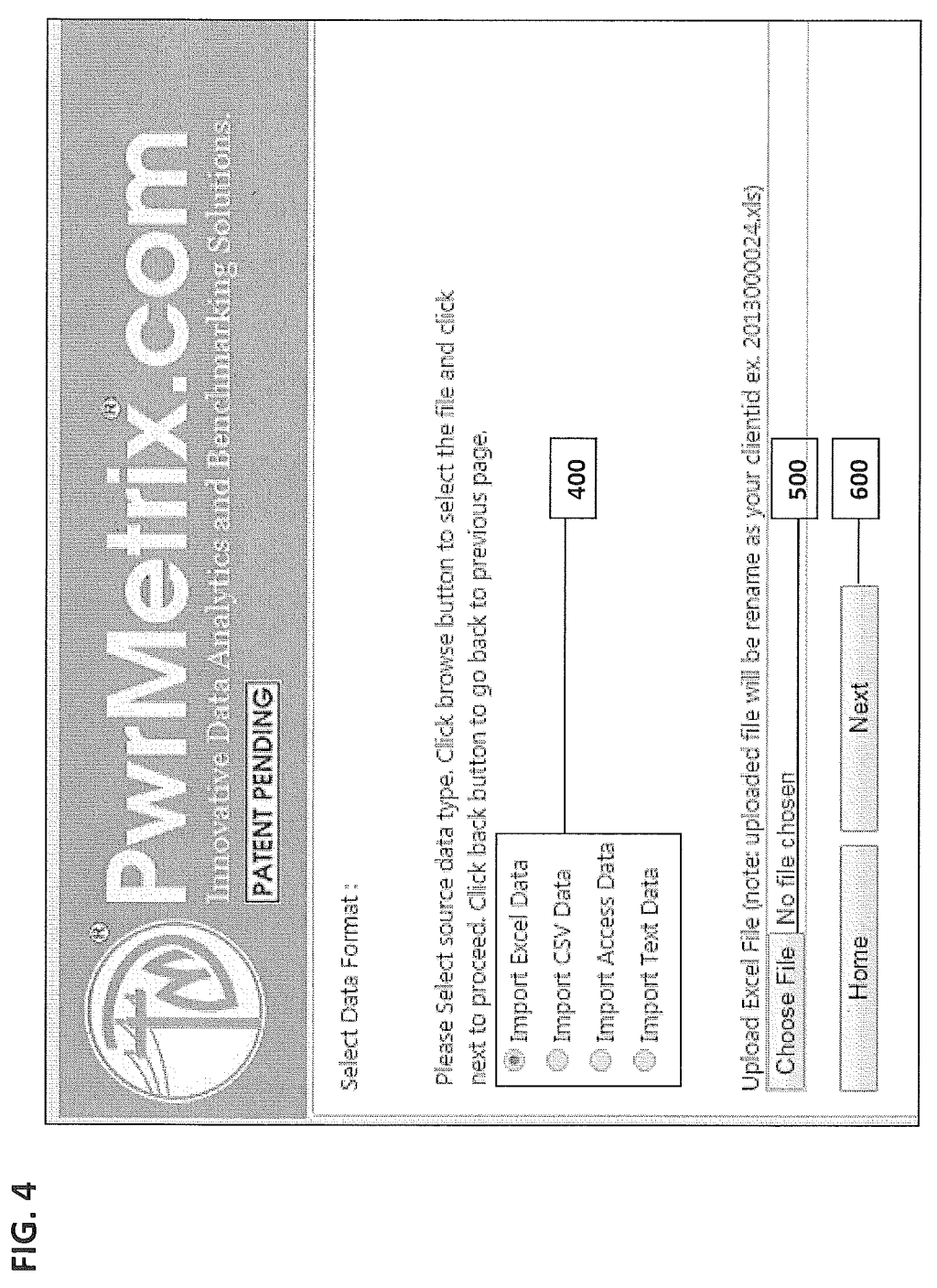

FIG. 4 shows an exemplary screen view that may appear as a result of activating the New Data First Time 300 submenu in FIG. 3. By the user activating the browse button 600, the IRDB tool may be used to upload or import outage data from the outage data source file 400, located on a local computer hard drive or external storage device stored as, for example, Microsoft Excel, CSV, Access, Txt, SLK, MS SQL and MySQL format. The source outage data file selected from browse button 600 may be referred to as the "imported file". The imported file may include the utility's detailed raw outage data/records exported from the OMS or customized outage tracking system.

Figure 5:
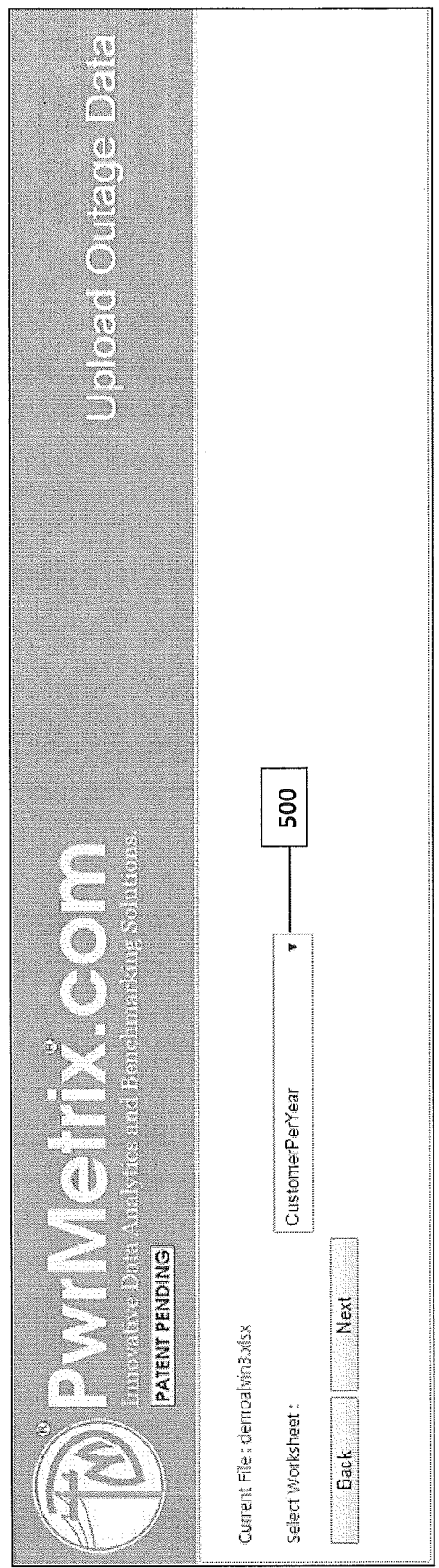
FIG. 5 shows an exemplary screen view for selecting the worksheet name of the imported file from the dropdown menu of the IRDB tool.

FIG. 5 shows an exemplary screen view for selecting a worksheet name of the imported file from a dropdown menu 500 of the IRDB tool.

Figure 6:
FIG. 6 shows an exemplary screen view of an innovative field column mapping capability of the IRDB tool
Figure 6:
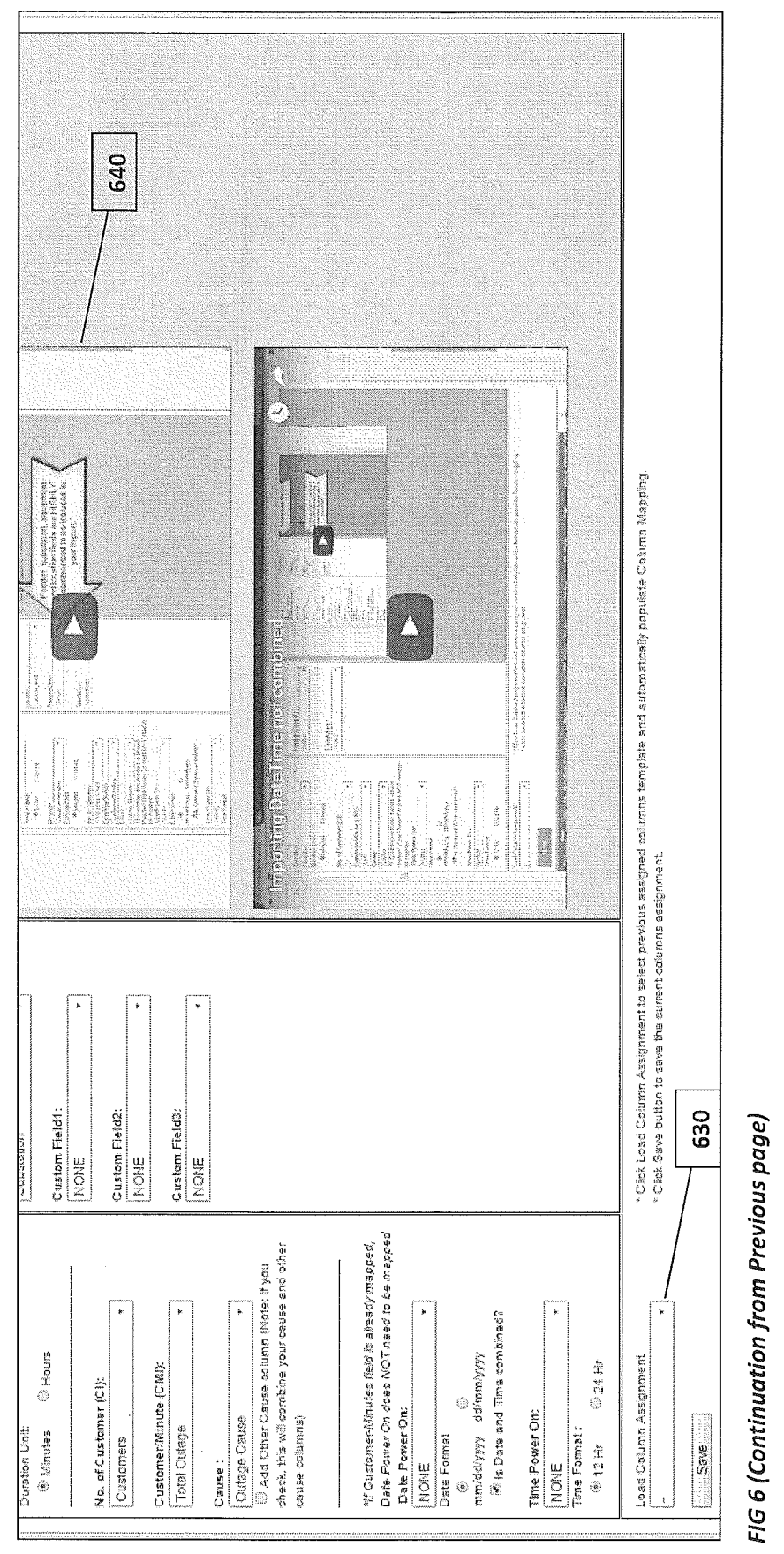

FIG. 6 shows an exemplary screen view of an innovative and flexible field column mapping capability of the IRDB tool that may be referred to as "column mapping" according to an exemplary embodiment. The column mapping may provide the user with an easy, flexible, fast and powerful way of mapping the name of the required fields 600 to the imported file's unique field names. Required fields or columns may consist of the IRDB tool field names called, for example, date power off, time power off, duration, number of customers affected, customer minute interrupted and cause of outage.

FIG. 6A shows an exemplary screen view of an example imported file of unique field names (e.g. outage date time off, outage cause, customers, duration minutes etc.). FIG. 6 may also include additional recommended fields 610 that the utility can import and use for other detailed outage analysis. A drop down menu field 610 allows a user to easily select the imported file's unique field name that needs to be mapped to the IRDB tool's required fields, and a load column assignment section/component 630 permits the capability to save the user mapped-fields in a template that can be used in the future for automating the importing of the latest outage records (the Auto Upload-Use Preset Template submenu 310 in FIG. 3 may be used to upload the template).

FIG. 7 shows an exemplary screen view showing a snapshot of an imported file's unique field names and outage data records 700 according to an exemplary embodiment. The table may provide useful visual information for the user to map the correct fields without the need to open the file in a separate application (e.g., Microsoft Excel).

Figure 8:
FIG. 8 shows an exemplary screen view for providing a visual table of the final Data Preview to be imported in the IRDB tool's web server database according to an exemplary embodiment.

FIG. 8 shows an exemplary screen view that may provide a visual table preview of the final imported data 800 prior to being imported in the IRDB tool's web server database. This may allow the user to verify and assess the resulting imported data prior to the final import step. If the data looks incorrect, the user may return to the previous screen to modify the mapped fields. Accordingly, the IRDB tool may include an algorithm to automatically filter the Error Data 810 from the imported file. For example, all outage minutes that have zero values can be excluded and saved on a separate error table that can be edited and fixed by the user in a later time. This is valuable in preventing "bad data" and incorrect reliability indices calculations. The Start Upload button 820 may be included to execute the algorithm to import the utility outage data based on the field mapping assignments.

Figure 9:
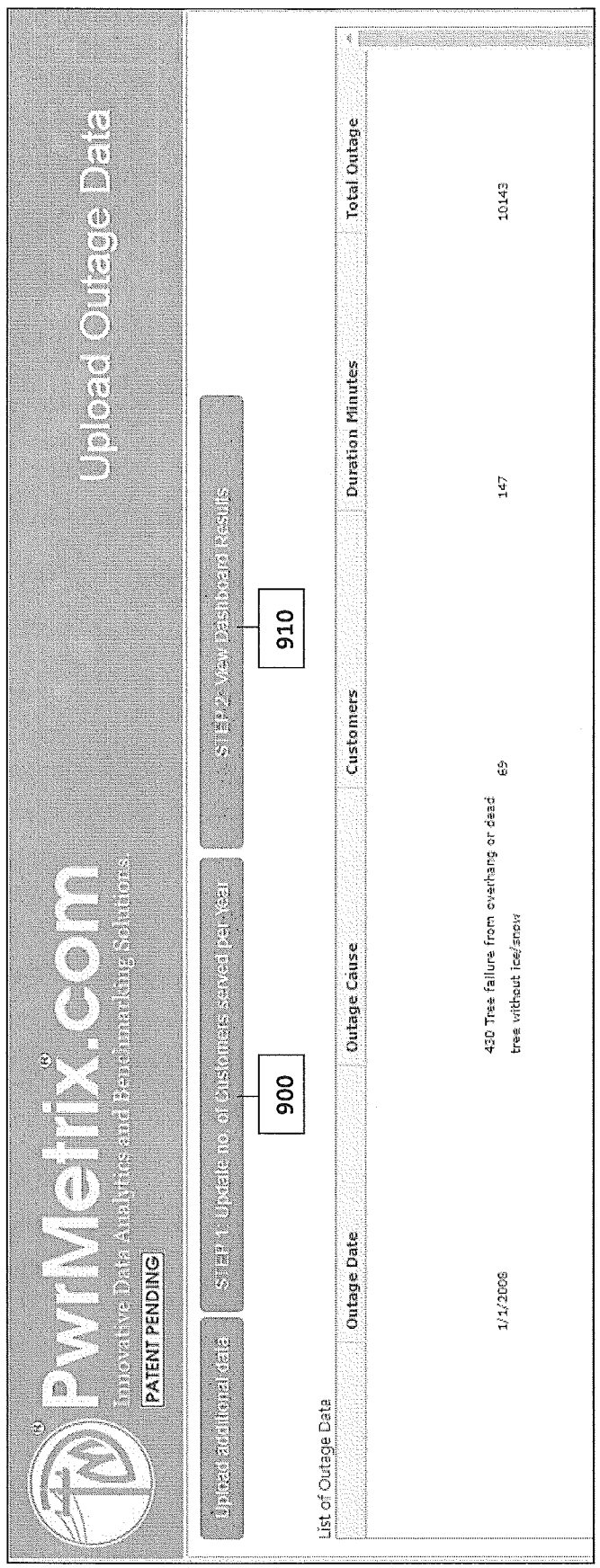
FIG. 9 shows an exemplary screen view of the STEP 1: Update no. of Customers Served per year and STEP 2: View Dashboard results 910. STEP 1.

FIG. 9 shows an exemplary screen view of the "STEP 1: Update no. of Customers Served per year" 900 and "STEP 2: View Dashboard results" 910 buttons. STEP 1 button 900 may activate the importing of the required "number of customers served per year" to accurately calculate the utility's SAIDI, SAIFI and SAIDI reliability indices (used as main comparison metrics for benchmarking utilities). STEP 2 button 910 may be included to exit the Upload Data 110 submenu FIG. 2 and proceed to access the "Dashboard" submenu 130 of FIG. 2.

Figure 10:
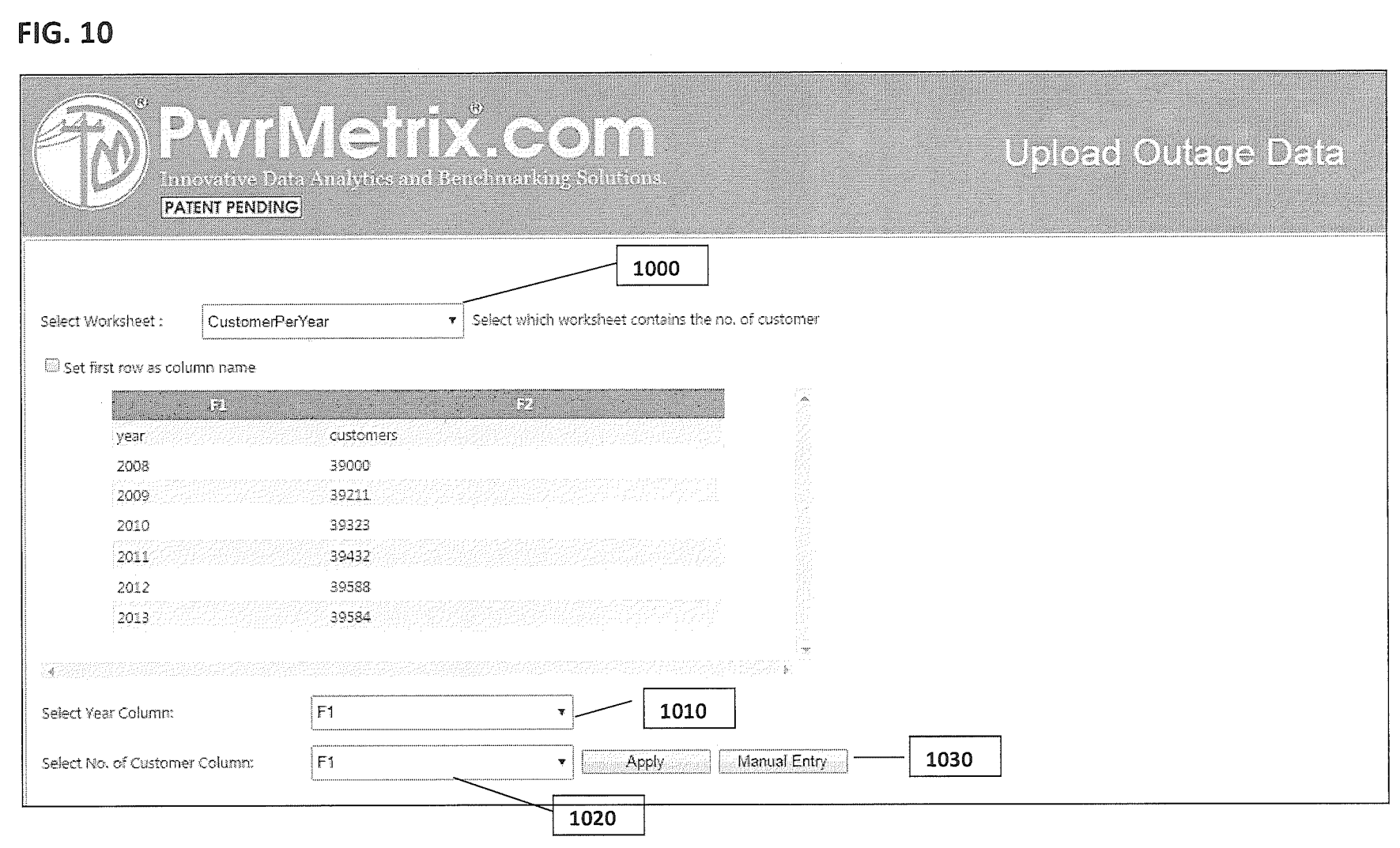
Figure 11:
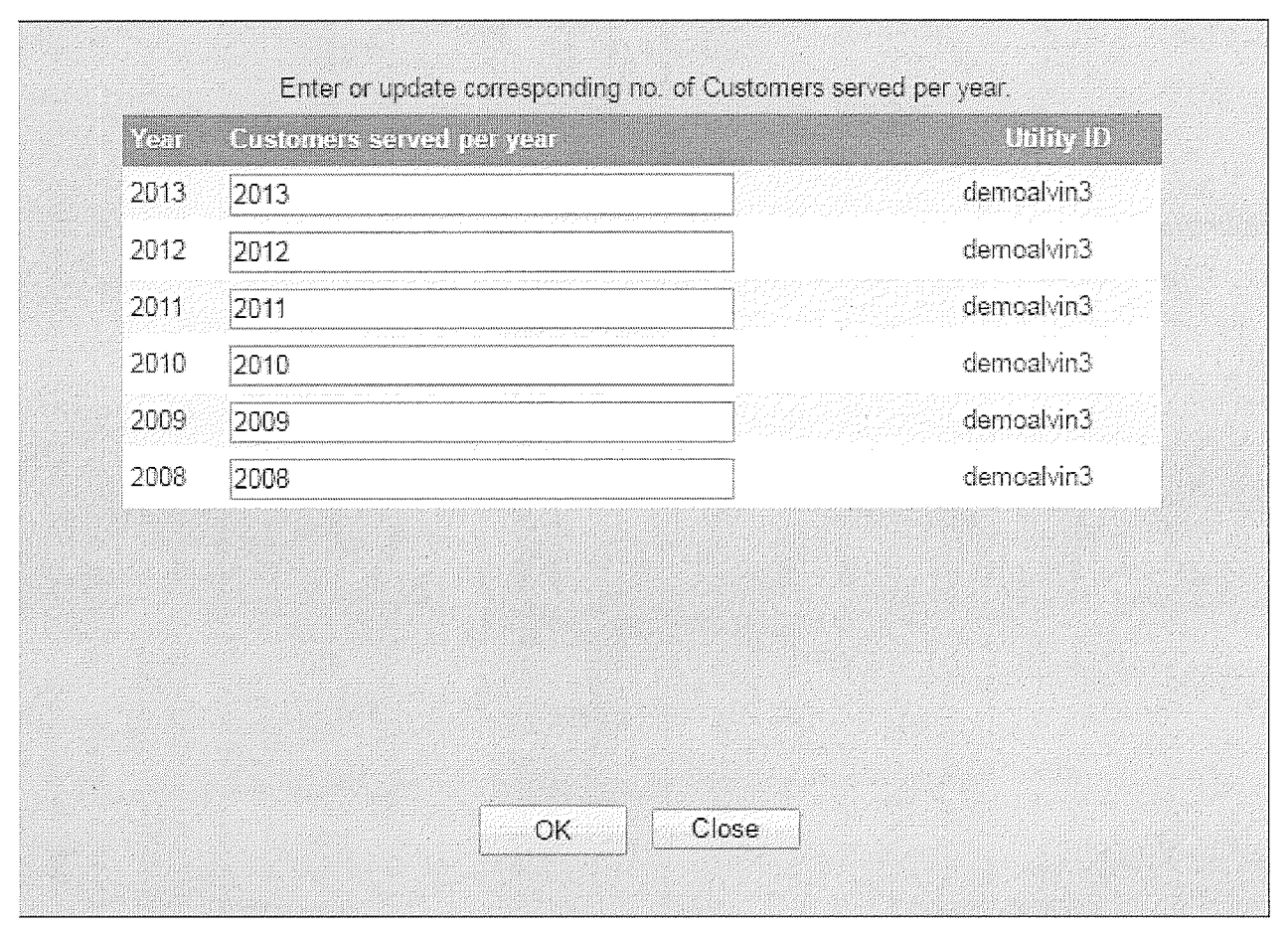

FIG. 10 shows an exemplary screen view for inputting the number of customers served per year from the imported file according to an exemplary embodiment. The exemplary screen may include a select worksheet dropdown menu 1000, select year column dropdown menu 1010, select no of customer column 1020 and manual entry button 1030 to import the number of customers served automatically from a utility worksheet or manually via keyboard data entry as shown in FIG. 11 exemplary screen 1100.

Figure 12:
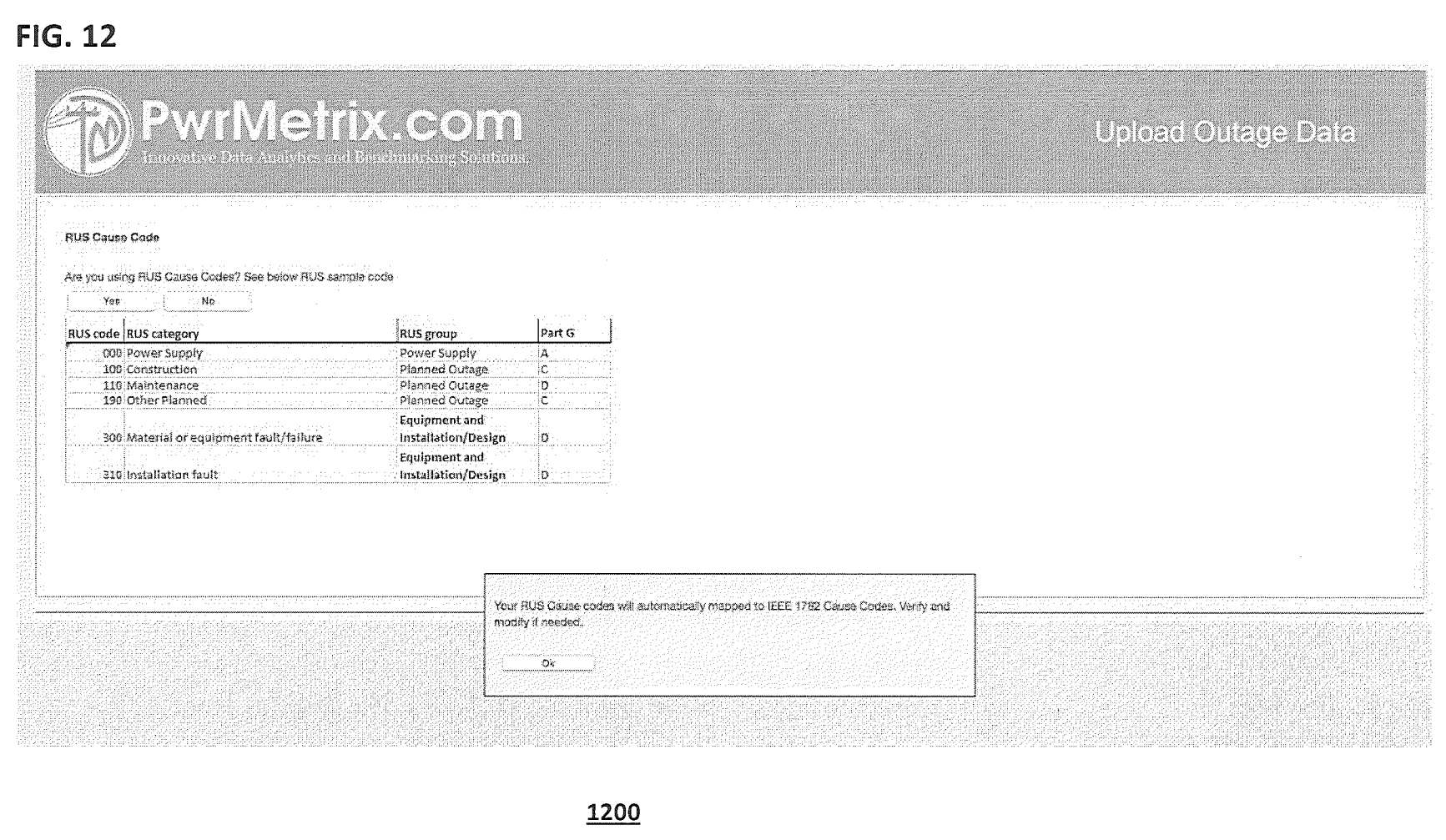

FIG. 12 shows an exemplary screen view 1200 of the automatic mapping of RUS (US Department of Agriculture Rural Utility Services) cause outage to the IEEE cause codes (used as a standardized codes when benchmarking utilities) according to an exemplary embodiment. This capability may be useful for cooperative (coop) utilities who use the RUS cause codes in their OMS. Using screen view 1200, users may automate the time consuming task of manually mapping the thousands of utility outage records one at a time. With this capability to globally tag or map thousands of outage records, the user may complete the IEEE cause code mapping in minutes instead of hours in a simple click of a button. IRDB automatically maps outage causes that conforms to the RUS cause codes indicated in RUS Bulletin 1730A, with the corresponding IEEE Interruption Categories indicated in IEEE Std. 1782-2014. The system classifies the outage cause of each record that it imports and tags it according to IEEE interruption categories. By using the IEEE interruption categories to identify the cause of outage, the system can generate benchmarking reports on utilities' outage records regardless of the differences in outage cause descriptions.

Figure 13:
FIG. 13 shows an exemplary screen view of the automated RUS to IEEE cause code mapping results as described in FIG. 12 according to an exemplary embodiment.

FIG. 13 shows an exemplary screen view 1300 of the automated RUS to IEEE cause code mapping results as described in FIG. 12 screen view 1200 according to an exemplary embodiment. Utility users may modify the mapping of cause codes in this screen view 1300 by clicking on the selections of IEEE cause code circular buttons; outage causes that do not conform to RUS 1730A and were not automatically mapped by the system must be manually classified into IEEE interruption categories so they will be correctly included in benchmarking reports. Once the IRDB tool has successfully imported the outage data and other required information in the web server database, the IRDB tool may use the IEEE 1366 (IEEE Guide for Electric Power Distribution Reliability Indices) Major Event Days (MED) 2.5 Beta calculation methodology to statistically calculate the reliability indices/metrics (SAIDI, SAIFI, CAIDI and more) and to produce the standardized and uniformly calculated reliability metrics for accurately benchmarking utilities. By using the IEEE 1366 standardized calculation, the IRDB tool may ensure that "apple to apple" comparisons are accurately accomplished to benchmark utilities of various sizes from all over the world. In addition, other indices such as ASAI (Average Service Availability Index—average availability of the sub transmission and distribution systems to serve customers. Ratio of the total customer minutes that service was available to the total customer minutes demanded in a time period), MAIFI (Momentary Average Interruption Frequency Index-tracks the average frequency of momentary interruptions or outages that last between 0 to 5 five minutes), and other indices/metrics can be easily calculated. In fact, the IRDB tool may have the flexibility to add future metrics by simply including the calculation equation in the IRDB tool code/algorithm.

The IRDB tool reliability indices calculation results may be saved in the web server in high level of details to allow flexibility in creating real-time access to the visual and tabular reports, and create powerful benchmarking customization results. Once the calculations are completed and results are saved in the real-time web server database, the reliability indices and reports can be accessed live by other IRDB tool users via the Benchmarking Menu 140 (see FIG. 2). This is an innovative capability of the IRDB tool which allows users to access real-time results/reports as new utility users enter their outage data from anywhere around the world via any web browser without having to wait months for the results. In the past, benchmarking utility participants must wait months (average of 5 to 6 months) before final results and reports are available, and any change in one of the participating utilities' data would require recalculation and re-processing of the entire results from scratch (which could take extra days or weeks). After the utility user has completed its task in FIG. 13 screen view 1300, the user may be directed back to the FIG. 1A screen view to see and access the main menu that contains all the various reports, tools and visualization.

Figure 14:
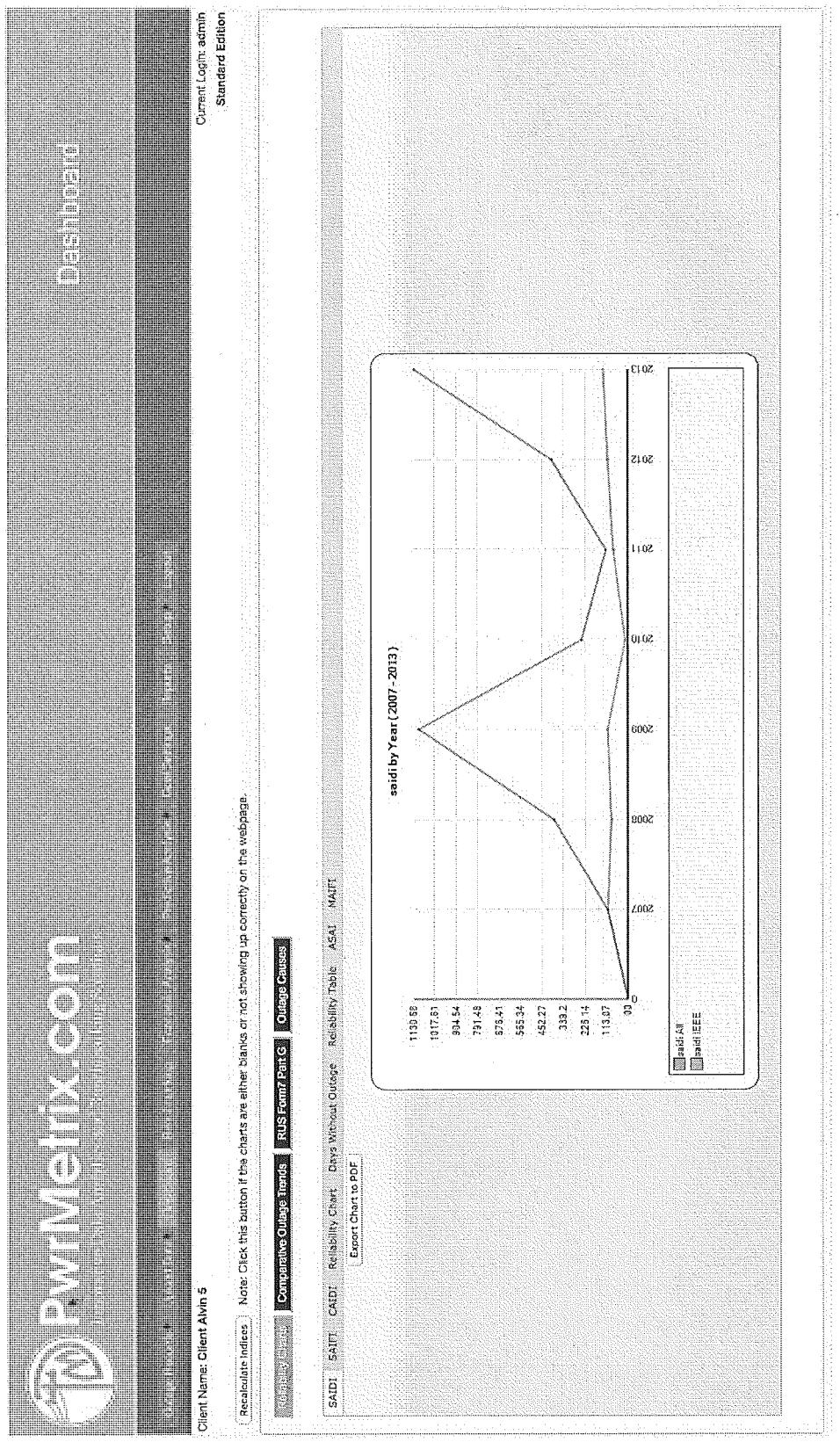
FIG. 14 shows an exemplary screen view of the RELIABILITY CHARTS subsection of Dashboard shown from FIG. 2.

FIG. 14 shows an exemplary screen view 1400 of the RELIABILITY CHARTS subsection of Dashboard 130 from FIG. 2. This can be described in FIG. 1's list of process as "2. Trending." After the user has imported the data, the yearly trends can be analyzed effectively by showing both visual graphs and figures. The exemplary screen view 1400 may include the tab sections called SAIDI, SAIFI, CAIDI, Reliability Chart, Days without outages, reliability table, ASAI and MAIFI. In particular, screen 1400 may show the yearly trends of the reliability indices/metrics tabs (SAIDI, SAIFI, CAIDI, ASAI and MAIFI).

Figure 15:
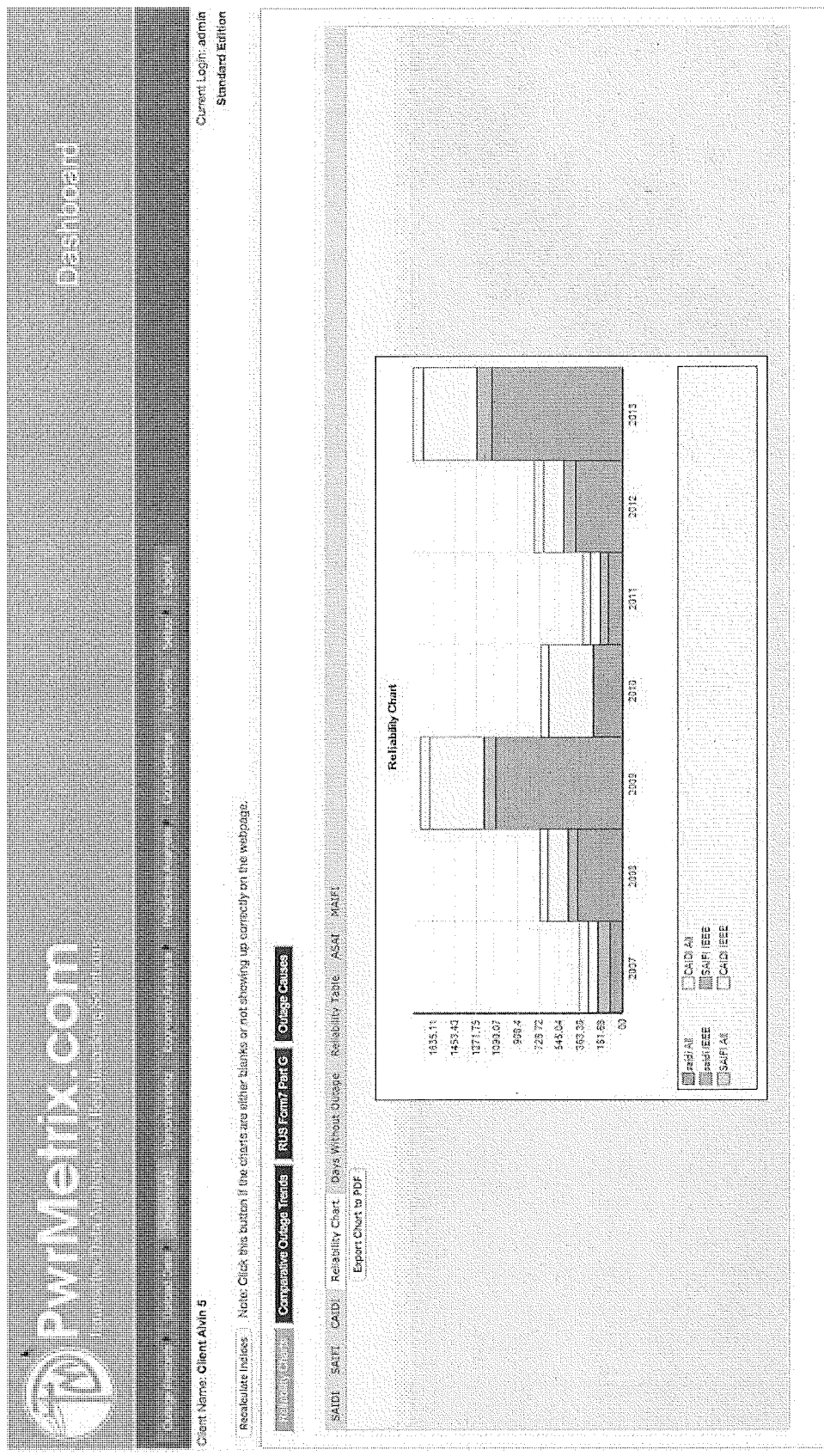
FIG. 15 shows an exemplary screen view of the Reliability Table tab containing the calculated reliability indices by year.

The Reliability Table tab, as shown in exemplary screen 1500 of FIG. 15, contains the calculated reliability indices by year. The metrics can be grouped by two categories: ALL (SAIDI ALL, SAIFI ALL, CAIDI ALL) where ALL outages are included in the calculations; and, by IEEE (SAIDI IEEE, SAIFI IEEE and CAIDI IEEE) where the MEDs (Major Event Days) are excluded from the calculations. MEDs can be considered as outages that can be studied separately from daily operation and, in the process, can reveal trends in daily operations that would be hidden by the large statistical effect of major events. In other words, MEDs are excluded when calculating SAIDI, SAIFI and CAIDI which leads to consistent results (SAIDI IEEE, SAIFI IEEE and CAIDI IEEE) regardless of utility size.

Figure 16:
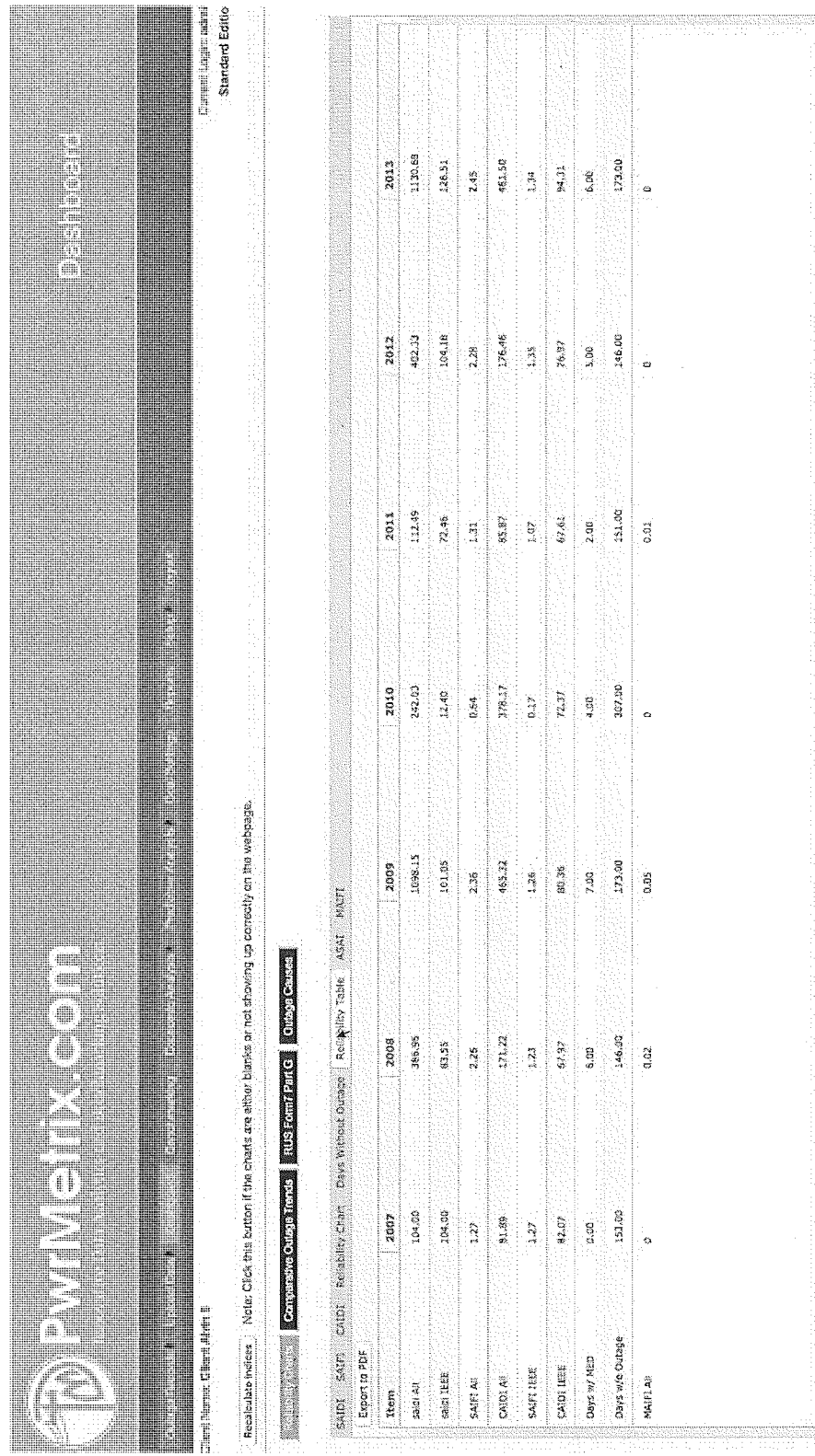
FIG. 16 shows an exemplary screen view of table detail for the Reliability Table tab under the subsection Reliability Charts, shown in FIG. 14, and main menu Dashboard from FIG. 2.

FIG. 16 shows an exemplary screen view 1600 of visual table detail for the Reliability Table tab under the subsection Reliability Charts, shown in FIG. 14 screen view 1400, and main menu Dashboard 130 from FIG. 2. Screen view 1600 of FIG. 16 may include the detailed calculated yearly trends of the SAIDI, SAIFI, and CAIDI for ALL and IEEE categories. The Days with MED, Days without Outage and MAIFI ALL may also be included to provide useful information for the utility user.

Figure 17:
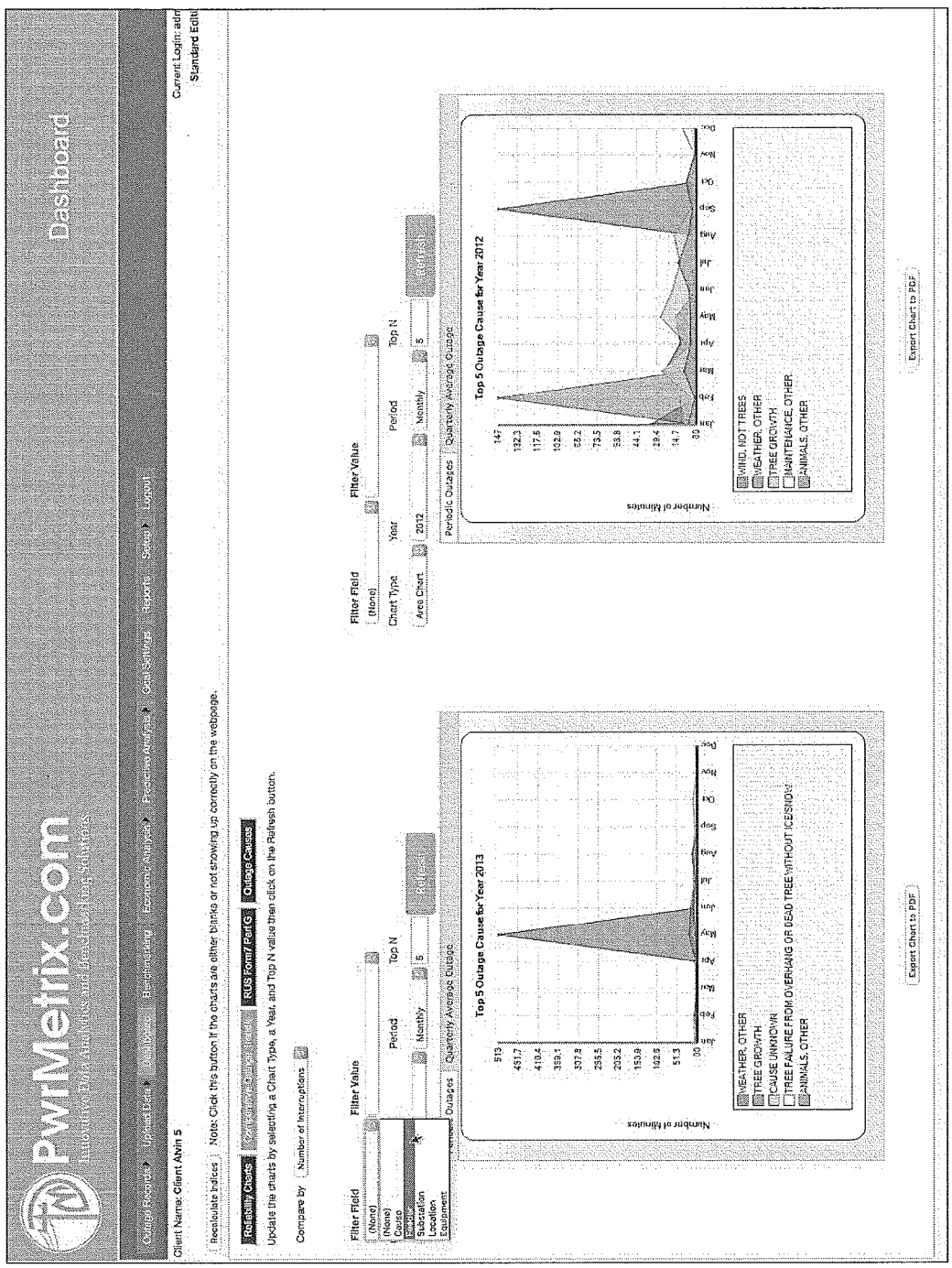
FIG. 17 shows an exemplary screen view of the COMPARATIVE OUTAGE TRENDS submenu shown under the Dashboard main menu shown in FIG. 2.

FIG. 17 shows an exemplary screen view 1700 of the COMPARATIVE OUTAGE TRENDS to visualize the top 5 outage cause by year, month, and quarter on, for example, an area, line, or stack column chart 1710, 1712 by, for example, number of interruptions or number of outage minutes. The IRDB tool may include an innovative, powerful and flexible visualization and comparison tool that allows utilities to quickly display, compare and analyze two different years or two different event side by side. Utility may compare top causes by number of outage duration or interruption frequency and may see hidden trends that utility may unable to see from the regular reports. This visualization tool may allow the utility to create quick solutions and strategies to focus on certain areas (e.g. substation, feeder etc.) of the power system and to immediately create impactful results for improving the reliability of the utility's power system without spending hours or days.

FIG. 18 shows an exemplary screen view 1800 of the RUS FORM7 Part G table results shown under the Dashboard main menu 130 of FIG. 2 for showing the yearly trends of SAIDI results and grouped by Power Supply, MED, Planned, All other and Total.

Figure 19:
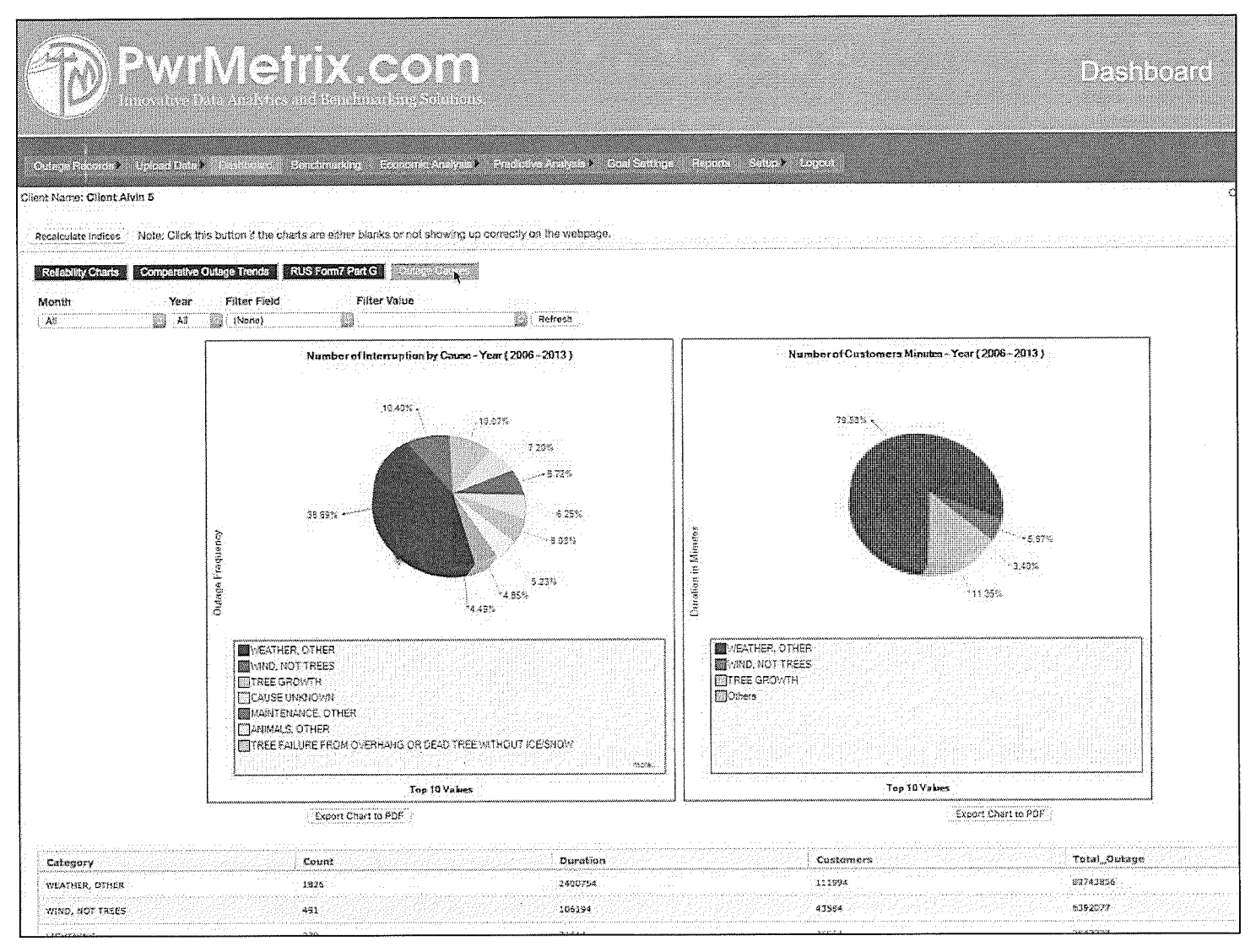

FIG. 19 shows an exemplary screen view 1900 of the OUTAGE CAUSES shown under the Dashboard main menu 130 of FIG. 2. The IRDB tool may include this capability to visualize the PIE charts for the number of interruption and duration minutes by type of outage cause, filter by year and month, discover the types of outages that are causing issues on the utility's system, and scroll down the webpage and view the actual breakdown of outage minutes, interruption and customers affected by each outage type. In addition, this screen view 1900 may include the unique capability to drill-down to the various components of the power system such as substation, feeder, location, devices, and more.

FIG. 20 shows an exemplary screen view 2000 of the Reporting Filtering Criteria tab located below United States submenu and shown under the Benchmarking main menu 140 of FIG. 2. The IRDB tool may include a Filter Utilize Size 2010 to allow utility to compare itself with other utilities with similar size (e.g. numbers of meters served) and to focus on learning about the reliability of similar size utilities. Utility user may also filter the U.S. benchmarking results by region (Midwest, northeast, south and west) or by type of utility (IOU Investor owned utility, Cooperative or Municipality). In addition, the IRDB tool may include a selection of useful reports and tools 2020 for showing the comparison graphs and tables. These graphs and reports may include important information such as calculated quartile numbers of the entire benchmarking groups, and the quartile rank of the utility versus the entire group. In addition, another innovative component that may be added in the IRDB tool is the ability to perform gap analysis (learn the attributes of the best ranked utilities) and to contact the best ranked utilities or any other utility directly from the reporting tool.

FIG. 20E shows an exemplary screen view 2012 showing the "Contact Top Benchmarking Utilities" button 2011 that may add the capability for the user to show a list of the top ranking utilities and provide a way for the user to connect directly to any of selected top ranking utilities from the report list.

FIG. 20F shows an exemplary screen view 2014 showing the TOP 20 utility list 2013 that may appear after clicking the 2011 "Contact Top Benchmarking Utilities" button 2011 FIG. 20E. For example, by clicking the "Client No#1078" row, the IRDB tool may automatically direct the user to the IRDB tool messaging system.

Figure 20G:
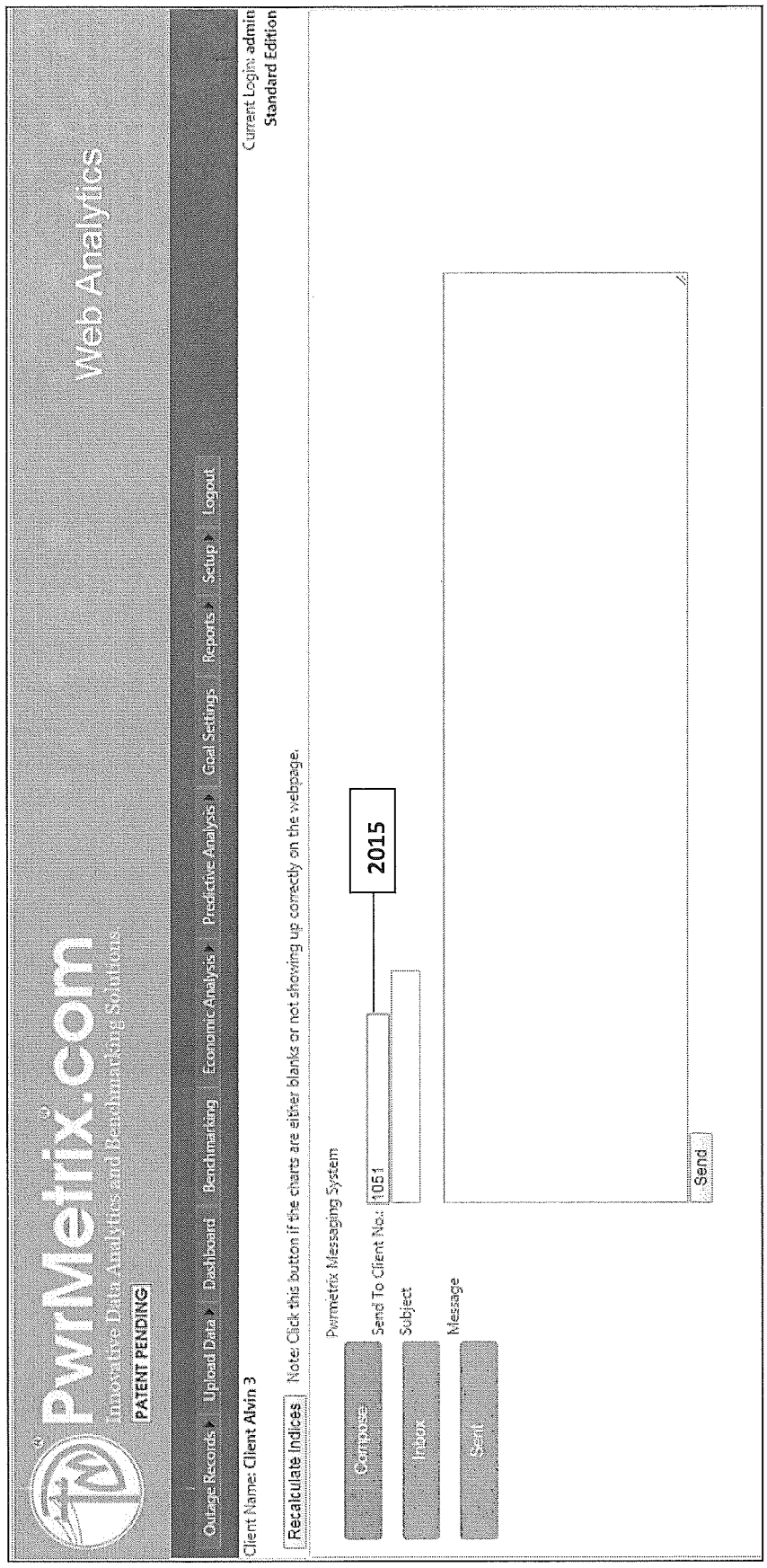
FIG. 20G shows an exemplary screen view of the "Messaging System".

FIG. 20G shows an exemplary screen view 2016 of the "Messaging System". This may appear after the user clicked the "Client No#1078" from FIG. 20E. The anonymous "client no=1078", displayed in a client member field 2015, may be contacted by the user with a "subject" and "message" fields that can be customized. The "send" button may be included such that when the user clicks this button, the message is send to client no 1078 (utility ID 1078). This may allow utilities to contact anonymous top ranking reliability utilities worldwide while still maintaining the anonymity of all the benchmarking participants. With this unique capability, utilities are more likely willing to join the worldwide benchmarking collaboration via the IRDB tool because anonymity and data confidentially are kept secured.

Figure 21:
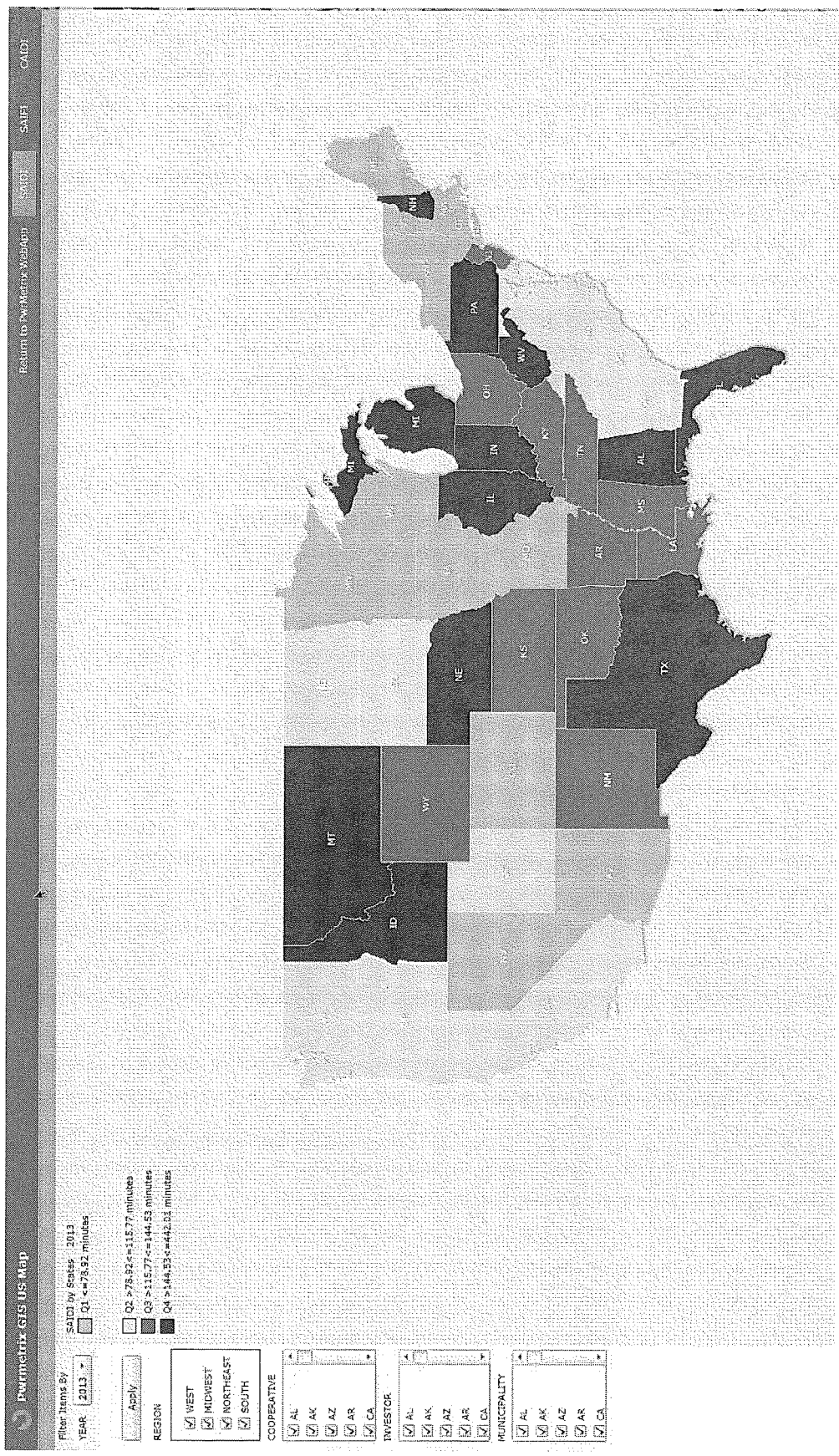
FIG. 21 shows an exemplary screen view of the GIS US Map.

FIG. 21 shows an exemplary screen view 2100 of the GIS US Map of reliability rankings. The IRDB tool may display screen view 2100 when the GIS Map button is activated from screen view 2020 in FIG. 20. The exemplary screen view 2100 shows the various states in different colors based on the SAIDI quartile score by state. This may provide the utility user an innovative GIS visualization tool to see how each state is compared to others by SAIDI, SAIFI or CAIDI—the higher the SAIDI IEEE number, the worse the reliability ranking. The IRDB tool may include the ability to view the map of 50 U.S. states color coded based on reliability quartile ranges, to see which states belong to 1st, 2nd, 3rd and 4th quartile, to hover mouse over the state and see the number of utilities and the mean SAIDI, SAIFI or CAIDI on that state. The IRDB tool may also include the capability to drill in and zoom-in the state and utility territory level. In essence, the invention may have the capability to include a GIS outage view section that allows viewing the aggregated outages by utility, state, region, territory or entire country. This may provide a powerful capability to view the outages in a time series (minute to minute, hour to hour, day to day etc.) in the entire U.S consisting of potentially thousands of utilities.

Figure 22:
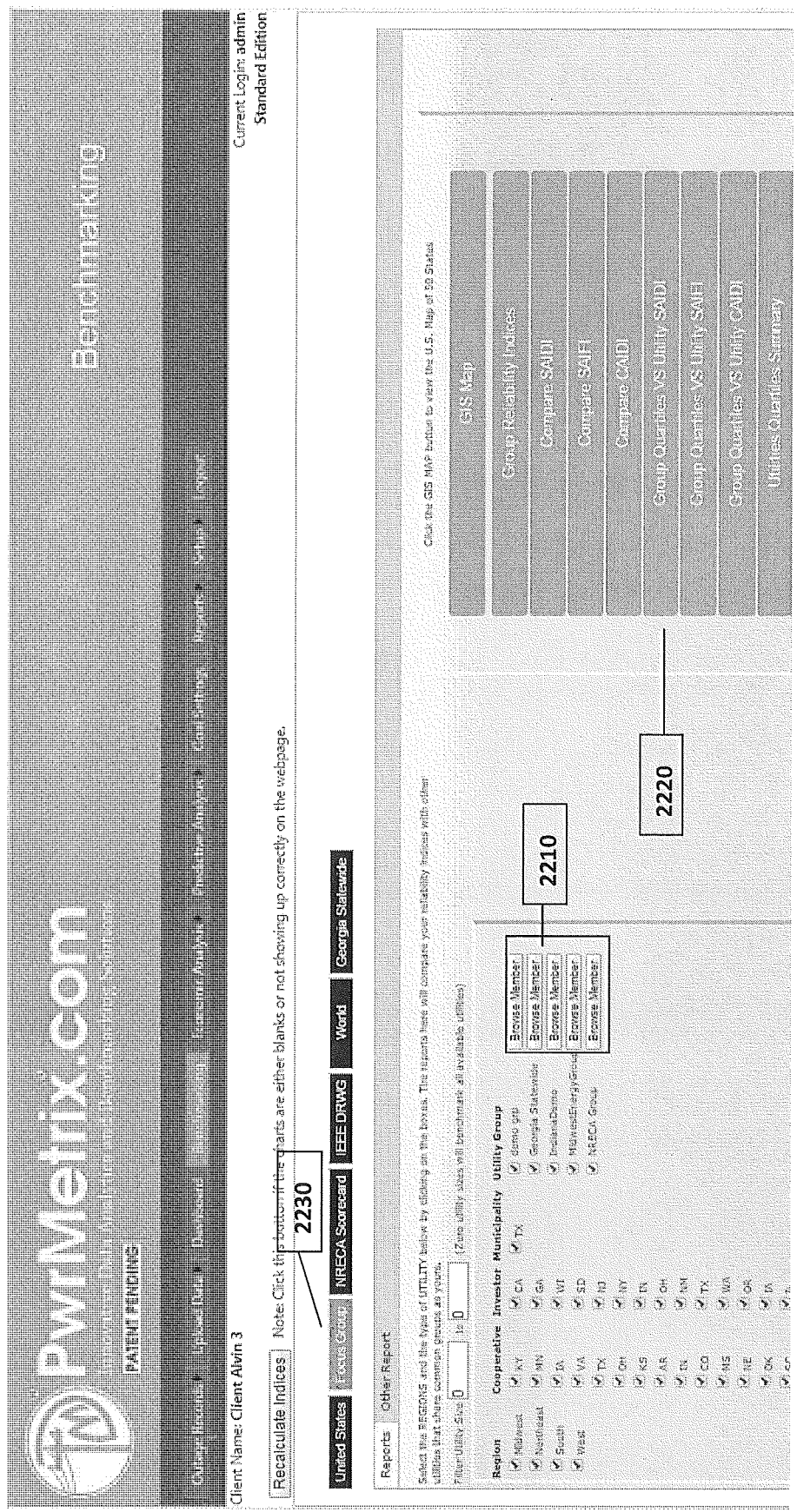
FIG. 22 shows an exemplary screen view of the Reports tab/Focus Group submenu shown under the Benchmarking main menu FIG. 2.

FIG. 22 shows an exemplary screen view 2200 of the Reports tab/Focus Group submenu 2230 as referred to under the Benchmarking main menu 140 FIG. 2. The IRDB tool may include the capability for utility users to create utility-own customized benchmarking group by inviting other IRDB tool utility users within the IRDB tool's built-in social messaging system (SMS). For example, invite other utilities that are within the same state to create a statewide benchmarking group, or invite other utilities from various states with similar characteristics (size, region, overhead lines, density etc.) to form multi-state focus group. In addition, the exemplary screen 2200 may include a selection of useful and powerful reports and tools 2020 for showing the comparison graphs and tables.

Figure 22A:
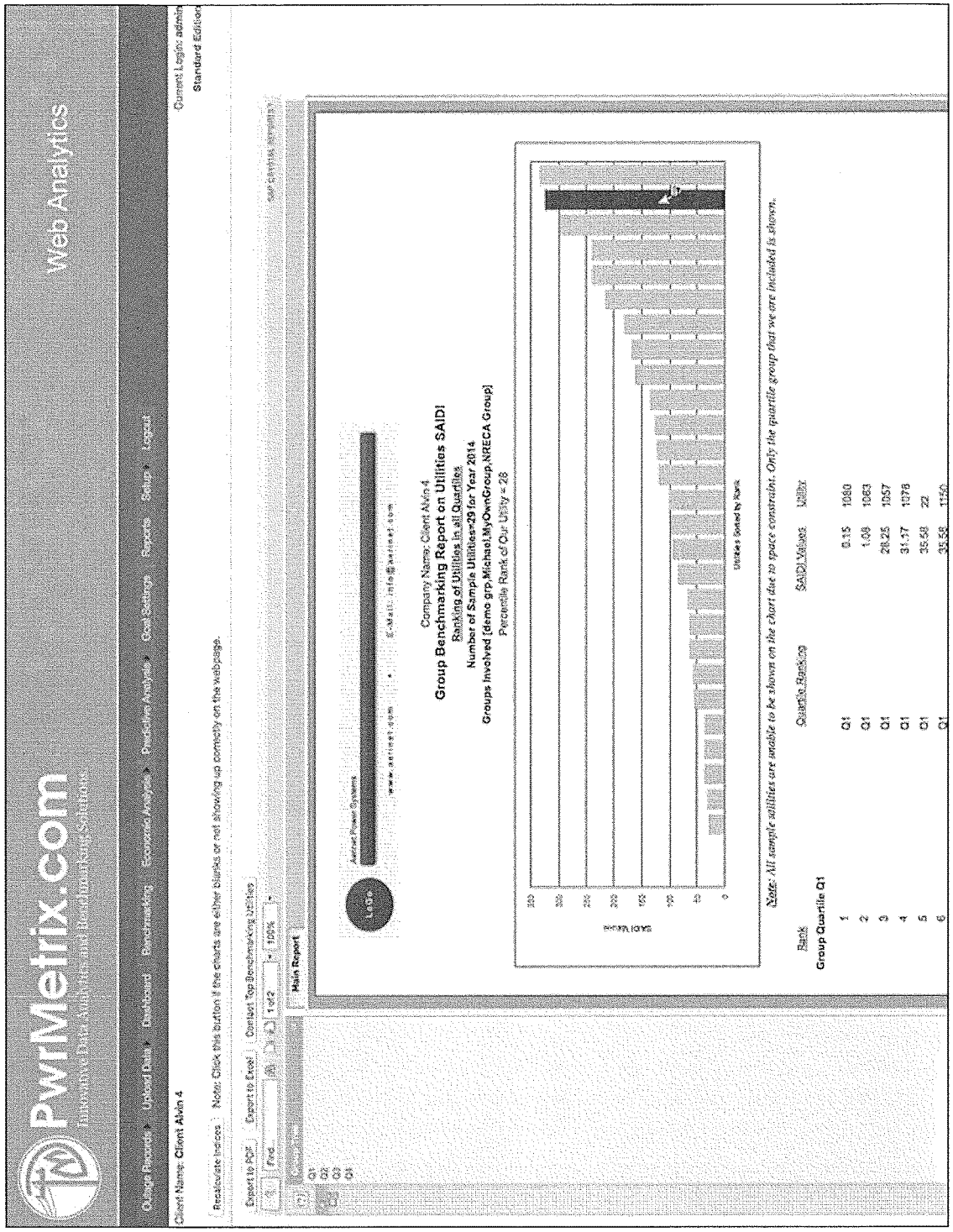
FIG. 22A shows an exemplary screen view of a group benchmarking report showing utility rankings.
Figure 22B:
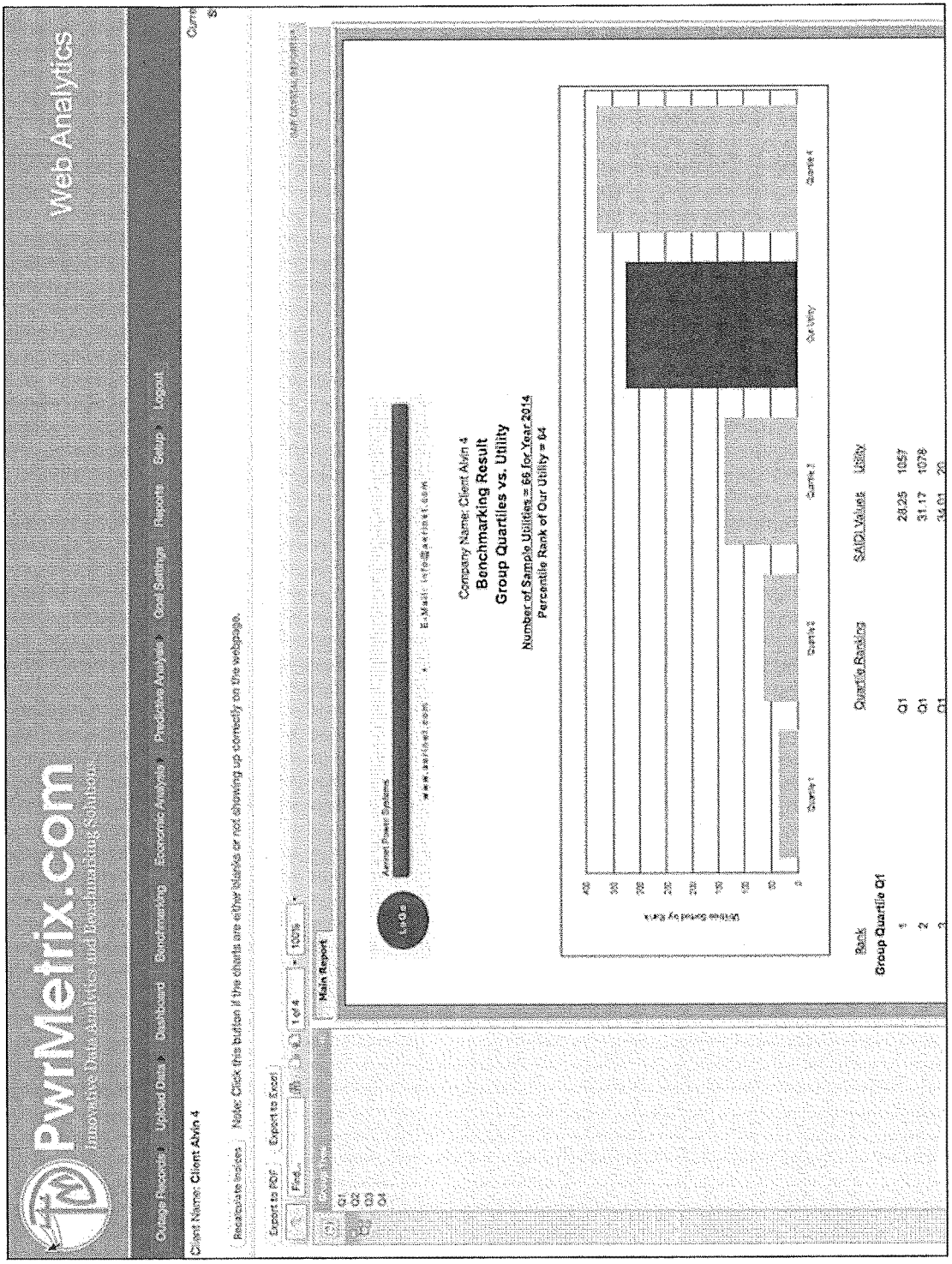
FIG. 22B shows and exemplary screen view of a benchmark report of group quantities v. utilities.
Figure 22C:
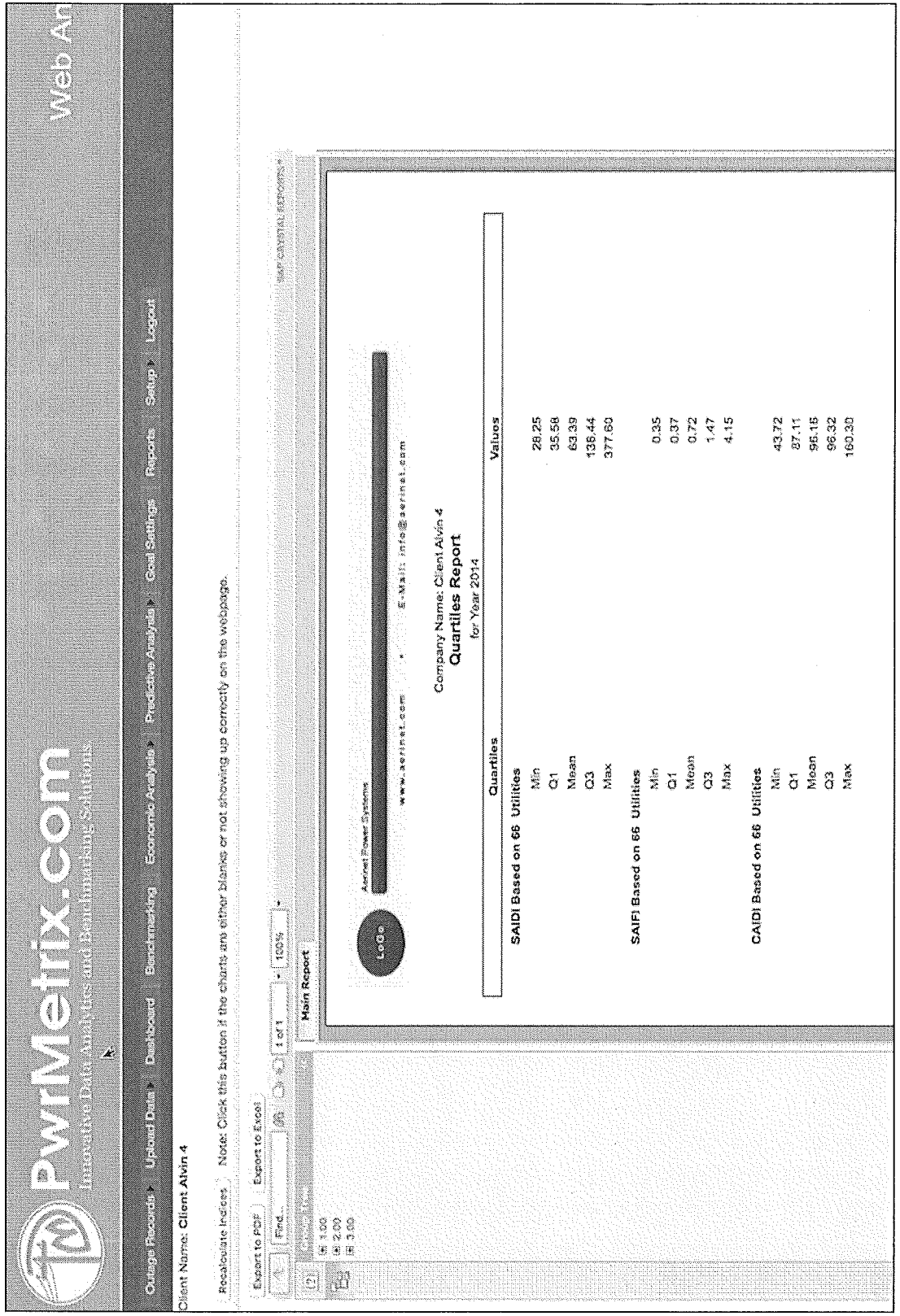
FIG. 22C shows and exemplary screen view of a quartile report.

FIG. 22A, FIG. 22B, and FIG. 22C show exemplary screen views of the types of benchmarking reports that may be produced from the FIG. 22 screen view 2200.

Figure 23:
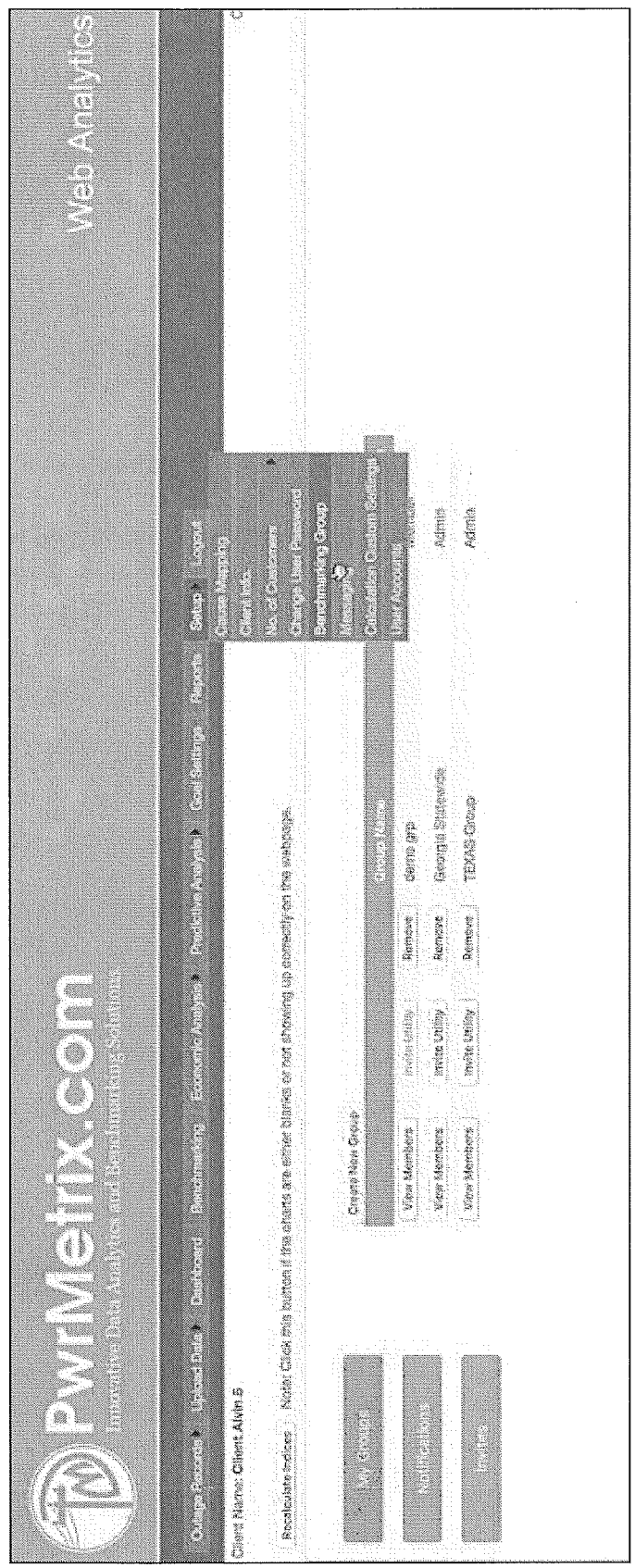
FIG. 23 shows an exemplary screen view of the Benchmarking Group submenu under Setup main menu FIG. 2 for setting up a New Focus Group.

FIG. 23 shows an exemplary screen view 2300 of the Benchmarking Group submenu under Setup main menu 190 FIG. 2 for setting up a New Focus Group. The exemplary screen view 2300 may add the capability to have a "Create New Group" button and create customized focus group.

Figure 24:
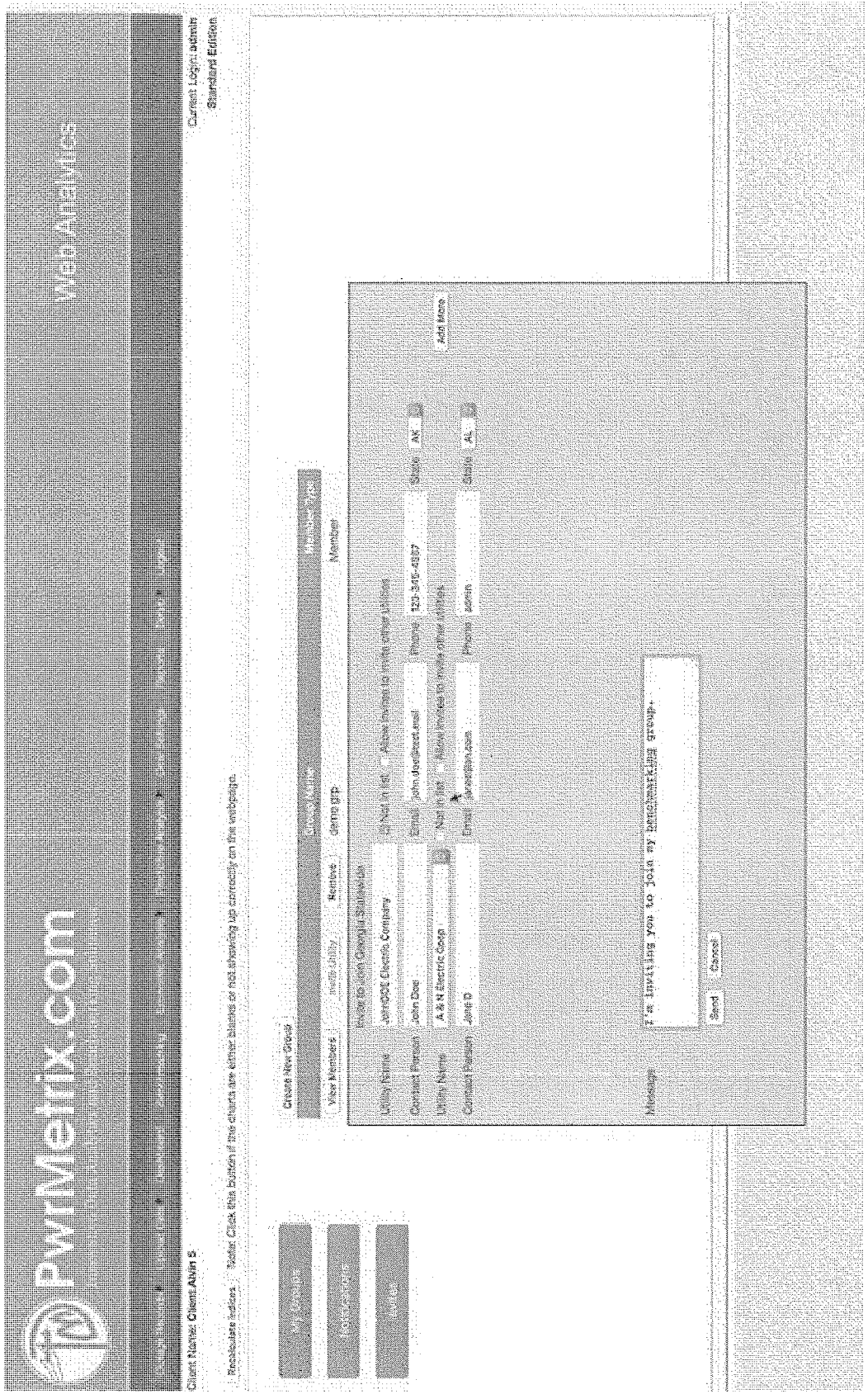
FIG. 24 shows an exemplary screen view of the Benchmarking Group submenu under Setup main menu FIG. 2 for inviting other utilities to join a New Focus Group created in FIG. 23.

FIG. 24 shows an exemplary screen view 2400 of the Benchmarking Group submenu under Setup main menu 190 FIG. 2 for inviting other utilities to join a New Focus Group created in FIG. 23 screen view 2300. The IRDB tool may include the ability to invite multiple utilities via the SMS by either selecting from a dropdown menu or manually typing the utility information on the screen view 2400 form. In addition, the IRDB tool may include an option to allow invitee to invite other utilities. This provides the unique capability for users to invite existing multiple IRDB tool users to join the focus group or invite multiple non-IRDB tool users with a click of a button. For non-IRDB tool users, the email information, name, utility name and other important information may be required to be entered and the IRDB tool automatically emails the list with the user's customized message and IRDB tool login credentials required to access the system. Consequently, this unique intrinsic messaging SMS capability may result in spreading the invitation exponentially and potentially attracting higher number of utility participants.

Figure 25:
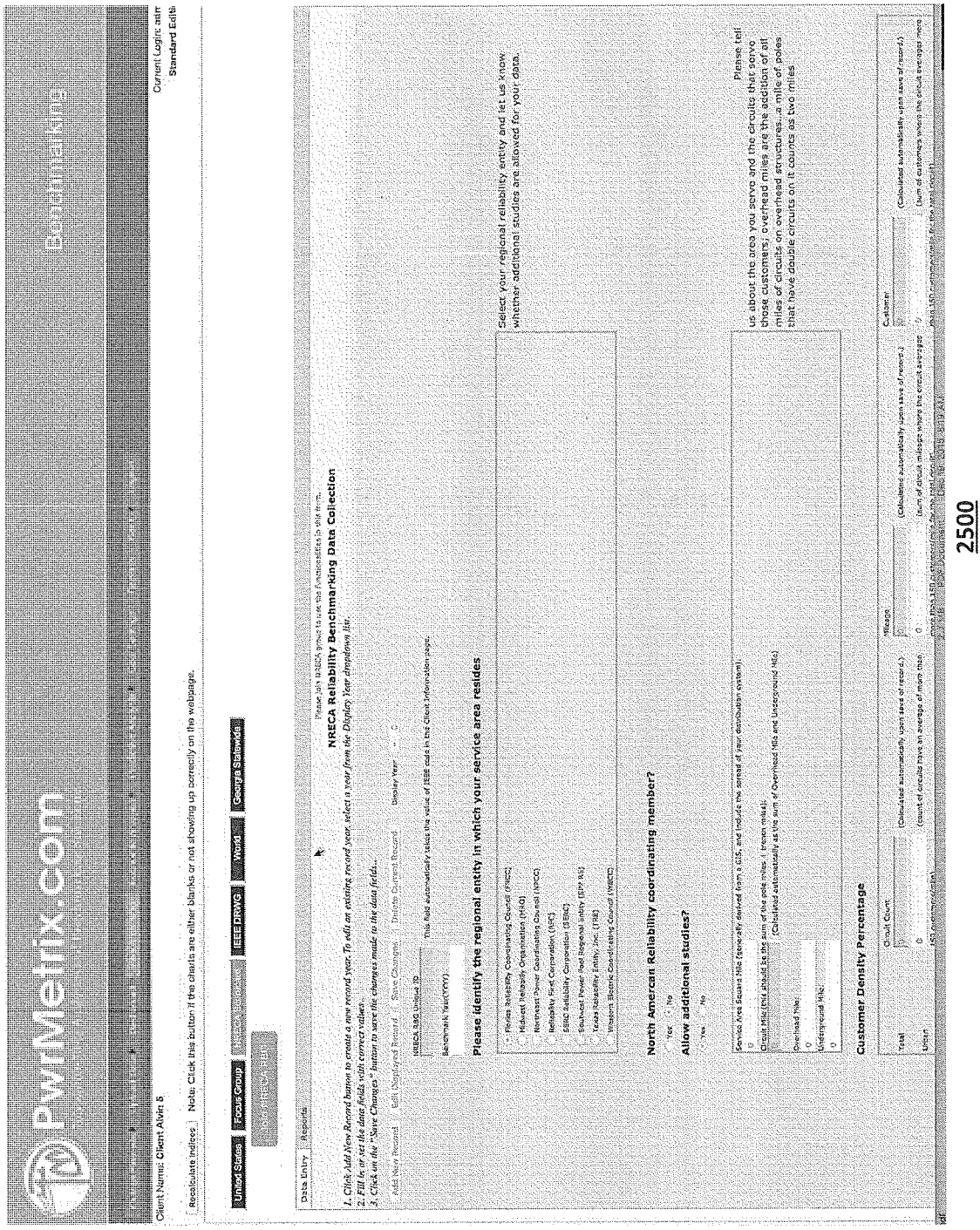
FIG. 25 shows an exemplary screen view of the NRECA Scorecard submenu under Benchmarking main menu FIG. 2.

FIG. 25 shows an exemplary screen view 2500 of the NRECA Scorecard submenu under Benchmarking main menu 140 of FIG. 2 for providing customized benchmarking for the 700 plus electric utility cooperatives in the U.S. The IRDB tool may include the various components such as reports and customized data entry for the real-time benchmarking solution.

Figure 26:
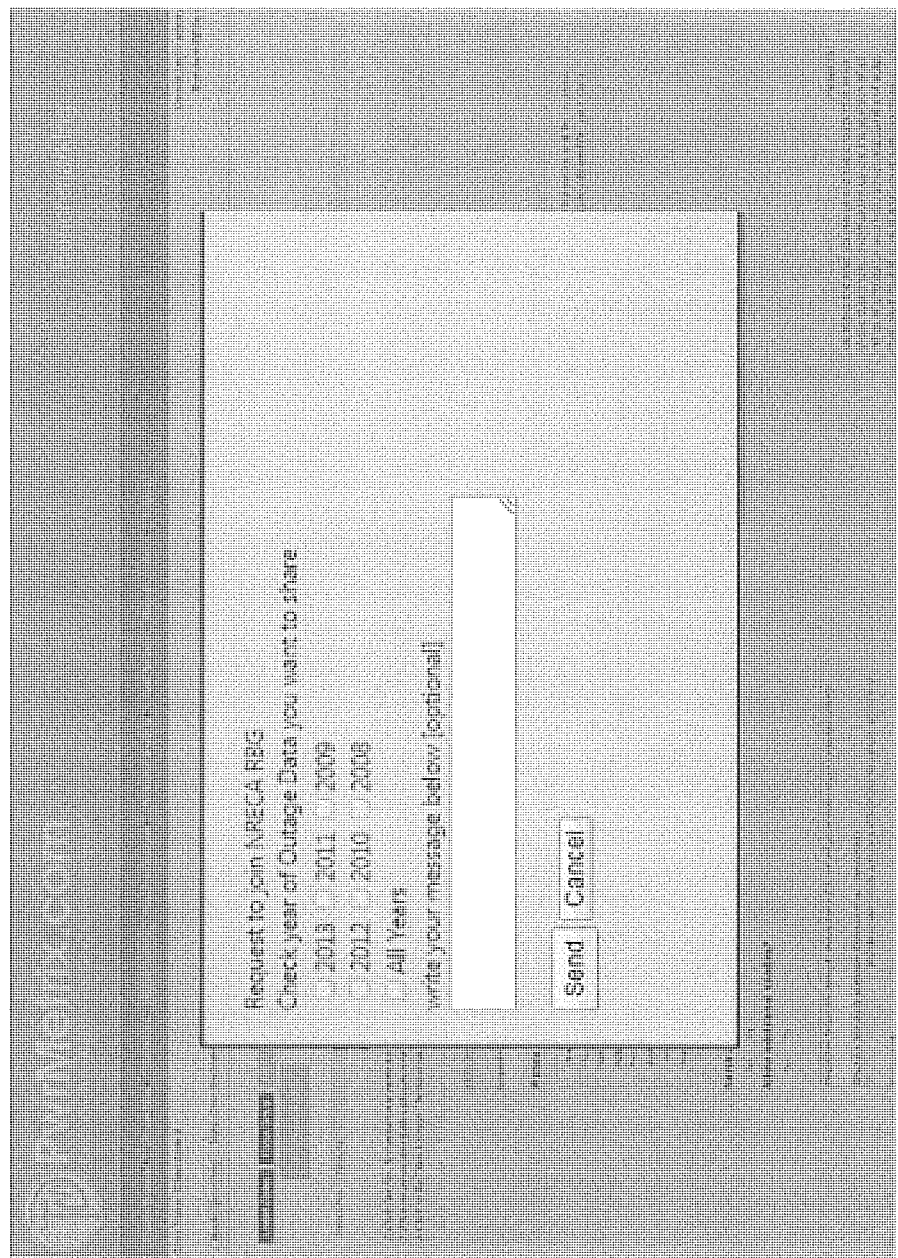
FIG. 26 shows an exemplary screen view of the NRECA Scorecard submenu under Benchmarking main menu FIG. 2.

FIG. 26 shows an exemplary screen view 2600 of the NRECA Scorecard submenu under Benchmarking main menu 140 of FIG. 2 for requesting to join the NRECA Reliability Benchmarking Group (RBG) by sharing the list of outage years. The IRDB tool may include the capability to join in the NRECA RBG in real-time in a matter of minutes instead of hours or days by sending the request to the NRECA RBG IRDB tool administrator (IRDB tool Enterprise Edition). The IRDB tool may be provided with 3 types of licenses (group featured capabilities): Standard edition (single utility user); Enterprise Edition (large organizations such as NRECA that allows the administrator to see multiple utility outage data in one GUI graphic user interface web page); and finally, the Platinum Edition (designed for Continent level such as Europe that can view multiple Enterprise Edition). Once the user completes the join request, the IRDB tool may include the ability for the NRECA administrator, using the Enterprise Edition, to view the incoming request in real-time. The IRDB tool may automatically tag selected years of outage records (in the master database) that the requesting user wish to share with the NRECA RBG. By simply tagging years of outage records instead of creating another set of copy for thousands of records, the processing time may decrease from few minutes to less than 10 seconds. This innovative approach may allow the same user to share the same outage records to multiple number of benchmarking groups in seconds, thereby, allowing the user to join numerous benchmarking groups in seconds instead of days or months. As soon as the utility data is shared to its benchmarking group, these data immediately become available for use in benchmarking reports which are also accessible to other members of the group. Furthermore, with Platinum group, the shared data also becomes available to other enterprise groups under it, and thus to the enterprise utility members. This makes the sharing of data among utilities real-time and very fast regardless of their geographical locations.

Figure 26A:
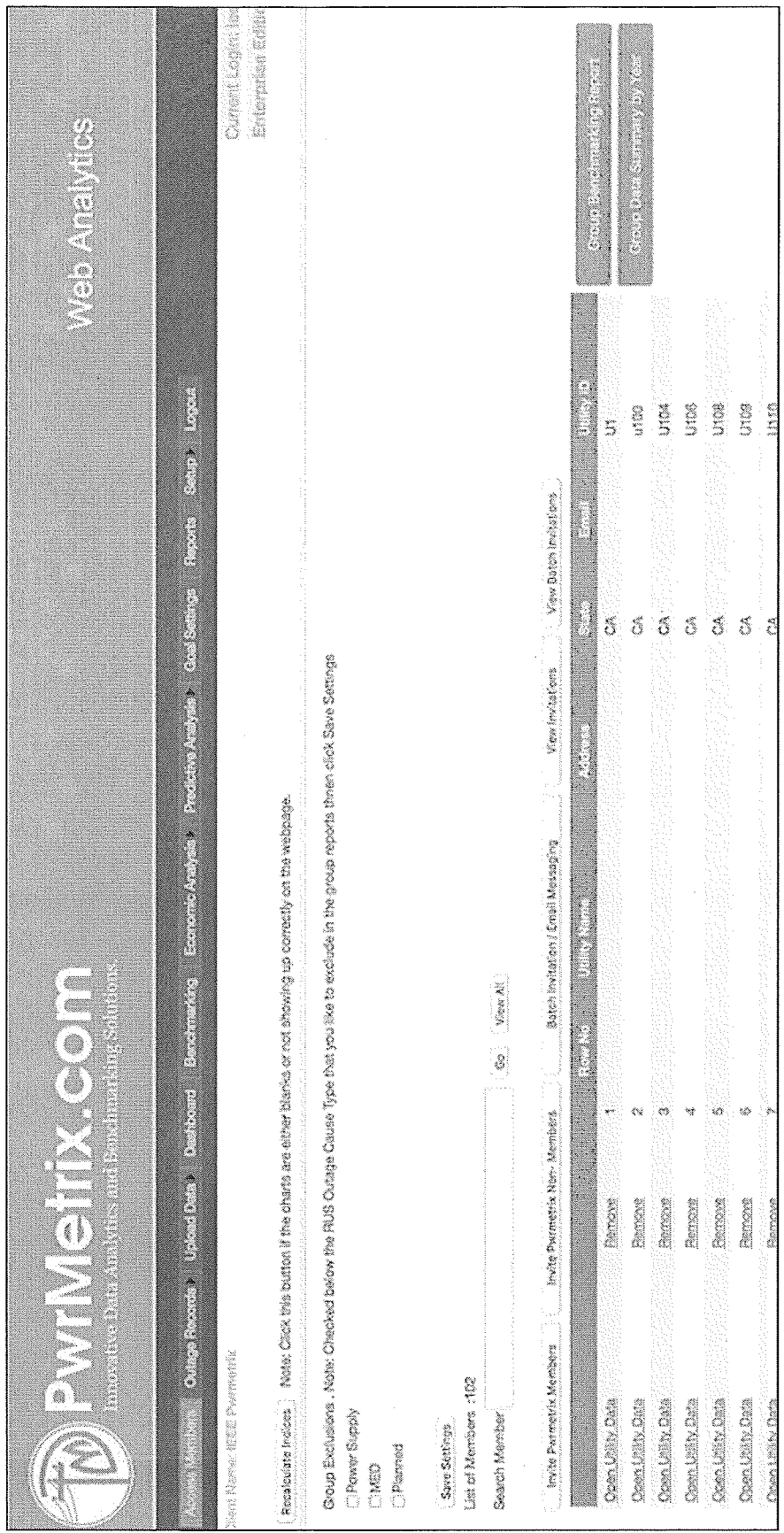
FIG. 26A shows an exemplary screen view of an Enterprise Edition of the IRDB tool.
Figure 26B:
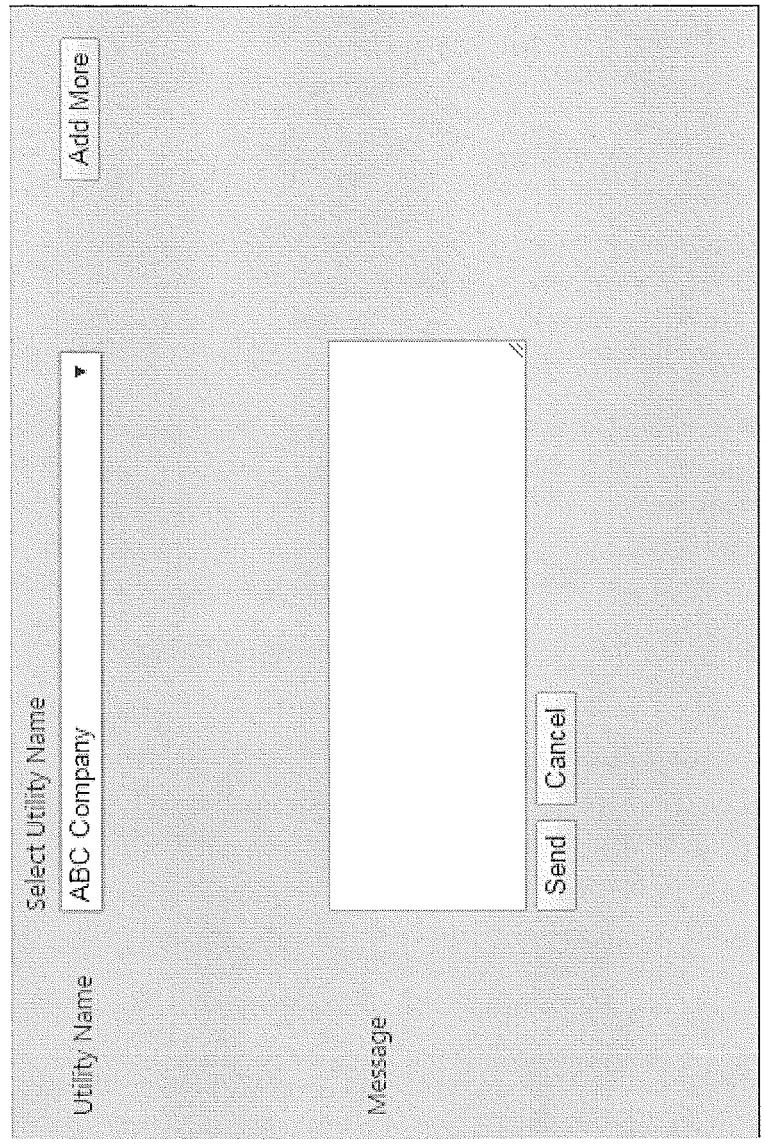
FIG. 26B shows an exemplary screen view for inviting member utilities to a group.
Figure 26C:
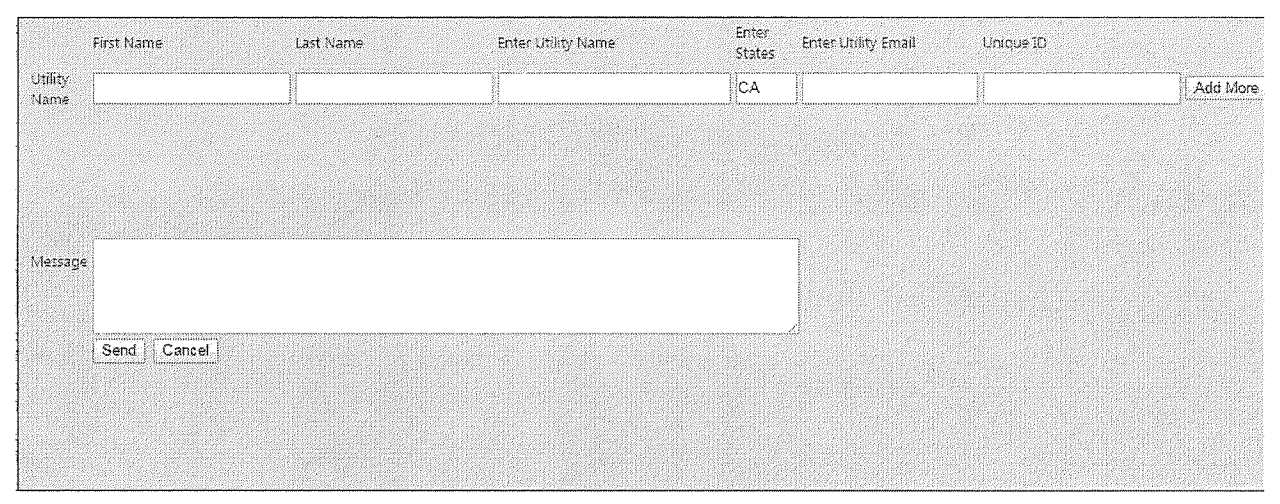

FIG. 26A shows an exemplary screen view the Enterprise Edition of the IRDB tool. The invention may add the capability for the Enterprise administrator to view incoming requests and also accept user's requests to join the benchmarking group by clicking on the accept button as shown in the bottom left corner of FIG. 26A. The IRDB tool Enterprise Edition may include advance capabilities such as viewing the detailed outage of the various utility participants by clicking on the "Open Utility Data", Inviting other utilities is as easy as clicking a button to invite individually those who already have accounts in the system and by selecting the utility names from the list that the system will display as in FIG. 26B. Inviting utilities that do not have accounts in the IRDB system can also be done by clicking the invitation button for Non-member then adding the contact information and identification of utilities as in FIG. 26C. Batch invitation of utilities regardless if they have IRDB accounts or not can also be done by clicking the button for Batch Invitation to bring up a form as shown in FIG. 26D, this takes in an Excel file as a source of utilities' identification and contact information for which new accounts will be created if the utility is not yet a member, otherwise, an existing login credentials will be sent in email to the utility if it already has an account in IRDB tool. Advance reports such as Group Data Summary by Year and Group Benchmarking Report as shown in FIG. 26E can be added to the IRDB Tool to show a quick summary of the members' reliability indices and data status.

Figure 27:
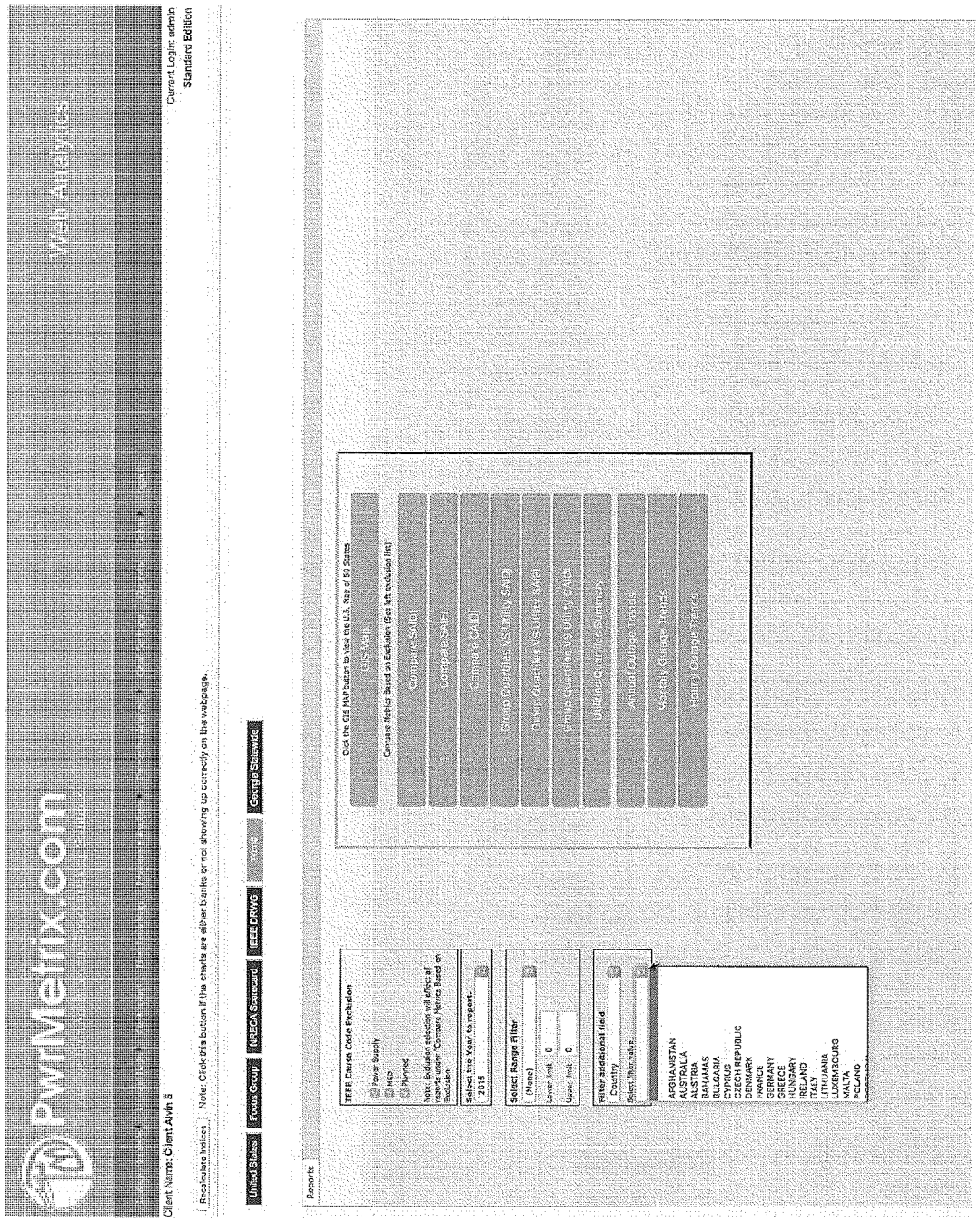
FIG. 27 shows an exemplary screen view of the World benchmarking submenu under Benchmarking main menu FIG. 2.

FIG. 27 shows an exemplary screen view 2700 of the World benchmarking submenu shown under Benchmarking main menu 140 of FIG. 2 for providing customized benchmarking for the countries globally (country level benchmarking). The IRDB tool may include the various components such as cause code exclusion, custom filter, reports and customized data entry for the real-time benchmarking solution. The system may provide a unique opportunity for countries worldwide to benchmark the reliability metrics in real-time and through a standardized process, thus, providing accurate comparison and real-time results. The system may include the ability to modify the Benchmarking calculation methodology on the fly (real-time) without the need to recalculate all the metrics from hundreds or thousands of participating utilities. This may be possible by adding the "IEEE Cause Code Exclusion" selection menu consisting of "Power Supply, MED and Planned" outages as shown in FIG. 27. The user may select which types of outages is/are excluded from calculating the reliability indices (SAIDI, SAIFI and CAIDI). If the user selects the "Power Supply and MED" to be excluded, the IRDB tool may set its internal settings to show the calculated metrics based on the exclusion criteria. This may become possible by grouping and saving the calculated indices into "Power Supply, MED, Planned and Total outages" in the IRDB tool database during the importing stage (1. Importing) as shown in FIG. 1. The aforementioned method may allow the user a unique ability to rank and list the entire benchmarking group (e.g. may compose of hundreds or thousands of utilities) based on the user's preferences/criteria. Presently, this real-time capability to exclude outage types is unavailable in existing systems. FIG. 27 may also include additional filtering abilities such as year to report, country, continent and more. The invention may have flexibility to filter by any column or fields (e.g. revenue, rates, customers, and more) imported into the IRDB tool database. The IRDB tool may include a GIS Map button to show a visual representation of the world map color coded by reliability ranking, and numerous detailed reports such as: compare SAIDI, SAIFI and CAIDI; group quartiles vs utility SAIDI, SAIFI and CAIDI; utilities quartile summary; and annual, monthly and hourly outage trends.

Figure 28:
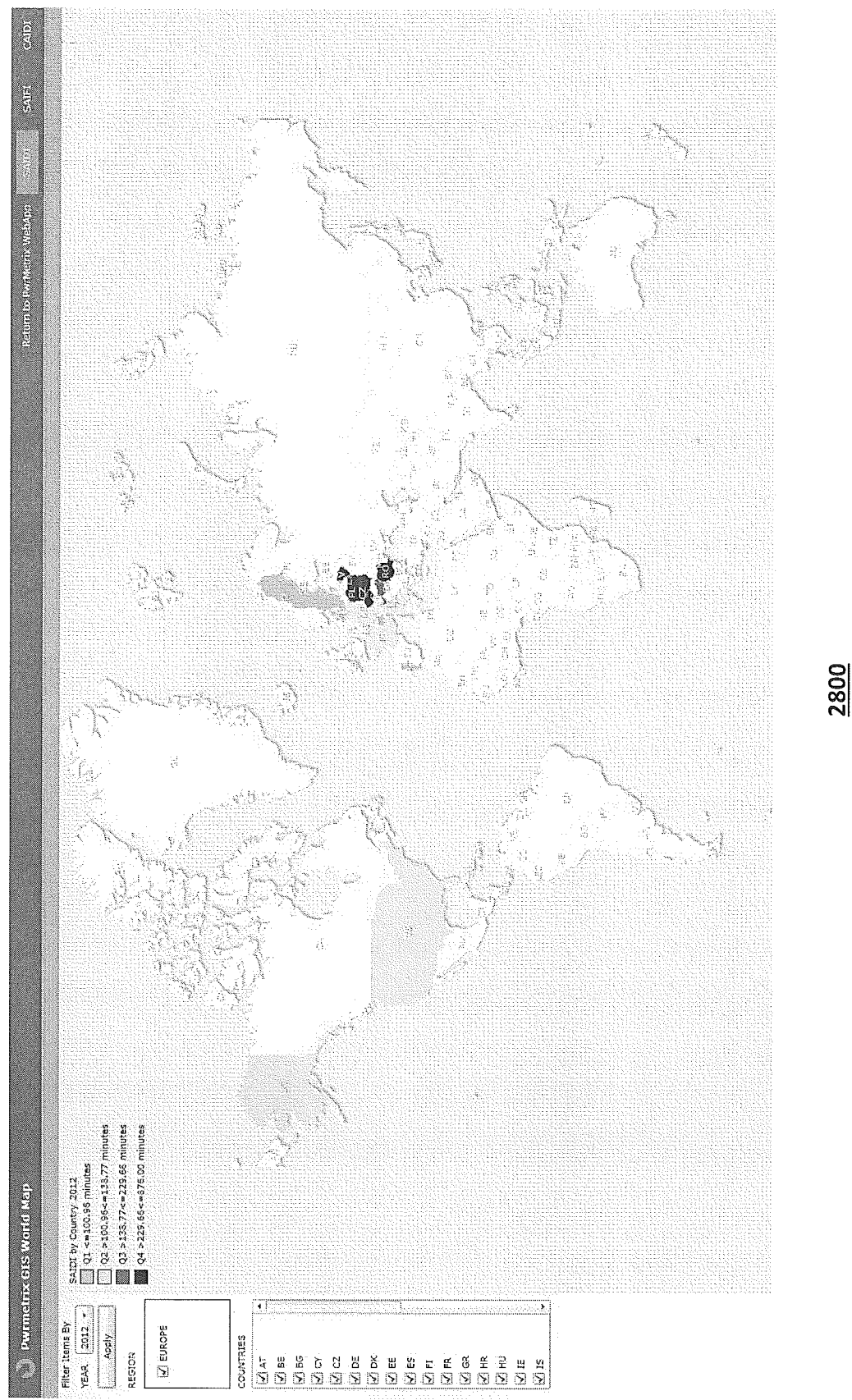
FIG. 28 shows an exemplary screen view of the GIS world Map as part of the world benchmarking submenu under Benchmarking main menu FIG. 2.

FIG. 28 shows an exemplary screen view 2800 of the GIS world Map as part of the world benchmarking submenu under Benchmarking main menu 140 of FIG. 2. The IRDB tool may include advance visualization to view the reliability ranking of all countries around the world. The invention may include the ability to exclude or include countries by clicking on the country list located on the left side of FIG. 28. The user may also zoom in and out of the GIS map and show the GIS map based on the SAIDI, SAIFI or CAIDI rankings.

Figure 29:
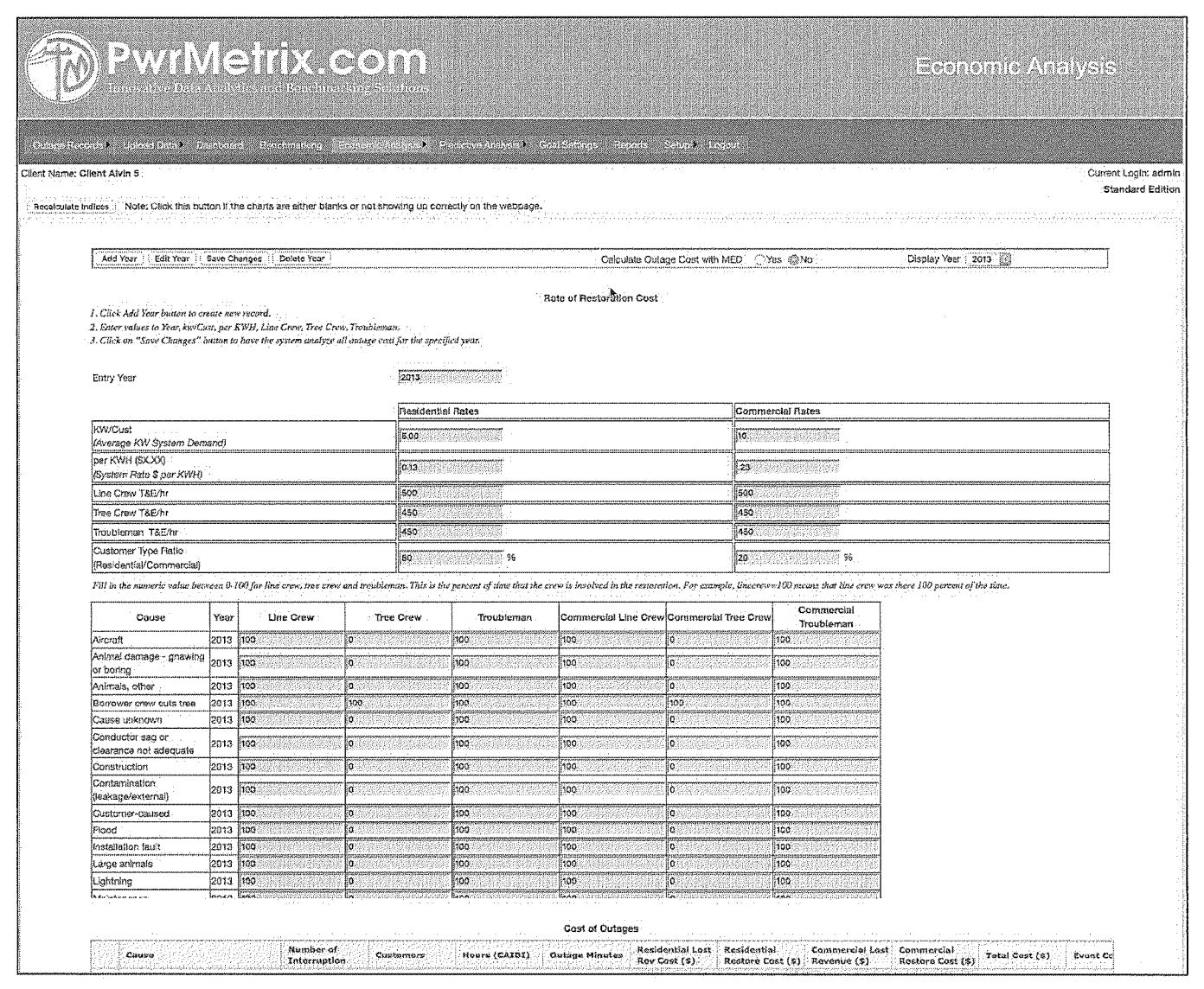

FIG. 29 show exemplary screen view of the Economic Analysis main menu 150 from FIG. 2 for showing the financial impact of the outages to the utility. The IRDB tool may automate the calculation of the utility economic losses (revenue and cost of restoration) grouped by the utilities' types of outages. The following data fields may be required to calculate the losses: Average Kilowatt KW system demand, system rate $ per Kilowatt hour KWH, line crew hourly rate, tree crew hourly rate, trouble shooters hourly rate and customer type ratio (residential and commercial), and year. In addition, the user may be required to input the percentage of time (1-100) that the various crews may spend when responding to restore outages. This may be done for both residential and commercial customers to provide a much accurate estimated cost. Once the user entered the required fields, the IRDB tool may use the actual outage data numbers (number of outage minutes, number of outages, customers affected and restoration time) to calculate the revenue loss and restoration cost.

Figure 13A:
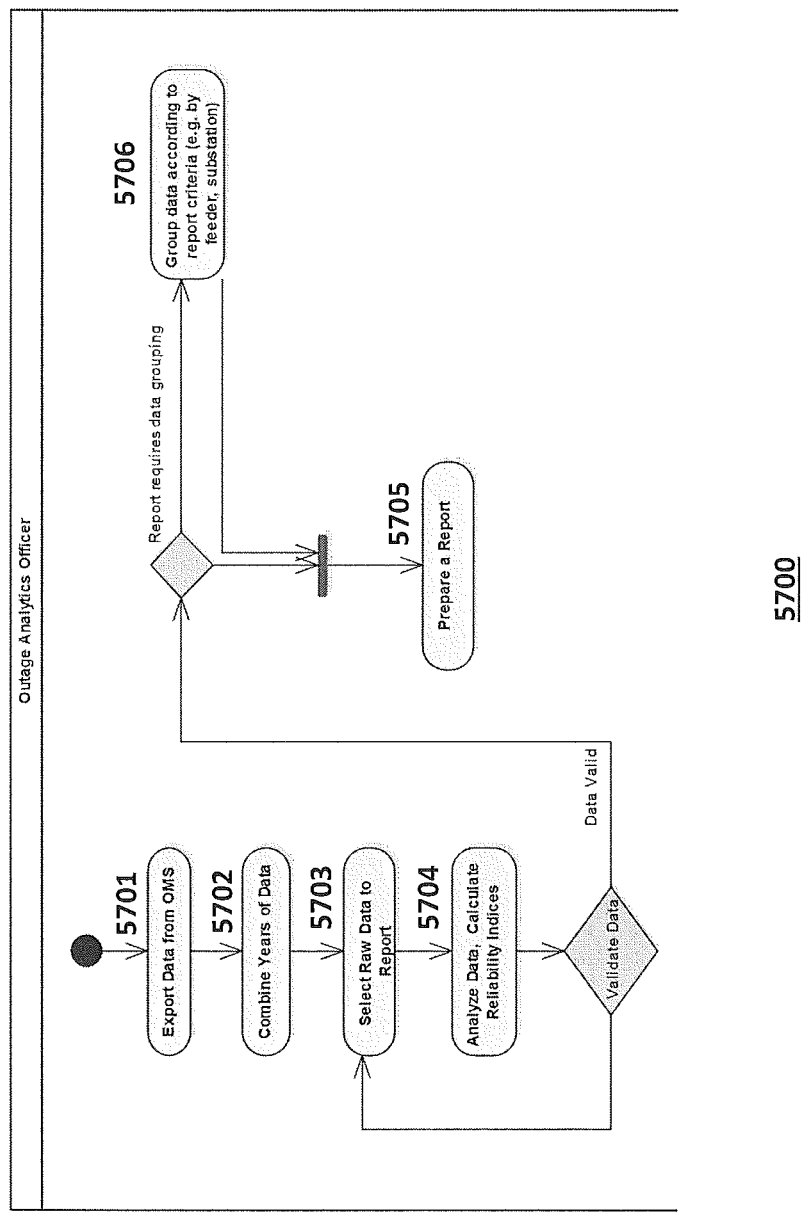
FIG. 13A is a flow chart illustrating the process flow of manual outage data processing procedure for Utility's outage analytics.

FIG. 13A is a flow chart illustrating the process 5700 involved in today's existing manual and time consuming processing and analysis of outage data in various utilities. The process starts in exporting outage data from an outage management system 5701, then these data will be collected and combined manually with data previously exported for earlier years as indicated in 5702. Depending on the kind of outage report needed, a set of records that may encompass several years of data will be selected as indicated in 5703, afterwards data will be analyzed and process to calculate to the required reliability indices as marked by 5704. The result shall be validated for completion before it is reported as indicated in 5707; in case more data is required, the process in 5703 will be repeated. Once the data is complete it may still be further classified and grouped as indicated in 5706 in case the required report needs to group the data by region or state.

Figure 13B:
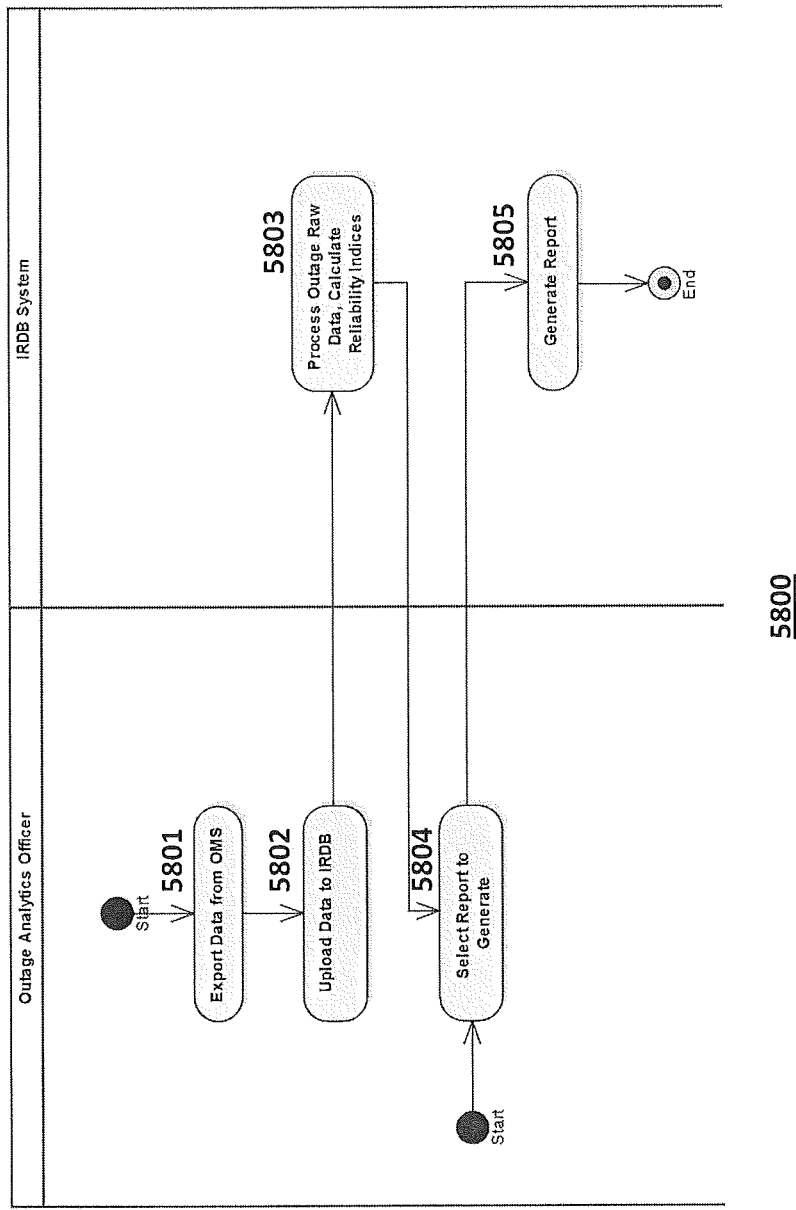
FIG. 13B is a flow chart illustrating the process flow of IRDB automated outage data processing for utility's outage analytics.

In contrast, the innovative IRDB system expedites and automates the time-consuming processing of outage data. FIG. 13B shows the process 5800 of outage data processing and analysis in the IRDB system. Once the user exported the outage data from the outage management system 5801, and upload it to the IRDB System 5802, the system will receive and automatically process it to compute the current reliability indices 5803. As soon as the data is processed in the IRDB system, the end user may select any report 5804 and the system will generate it 5805. As the IRDB system is accessible through the internet, as shown in Figure FIG. 1D—5200 and FIG. 1E—5300, a utility may have multiple users simultaneously entering or uploading data from different locations or substations. The IRDB system shall immediately add the data it receives into the users' current database and have its analysis and reports ready and accessible for all users in an instant as shown in flow chart 5800. This is much faster than a manual process can ever deliver as shown in FIG. 13A, in which the data must be first manually collected, aggregated, and sorted before it can be analyzed and produce reports.

FIG. 30 shows an exemplary screen view 3000 of the Cost of Outages result table that may be shown once the required data are inputted from the FIG. 29 Economic Analysis menu. The result table may show the breakdown of residential and commercial Revenue and Restoration costs by outage type. In addition, the aggregated total outage cost may also be calculated and shown on the right bottom corner of FIG. 30. The IRDB tool may include two buttons called Print report sorted by total cost 3002 and Print report sorted by Event Cost 3004 that may print the summary reports, as shown in FIG. 30.

Figure 31:
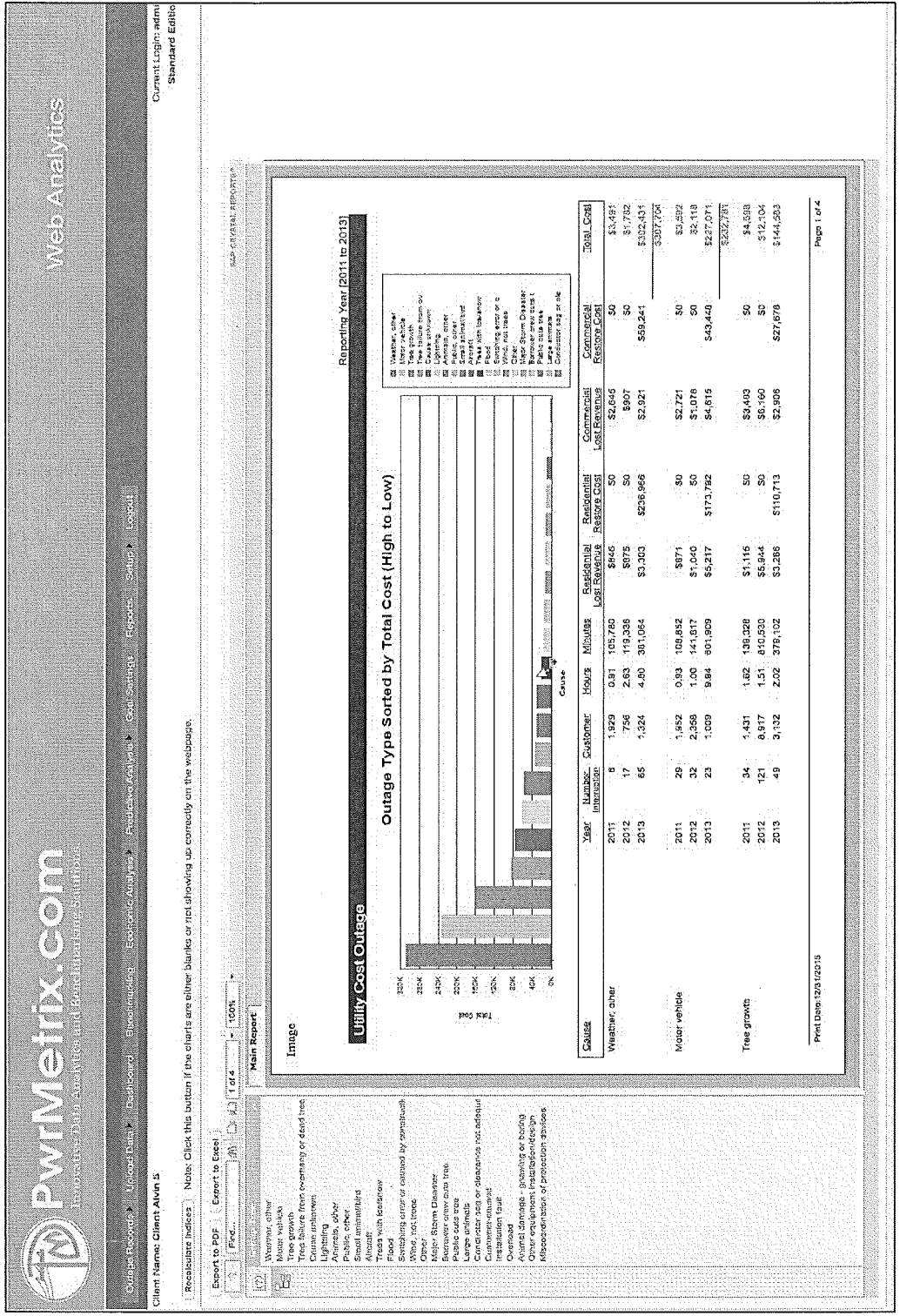

FIG. 31 shows exemplary screen view 3100 of the sample report titled "outage type sorted by total cost (high to low)". This report may have a colored bar chart showing the highest to the lowest outage cost by outage type.

Figure 32:
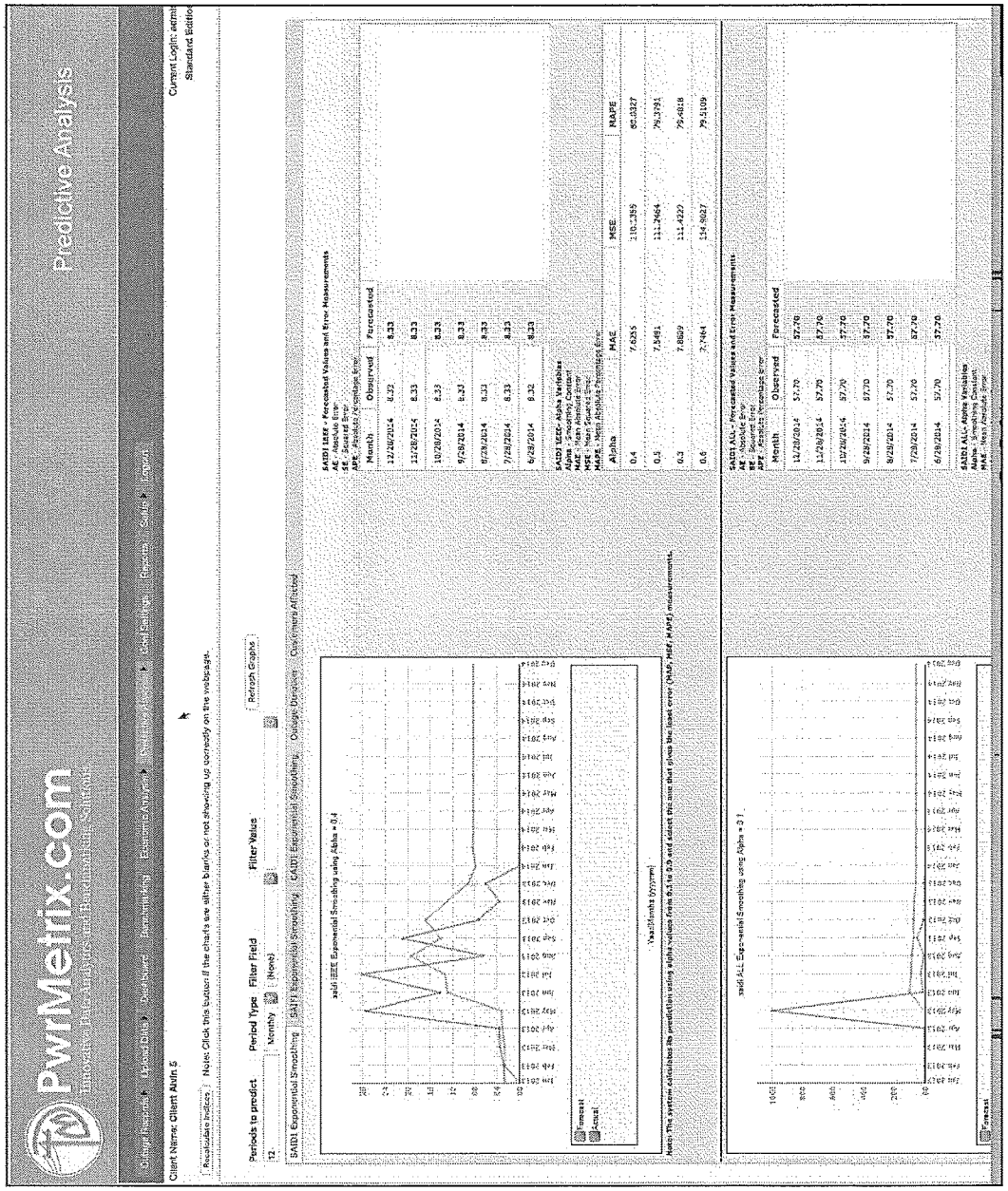
FIG. 32 and FIG. 33 show exemplary screen views of the Predictive Analysis main menu.

FIG. 32 shows exemplary screen view 3200 of the Predictive Analysis main menu 160 of FIG. 2. The IRDB tool may add the forecasting graphs to provide a powerful tool to forecast the monthly or yearly SAIDI, SAIFI, CAIDI, outage duration and number of customers affected by System, feeder, substation, cause and location. This may add the ability to check if the utility's future targeted goals (e.g. next year, or two years later) for reliability metrics are achievable or impractical. The forecasting method may use the exponential smoothing methodology that calculates the best alpha smoothing constant which calculates the mean absolute error, mean squared error, and mean absolute percentage error, and select the lowest possible error as part of the best forecast. The invention may show the forecasting results for the SAIDI, SAIFI and CAIDI (shows both calculations for IEEE and ALL). The IRDB tool may also allow the user to filter or drill-in to specific system attributes such as feeder, substation and location.

Figure 33:
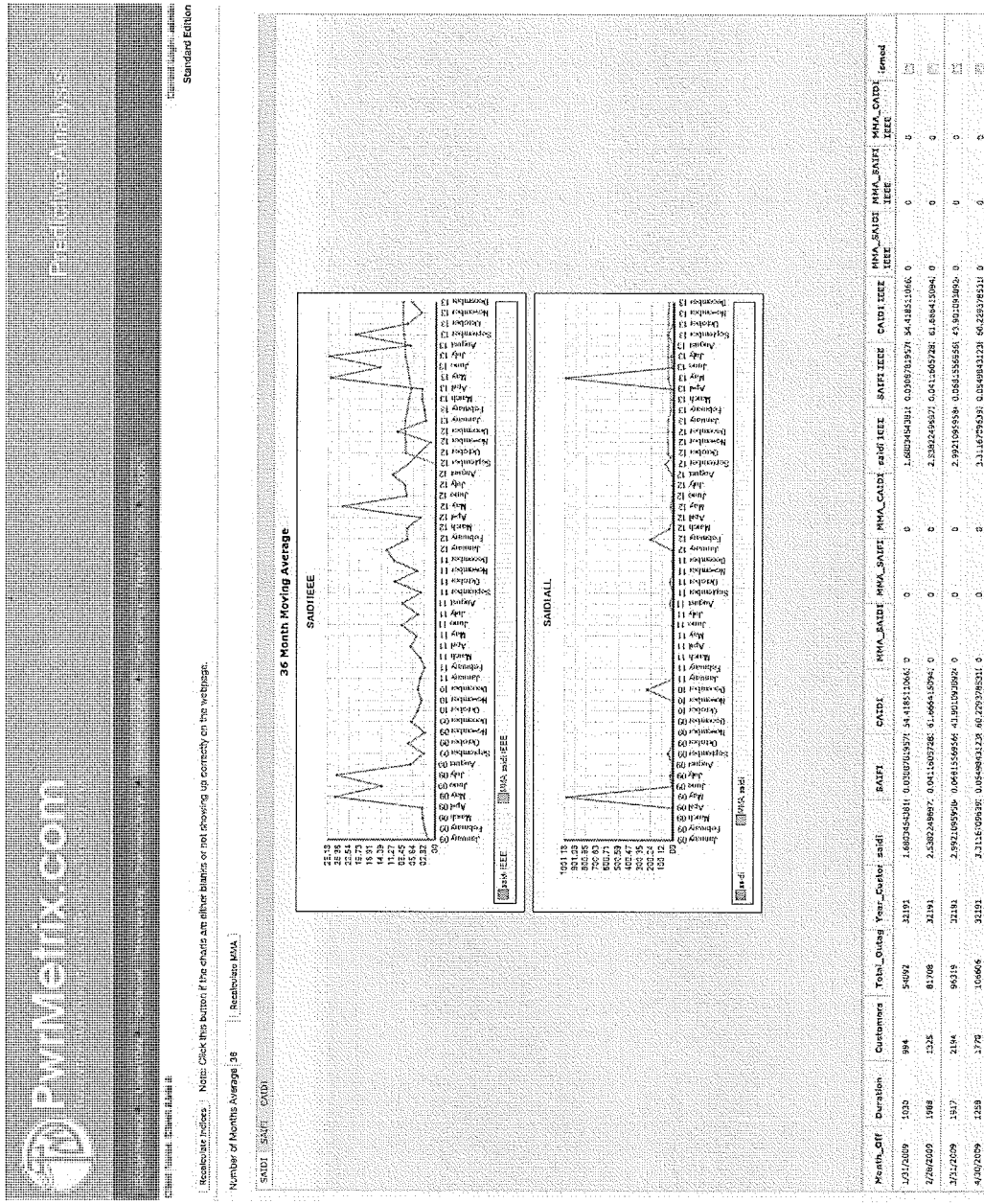

FIG. 33 shows exemplary screen view of the Predictive Analysis main menu 160 of FIG. 2 which may include the monthly moving average graph. The invention may show SAIDI, SAIFI and CAIDI (shows both calculations for IEEE and ALL) graphs. The user may have the ability to enter the number of months that may be used for calculating the moving average. Finally, the invention may include a table below the graphs of all the calculated figures.

Figure 34:
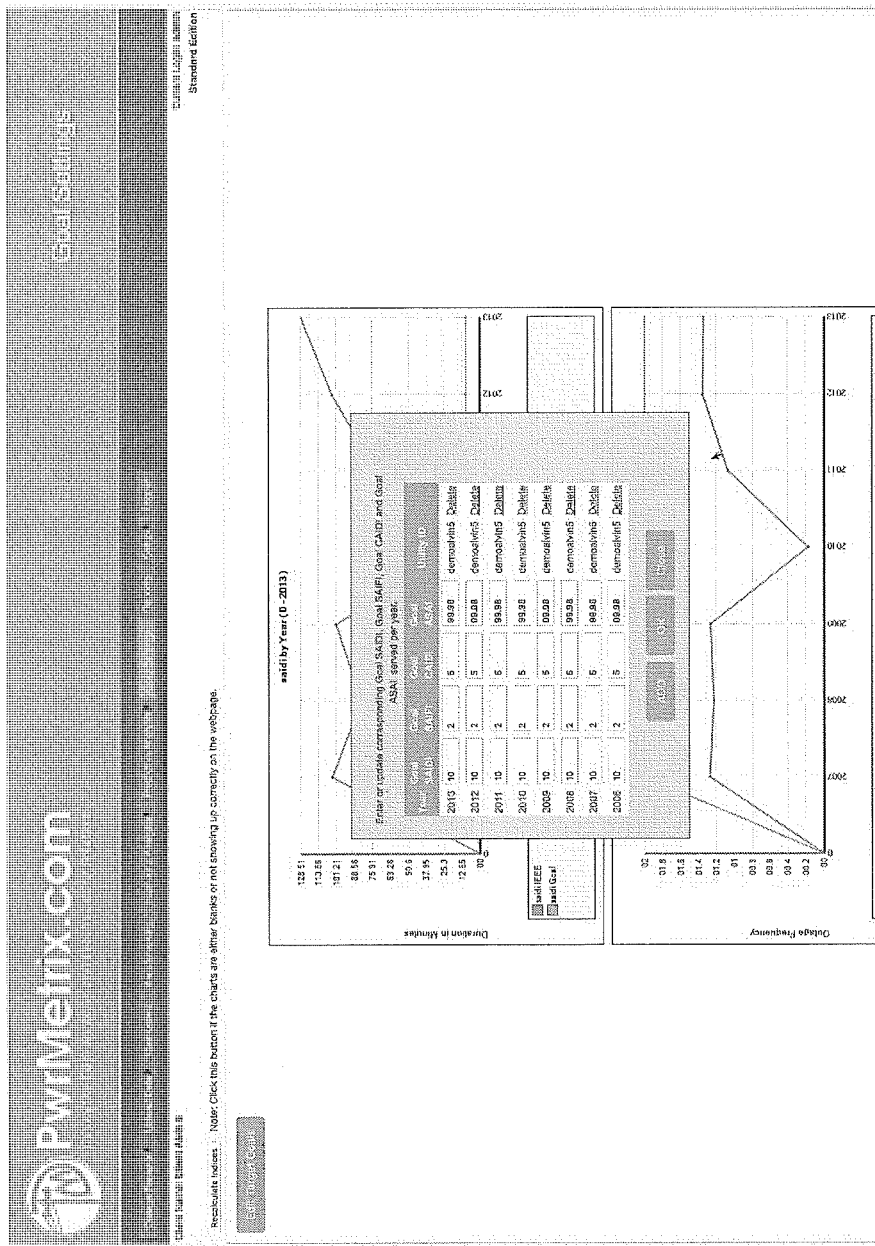
FIG. 34 shows an exemplary screen view of a goal setting main menu.
Figure 35:
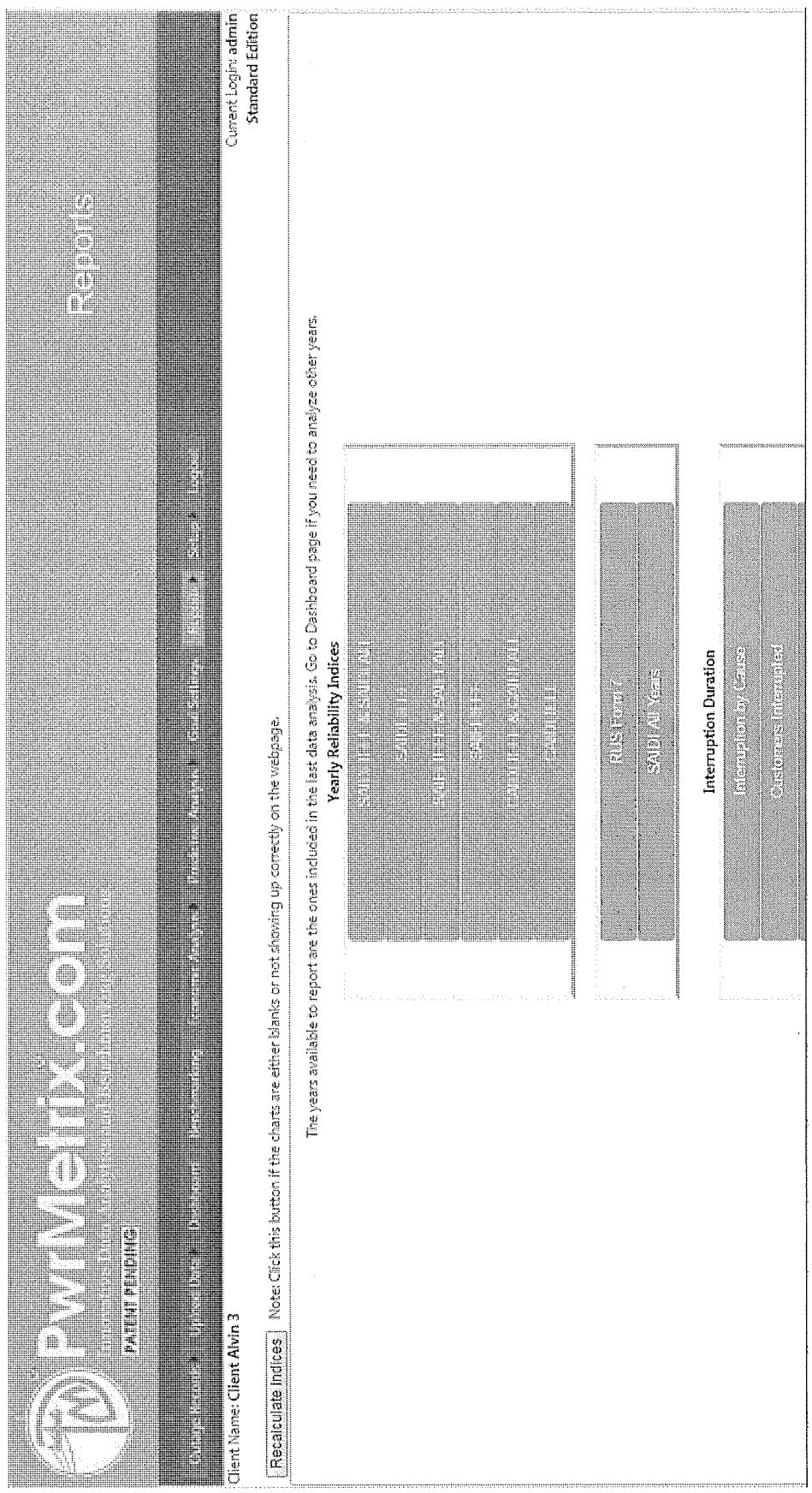
FIG. 35, FIG. 36, FIG. 37, FIG. 38 show exemplary screen views of the Reports main menu.
Figure 36:
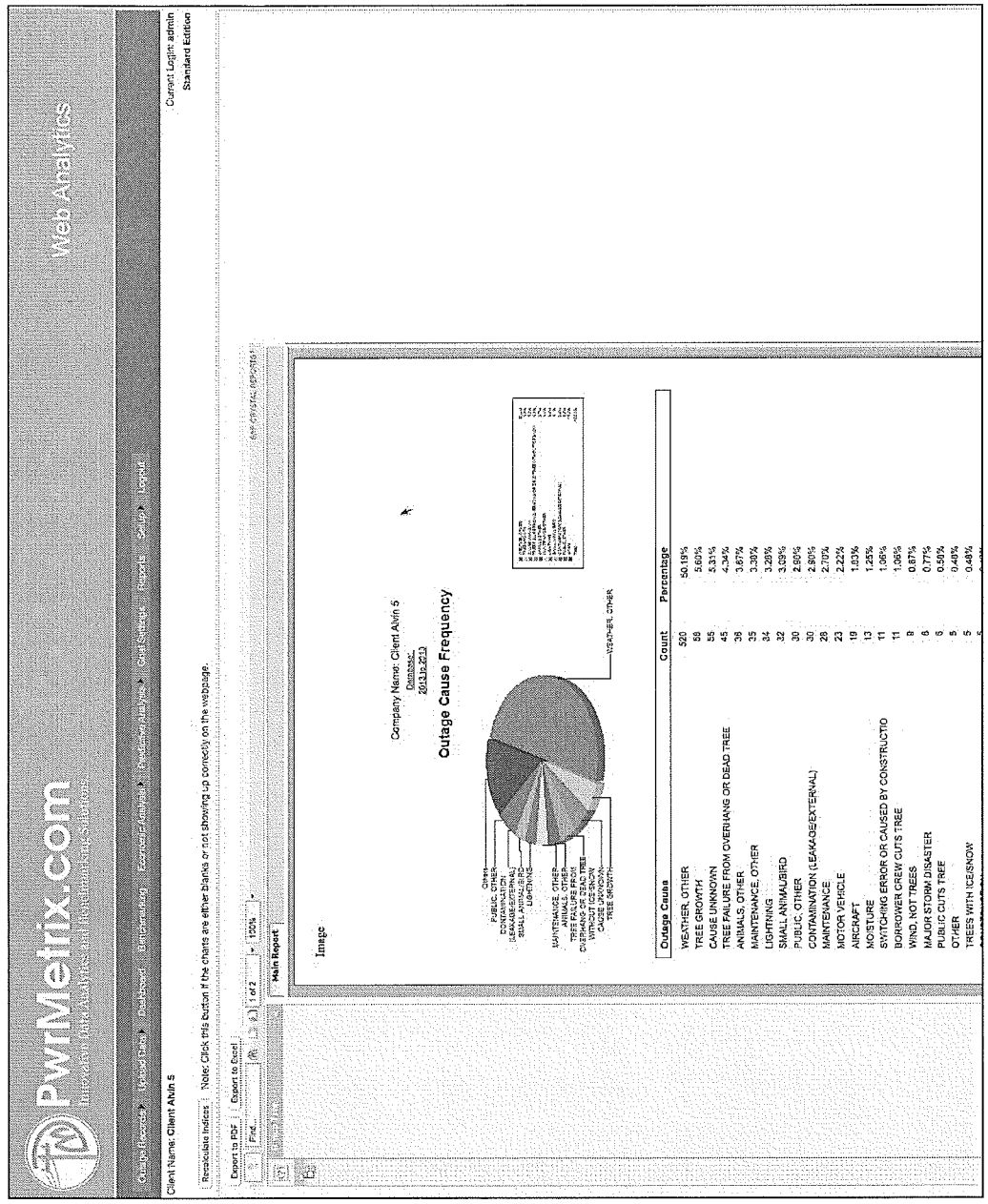
Figure 37:
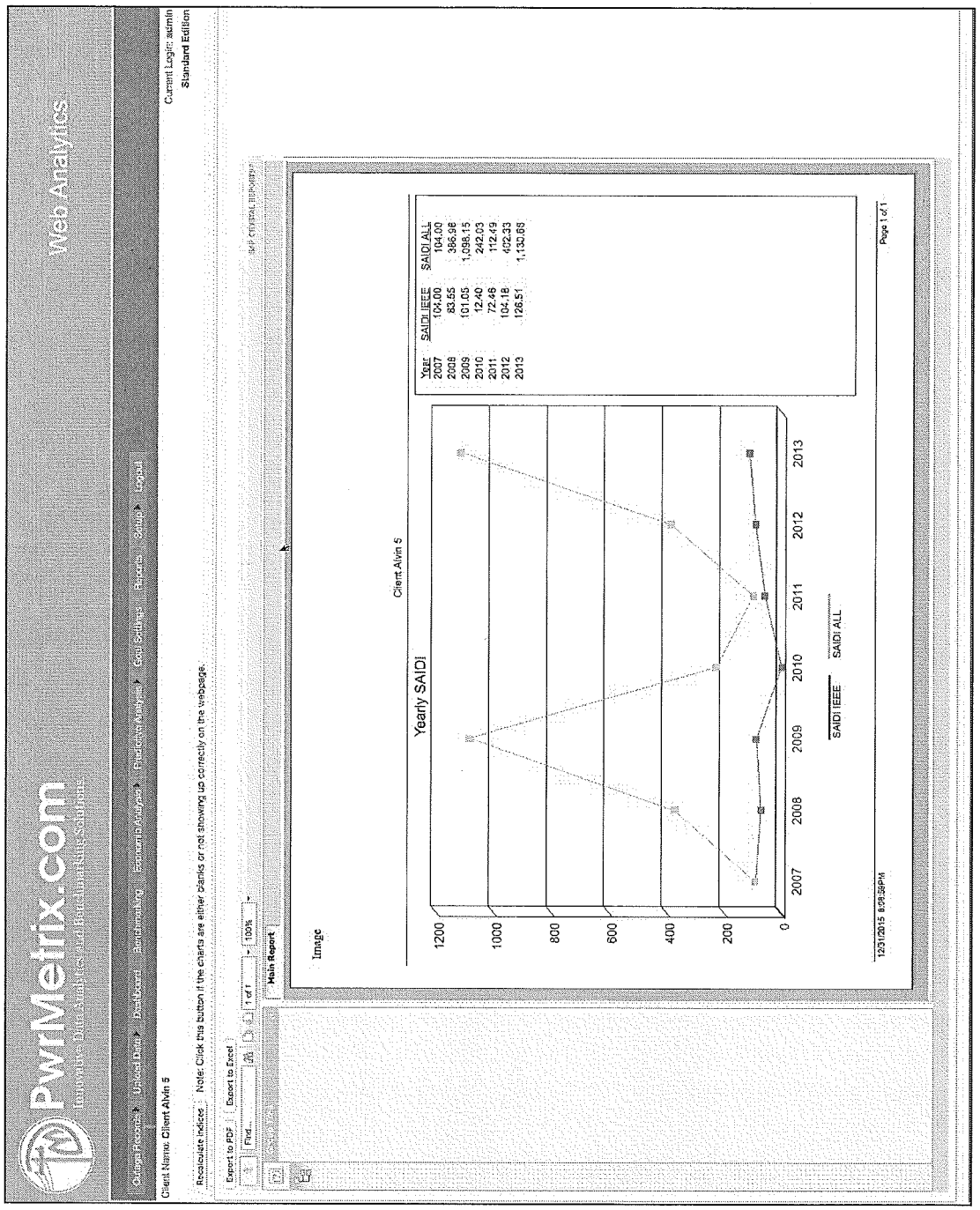

FIG. 34 shows exemplary screen view 3400 of the Goal Settings main menu 170 of FIG. 2. The invention may allow the user to enter the target numbers or goals such as the SAIDI, SAIFI, CAIDI and ASAI indices that can be tracked yearly to see how close the utility is to its target goals compared to the actual performance. The IRDB tool may include a visual graph showing both target values versus the actual reliability indices.

FIG. 35, FIG. 36, FIG. 37, FIG. 38 show exemplary screen views of example reports from the Reports main menu 180 from FIG. 2 for providing the ability to print and view numerous technical graphs and table reports based on the advance data analytics and real-time web server database.

Figure 38:
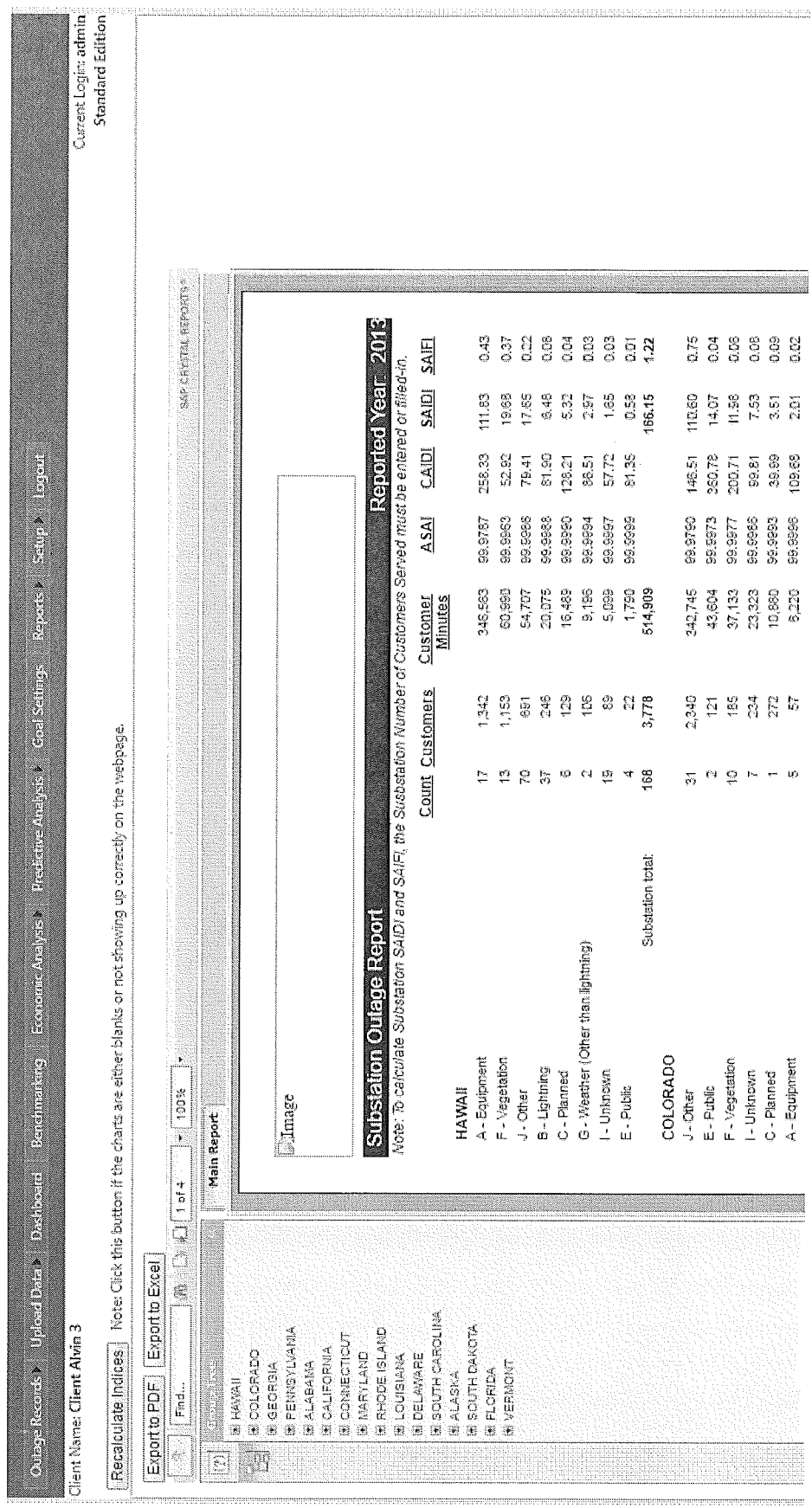
Figure 38A:
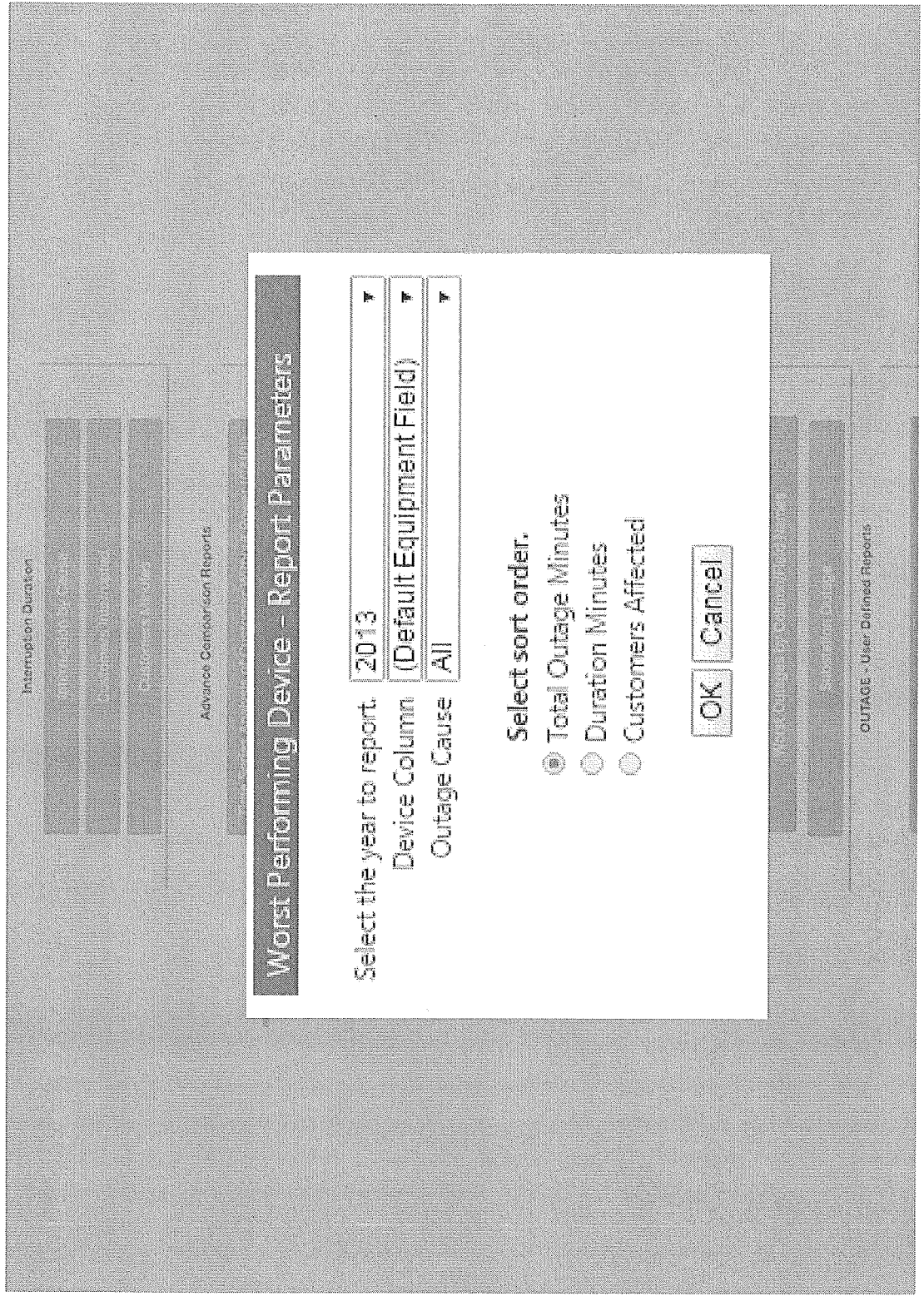
FIG. 38A and FIG. 38B show exemplary screen view of the unique filtering capability of the report menu.
Figure 38B:
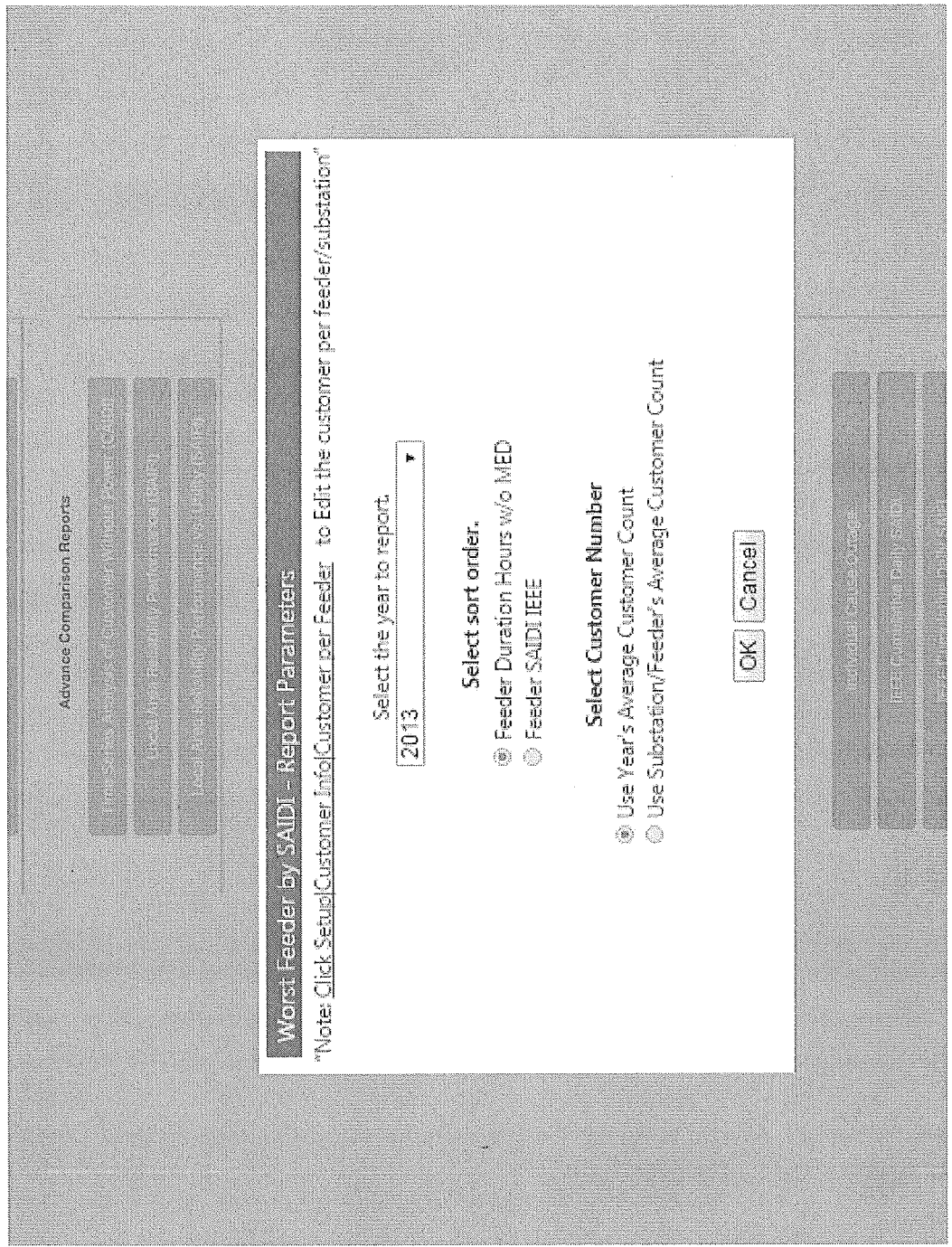
Figure 39:

FIG. 38A and FIG. 38B show exemplary screen view of the unique filtering capability of the report menu. The IRDB tool may add the capability to create multiple reports from a single report button. For example, FIG. 38A shows a screen that may be used for the user to filter 4 different types of fields (e.g. year, column/field "substation", outage cause type "animal, other" and sorted by "total outage minutes". The reports may be designed to be highly configurable for the user to filter, group, and sort the records the way they are needed.

Figure 40:
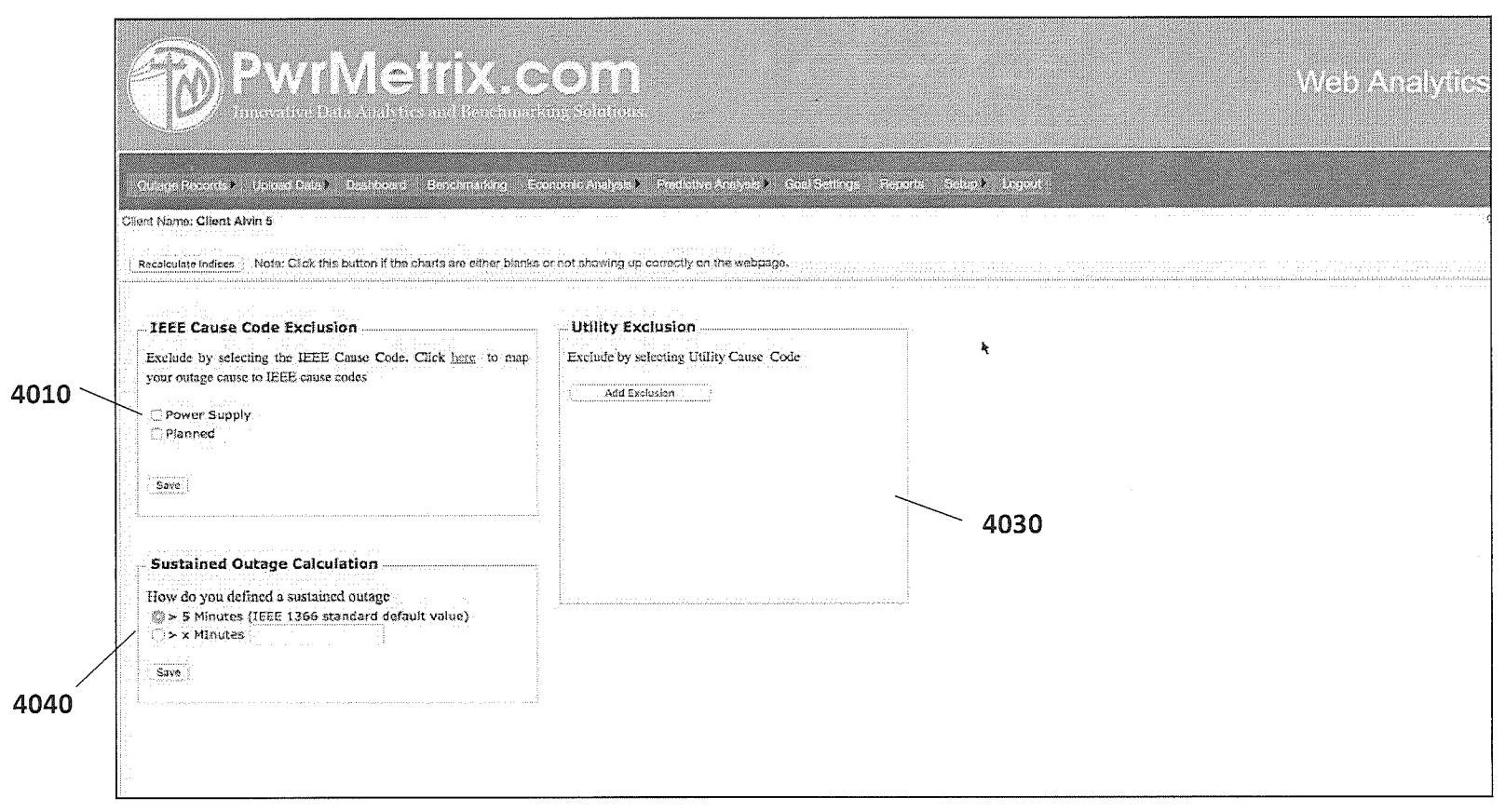
Figure 40A:
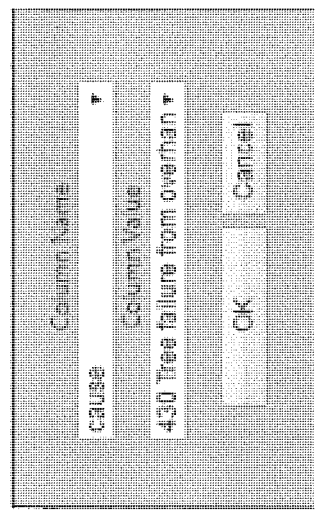
Figure 41:
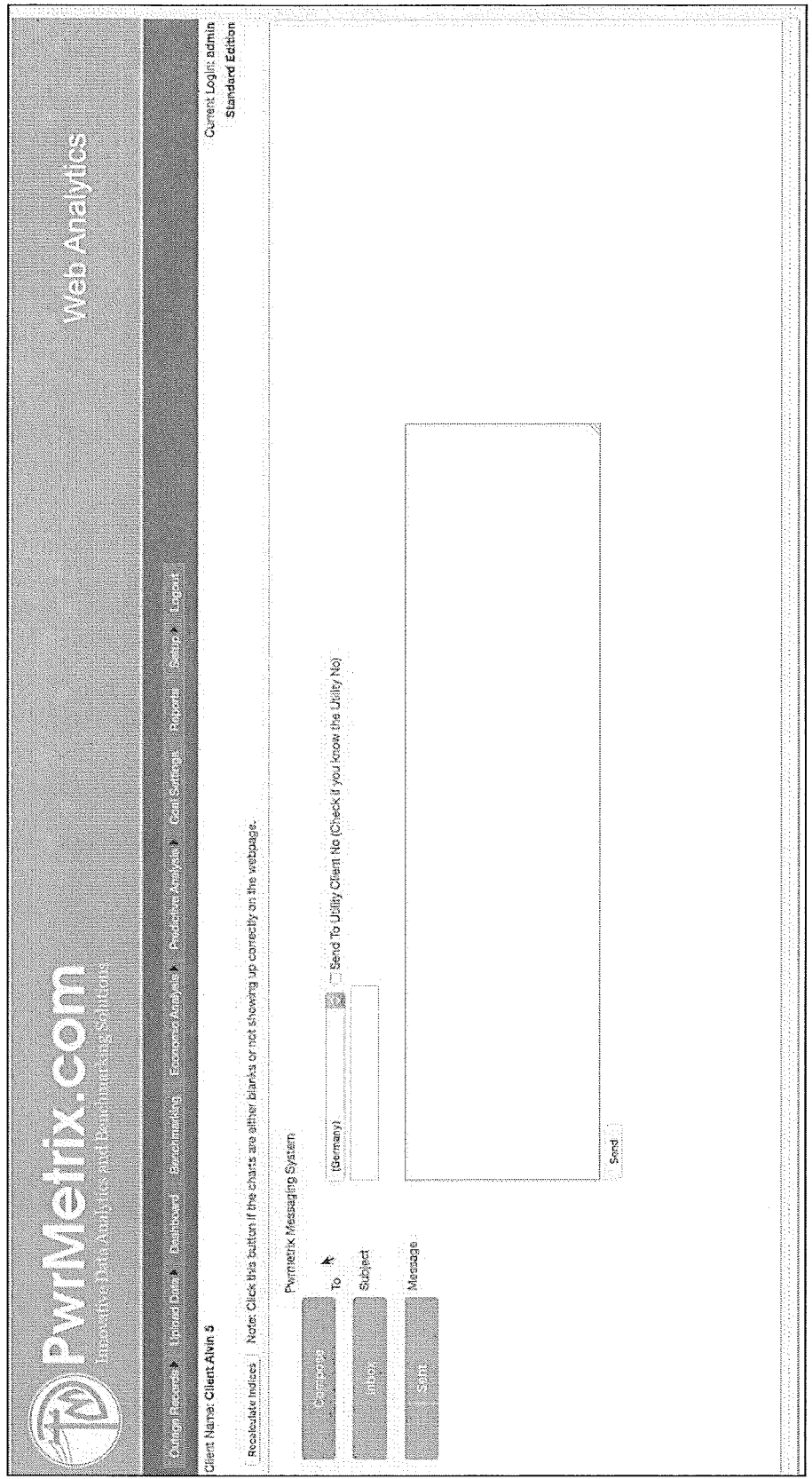
Figure 42:
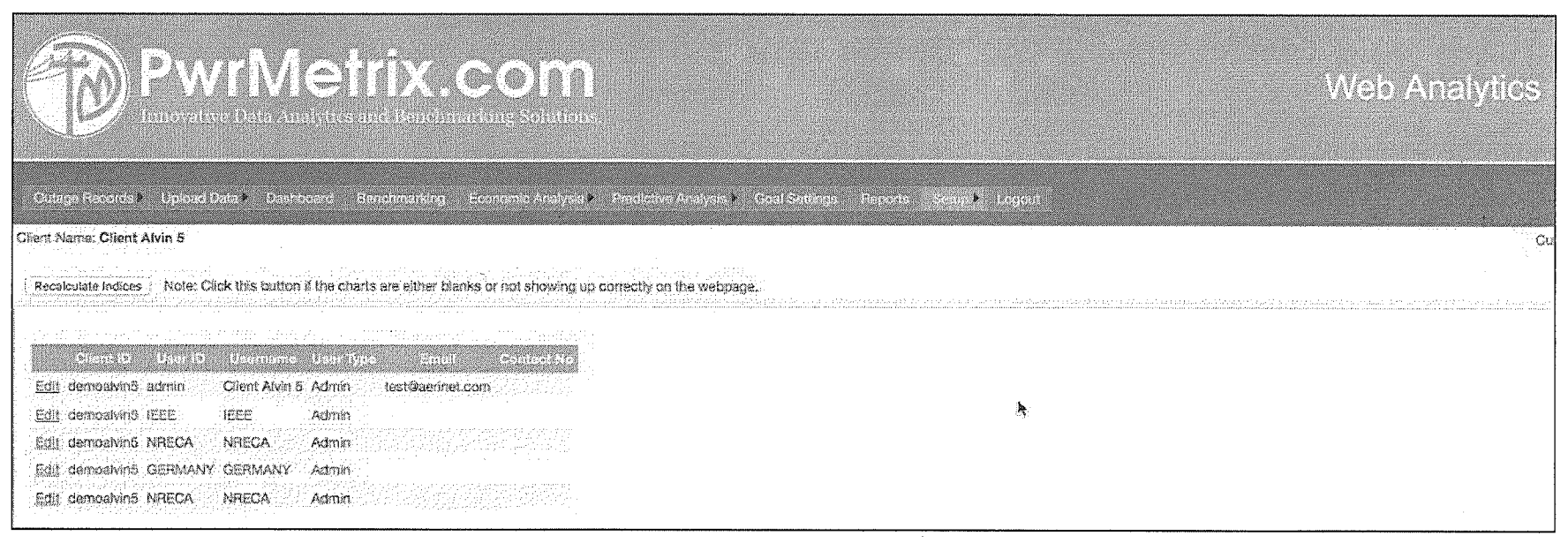

FIG. 39, FIG. 40, FIG. 41 and FIG. 42 show exemplary screen views of the Setup main menu 190 of FIG. 2 and associated submenus. The IRDB tool may include advance capabilities such as cause mapping (batch mapping of user outage cause to the IEEE standard codes) which classifies utilities own outage cause description according to standard IEEE outage cause codes to enable benchmarking of different outage records having different cause description, client info setting (e.g. utility size, state, region, type of utility and more utility info), password, messaging (allow utility users to connect directly and email other utility users via the intrinsic IRDB tool without the need to use other tools such as outlook email), and user account calculation custom settings. FIG. 40 is a screen view showing access to three innovative tools that existing industry systems are missing: 1) IEEE Cause code exclusion 4010 is an innovative tool that may allow custom made exclusion of certain outage type such as Power Supply and planned in real-time when calculating the reliability indices for all the benchmarking participants; 2) Utility Exclusion 4020 which allows the user to select from its list of fields/columns, as shown in FIG. 40a, the detailed exclusion name to be removed when calculating the reliability indices for all benchmarking participants; and 3) Sustained Outage Calculation 4030 which permits a flexible way for the user to change the definition of a sustained outage, thereby providing a capability for the user to re-calculate all benchmarking participants based on its own definition (apples to apples comparison on the fly). FIG. 41 is a screen view which illustrates the IRDB tool's Messaging System that allows the unique capability to contact anonymous utilities for inquiry regarding best practices. This provides a very powerful capability for utilities to connect worldwide in real-time without spending weeks or months to determine the person who is responsible for managing the reliability solutions from the various utilities.

Figure 43:
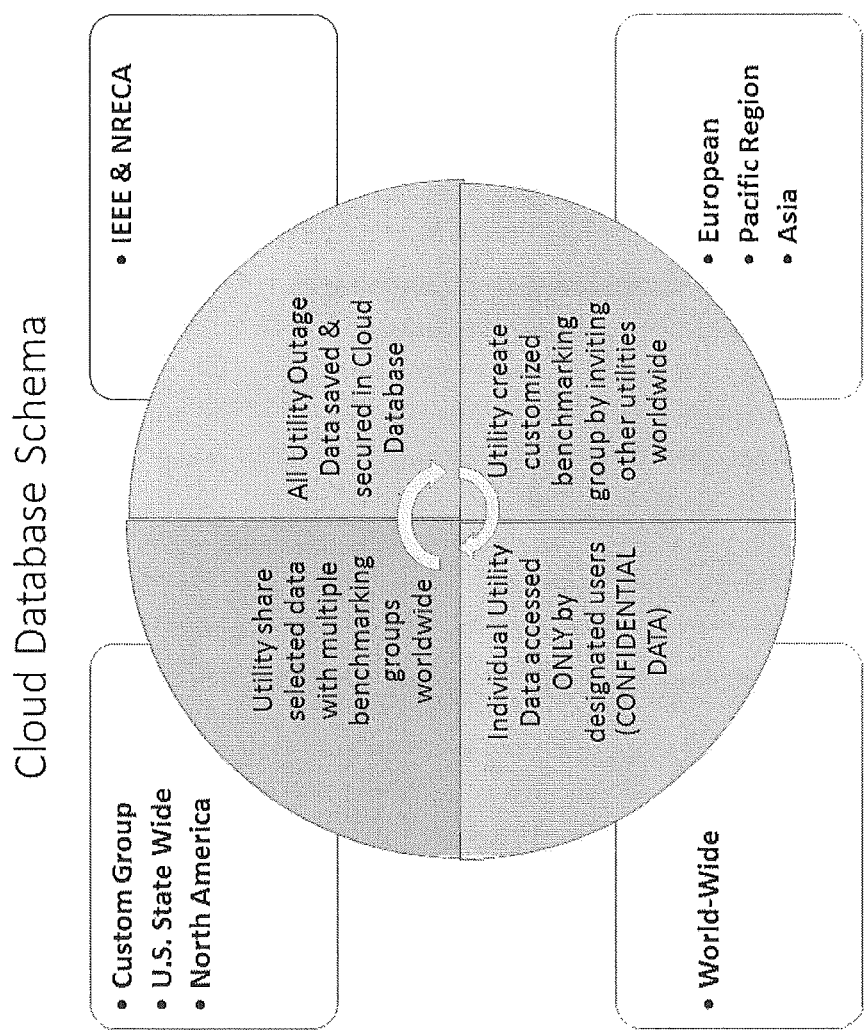
FIG. 43 to FIG. 46 show exemplary screen views of various slides of IRDB cloud schema, IRDB Platinum framework, and flexibility to customize groups.
Figure 44:
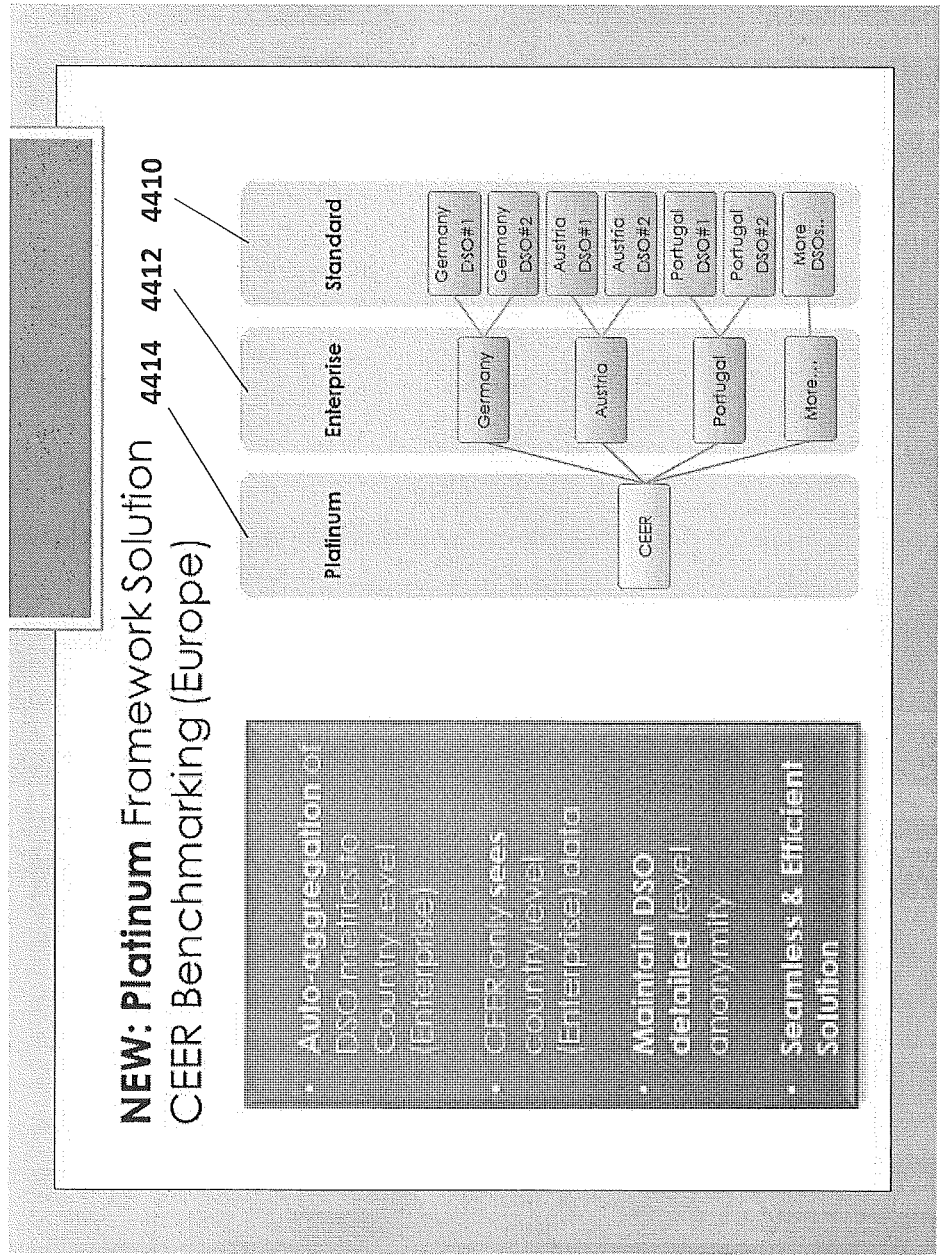
Figure 45:
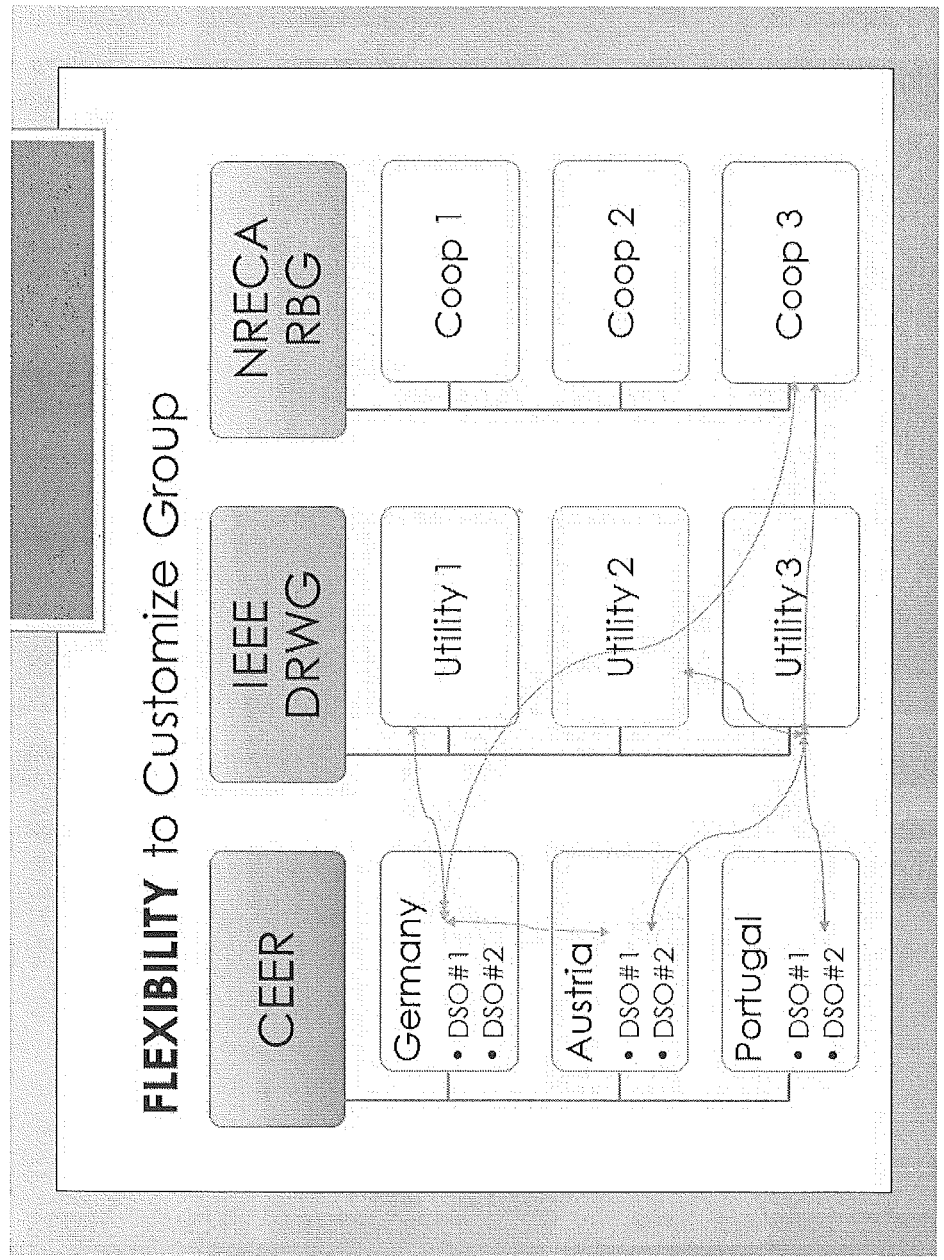
Figure 46:
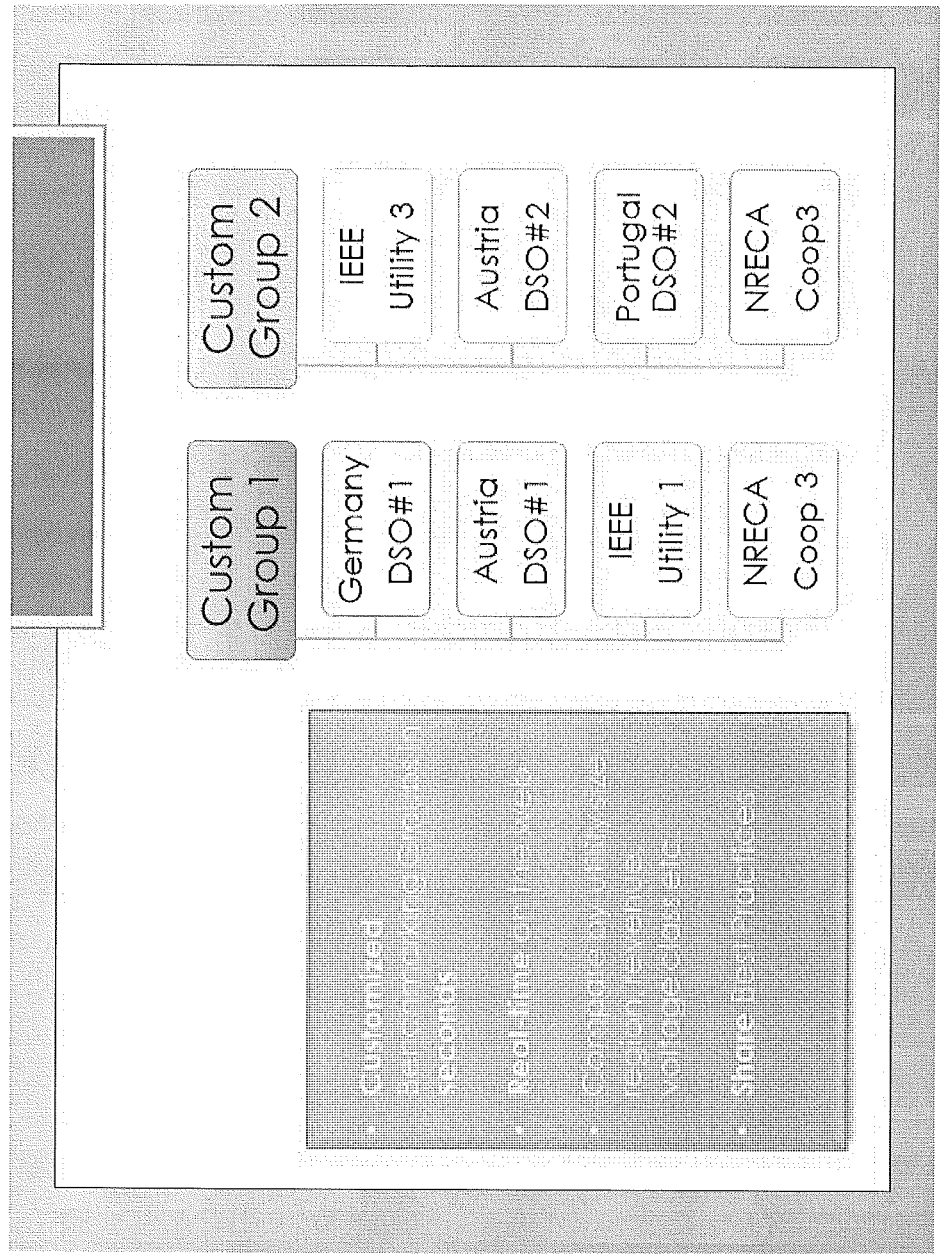

FIG. 43 to FIG. 46 show exemplary screen views of various aspects of an IRDB cloud schema, IRDB Platinum framework, and flexibility to customize groups. FIG. 43 show the innovative cloud database schema that allows the flexibility, power and speed to process hundreds or thousands of worldwide utilities in real-time. FIG. 44 shows three different levels of an IRDB tool that can be created: 1. Standard edition 4410—may be used by single user; 2. Enterprise Edition 4418—may be used by a larger benchmarking organization such as NRECA or a country such as Germany to view the detailed outages of its members that could be in the hundreds of thousands; 3. Platinum edition 4414—may be used by a much higher level such as a continent wide benchmarking organization such as CEER (Council of European Regulators) the European Reliability benchmarking organization for 20 plus European countries. The platinum edition 4414 allows the CEER to view the aggregated reliability indices of each country (that may use the Enterprise edition) but it does not allow access to the confidential outage detailed data of each utility under each country. This provides a unique capability to maintain utility outage data confidentiality and simultaneously aggregate the results into higher shareable reliability metrics (SAIDI, SAIFI and CAIDI) that utilities worldwide approve. This capability is not available in existing systems. FIG. 45 illustrates an example of the unique flexibility to create a custom (focus) group within the IRDB tool Standard edition. The ability to customize and create a focus group that may allow a utility from Germany (who is part of the Germany and CEER benchmarking group) to invite an IEEE DRWG utility from the U.S. and a NRECA RBG member coop from the U.S. Each user may have the flexibility to create unlimited number of focus benchmarking groups. This may provide the unique advantages of utilities to connect globally and learn from other utilities which in the past was a very slow process and could only be possible by attending expensive utility conferences worldwide. FIG. 46 shows examples of custom groups that may be created as a result of capabilities illustrated in FIG. 45.

Referring back to FIG. 2, there is shown in the exemplary screen 101, a Solar Integration Solution Packages 210 icon for providing a suite of tools for Solar Impact Analytics and Distribution Reliability Planning and Operation Benchmarking Solution. This new "cradle to grave" framework may seamlessly disseminate the photo-static PV interconnection methodologies, tools, training and best practices and permit connecting the 2000+ U.S. electric distribution utilities in a fast, secured, scalable and cost effective web platform. Through this new transformative strategic and holistic framework, the IRDB tool may create 3 new easy-to-access solution packages for utilities and stakeholders. In addition, the IRDB tool may create a new dynamic assessment and optimization tool to focus on real time distribution operation analysis. Consequently, this innovative framework may aggressively accelerate the U.S. goal of integrating 100's of gigawatts (GWs) of solar in the electric grid.

The IRDB tool addresses three challenges: 1.) Lack of solution-dissemination-framework or "cradle to grave" platform to accelerate the adoption of new utility solar methodologies and tools; 2.) Lack of utility solar benchmarking framework for aggregated technical and regulatory information to connect all 2000+ US distribution utilities; 3.) Lack of distribution operation solar analysis tools to maintain a reliable and resilient grid. The DOE Sunshot Systems Integration sub-program has identified the solar technical and regulatory challenges to be addressed in four broad, interrelated areas and one of these areas is the Grid Performance and Reliability in which the goal is to "maintain and enhance the efficiency and reliability of electricity transmission and distribution grids in a cost-effective, safe manner with hundreds of gigawatts of solar generation deployed onto the nation's power system." Under the Grid Performance and Reliability (GPR), the distribution utilities are facing major technical and regulatory challenges in two areas: 1.) distribution planning and interconnection; 2.) daily operation of the distribution system with high penetration of PV. Utilities need innovative and cost-effective solutions with real-time dynamic assessment and optimization tools for distribution planning and operation to successfully integrate hundreds of gigawatts of solar power in the grid. More importantly, it is critical that with the creation of new transformative methodologies and tools, a solution-dissemination-framework is also established to successfully spread the news, educate, train, adopt, and implement the new solutions in the 2000+ US distribution utilities. Ultimately, a "cradle to grave" (CTG) strategic framework must be created. Without the CTG, the adoption of new methodologies and tools may potentially take years which is counterproductive to the DOE Sunshot goal of accelerating hundreds of gigawatts of solar power in the grid.

Presently, the mode of dissemination for new solutions includes requiring the grant recipient to spread the news via webinars, conferences, newsletters and websites. The rate of dissemination, adoption of the new solutions and transfer of knowledge to the 2000+ US distribution utilities is relatively slow and insufficient to meet the aggressive goal of Sunshot. Numerous additional challenges include: the amount of time and effort to educate 2000+ utilities; connecting to the proper utility personnel; lack of scalable mechanism to disseminate the new solutions to the utilities; and lack of information about the state of PV integration readiness in the 2000+ U.S. utilities. Another major challenge is that utilities are relatively conservative in adopting new solutions unless they see evidence that other utilities have successfully used and verified the new tools. Electric utilities "trust the real world" results of other utilities. Utilities have expressed that "we'd like to find out what works and what did not work with the other utilities and how can we learn more about what other utilities are doing". Part of the challenge in making this happen is the lack of electric utility solar benchmarking platform to gather pertinent information about the electric utility's existing PV projects, technical and regulatory issues, innovative solutions, PV best practices, and more. Utilities have difficulty connecting directly to other utilities and inquire about PV best practices and solutions. Finally, the third challenge is the lack of distribution operation and solar analysis tools to maintain a reliable and resilient grid. The majority of the new methodologies and tools for distribution utilities are focused on planning and interconnection procedures. For example, NREL, Sandia and EPRI are working on OpenDss time series analysis tool to expedite the utility's interconnection rules. There is insufficient distribution operation analysis tool that integrates the advanced tools created by NREL, Sandia, and EPRI to the distribution operation side that maintains the system reliability metrics such as SAIDI (System Average Interruption Duration Index), and SAIFI (System Average Interruption Index)

To solve the three major challenges described above, the IRDB tool may create a first-of-its-kind real time integrated Solar Impact Analytics and Distribution Reliability Planning and Operation Benchmarking Solution. This new "cradle to grave" framework may seamlessly disseminate the PV methodologies, tools, training and best practices and connect the 2000+ U.S. electric distribution utilities in a fast, secured, scalable and cost effective web platform. Through this new IRDB tool transformative strategic and holistic framework, IRDB tool may create 3 new easy-to-access solution packages for utilities and stakeholders.

Three solution package/sections are provided. The first is a PVMetrix Solar Benchmarking Tool—may create a unique IRDB module called PVMetrix to collect pertinent information that has never been aggregated before in a national level which includes electric utility's PV projects, interconnection queues, technical and regulatory issues, innovative solutions, PV planning and operation tools, best practices, reliability issues, success stories and more. For the first time ever, PVMetrix may provide the mechanism to empower the utilities to compare and connect with the other 2000+ U.S. and worldwide distribution utilities in a "viral benchmarking platform" similar to social media apps. PVMetrix may solve the challenge of lack of an electric utility solar benchmarking platform. PV Metrix allows connecting the electric utilities in real-time with a fast, reliable, scalable and cost effective platform. The capabilities of PVMetrix include: creating a simple yet powerful holistic solution; revolutionizing Solar Online Benchmarking; quantify the VALUE and COST impact of solar in Reliability Metrics (SAIDI, SAIFI and CAIDI); utilizing the Reliability Metrics as integral part of yearly planning and goal setting; connecting and sharing engineering & management best practices; improving distribution reliability in a most cost effective way; and providing safe, reliable and cost effective power to utility customers. Through PVMetrix, DOE Sunshot may have the ability to access the benchmarking data and learn from the aggregated real time utility data that represent the entire U.S. This may allow Sunshot to quickly ascertain the type of focus projects that are needed to be funded through new grants. It is the critical component that may bond all the 3 solution areas together in a holistic and integrated solution. PvMetrix may allow utilities to create custom benchmarking group based on utility size, region, and state in a matter of minutes. Utilities control of the type of data to be shared, participate "anonymously", and create their own "customize benchmarking group" based on specific features and criteria. Finally, it allows utilities to communicate with one or multiple utilities within the benchmarking group in real time.

The second solution package is a Solar Apps and Tools. This package may contain the latest publicly open source methodologies, tools, data sets from DOE Sunshot grants, DOE national labs, state sponsored grants, and university research. Examples include the DOE High Pen FOA and DOE national lab FFRDC open source tools/data sets from Arizona Public Service, Florida State University, SMUD, NREL, SCE, and SANDIA. In addition, it may include commercially available weblinks from DOE Catalyst apps, DOE Sunshot soft cost, DOE incubator tools, SynerGee, CymeDist, Milsoft Windmill and other tools in the area of distribution and transmission planning and operation, advance inverter, solar-storage-microgrid, reliability, power quality, modeling, and interconnection. The various DOE Sunshot tools may be highlighted and special training materials may be created under the Solar Utility Training section. The IRDB tool may include a new distribution operation tool having a real-time web base technical and economic analysis tool to integrate the dynamic time series capability (power flow solutions) with outage analytics and distribution reliability benchmarking solutions to QUANTIFY the VALUE and COST of affecting the distribution RELIABILTY metrics (SAIDI, SAIDI and CAIDI) based on different PV penetration scenarios. This IRDB module webtool may revolutionize the distribution operation of solar in the grid. It may leverage the detailed IRDB tool outage data from various utilities and the power of dynamic time series power flow solutions to pro-actively assess both negative and positive impact of integrating solar in the coops' distribution feeder circuits. Values of this new package include: create seamless comparison of the PRESENT reliability metrics versus FUTURE scenarios of different cases of penetration level of solar; quantify the VALUE and COST impact of the change in Reliability Metrics (SAIDI, SAIFI and CAIDI) due to high solar penetration level; and, answer the state regulators' question of how much does solar impact the reliability of the utility.

Finally, the third solution package is a Solar Utility Training package This package permits creating specialized and innovative (webinar, multimedia, face-to-face) training materials for utilities to show the value and benefits of the new solutions from DOE Sunshot and other grants. The IRDB tool may include interactive web trainings highlighting the latest industry research results in stochastic and economic planning tools and the Solar distribution planning manual to name a few. Ultimately, this section may educate utilities via innovative media and direct connectivity with hundreds or thousands of utilities worldwide. The shortcoming of existing solutions in the modeling, simulation, benchmarking, training, and visualization market (such as Synergee, OpenDss, GridLabD, EUCI web training, SEPA benchmarking, and others) compared to the PVMetrix solution framework is that the former are individualized solutions whereas PVMetrix is an integrated framework that covers from "cradle to grave" (CTG) the broad spectrum of DOE Sunshot challenges. The competitive advantage offered by PVMetrix CTG framework is it delivers in real time, via a "viral utility messaging framework" to hundreds or thousands of utilities, a full package of dispatchable solutions in the areas of advance data analytics, visualization, training, advance distribution planning and operation tools, and transformative benchmarking strategies in a fast, secured, reliable and cost effective method. Aerinet may show the comparative analysis and the substantial time and cost savings when using the PVMetrix CFG versus the existing solutions.

The methods and processes described herein do not have to be executed in the order described, or in any particular order. Moreover, various activities described with respect to the methods identified herein can be executed in serial or parallel fashion.

While the foregoing written description of the invention enables one of ordinary skill to make and use what is considered presently to be the best mode thereof, those of ordinary skill may understand and appreciate the existence of variations, combinations, and equivalents of the specific embodiment, method, and examples herein. Accordingly, the specification and drawings are to be regarded in an illustrative rather than a restrictive sense. The invention should therefore not be limited by the above described embodiment, method, and examples, but by all embodiments and methods within the scope and spirit of the appended claims.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separate embodiment.

That which is claimed is:

1. A method comprising:
    at a computing device comprising a processor;
    receiving raw outage data from utility providers via a communication network, each of the utility providers providing utility service to respective utility recipients, the raw outage data corresponding to multiple outages of each of the utility providers, wherein during each of the outages, provision of the utility by a respective one of the utility providers to one or more of the respective utility recipients is unavailable for a respective duration of time before being restored, the utility providers comprising a first utility provider and other utility providers different than the first utility provider;
    determining benchmarking data for the first utility provider and benchmarking data for each of the other utility providers based on the corresponding raw outage data; and
    providing a report to the first utility provider, the report providing a comparison of the benchmarking data determined for the first utility provider with the benchmarking data determined for the other utility providers; and
    providing analytics data to the first utility provider, the analytics data comprising:
    a trend analysis identifying reliability performance during a time period;
    an economic analysis identifying outage costs and potential savings based on improving reliability;
    a failure pattern analysis;
    a forecast analysis; or
    a target metric analysis.

2. The method of claim 1, wherein the report comprises reliability measure benchmarking that identifies an average outage duration or a System Average Interruption Index (SAIDI) value for each of the utility providers.

3. The method of claim 1, wherein the report comprises reliability measure benchmarking that identifies an outage frequency or System Average Interruption Frequency Index (SAIFI) value for each of the utility providers.

4. The method of claim 1, wherein the report comprises reliability measure benchmarking that identifies an average period for restoration of the outages or Customer Average Interruption Duration Index (CAIDI) value for each of the utility providers.

5. The method of claim 1, wherein the report is filtered to include only benchmarking data of the utility providers that are within one or more geographic regions, states, countries, or continents, wherein the one or more geographic regions, states, countries, or continents are determined based on user input.

6. The method of claim 1, wherein the report identifies aggregated cost of outages.

7. The method of claim 6, wherein the report identifies aggregated cost of yearly, monthly or daily outages sorted by type of outages.

8. The method of claim 1, wherein the report is provided in real time relative to the receiving of the raw outage data.

9. The method of claim 1, wherein the report is updated such that whenever accessed, the report reflects all raw outage data from the utility providers up to a time at which the report is accessed.

10. The method of claim 1, wherein the report comprises unique identifiers for the other utility providers, wherein the utility provider receiving the report cannot identify the other utility providers based on the unique identifiers.

11. The method of claim 1, further comprising: receiving a request from the first utility provider to send a message to a second utility provider; and sending the message while maintaining anonymity of the first utility provider or the second utility provider.

12. The method of claim 1, further comprising: based on the raw outage data determining an outage comparison, the outage comparison comparing outages for more than one of the utility providers; and including the outage comparison in the report.

13. The method of claim 12, wherein the outage comparison compares outages caused by specific causes for more than one of the utility providers.

14. A system comprising:
    a processor; and
    a computer-readable storage medium comprising instructions that upon execution by the processor cause the system to perform operations, the operations comprising:
    receiving raw outage data from utility providers via a communication network, each of the utility providers providing utility service to respective utility recipients, the raw outage data corresponding to multiple outages of each of the utility providers, wherein during each of the outages, provision of the utility by a respective one of the utility providers to one or more of the respective utility recipients is unavailable for a respective duration of time before being restored;
    determining benchmarking data for each of the utility providers based on the corresponding raw outage data;
    providing benchmarking data to a utility provider, the benchmarking data comprising reliability measure benchmarking that identifies an average outage duration for each of the utility providers, an outage frequency for each of the utility providers, and an average period for restoration for each of the utility providers; and
    providing analytics data to the utility provider, the analytics data determined based on the raw outage data received from the utility provider, the analytics data comprising a trend analysis identifying reliability performance of the utility provider during a time period or an economic analysis identifying outage costs or potential savings to the utility provider based on improving reliability.

15. The method of claim 14, wherein the benchmarking data is filtered to include only benchmarking of the utility providers that are within one or more utility size ranges, geographic regions, states, countries, or continents.

16. A method comprising:
at a computing device comprising a processor:
receiving raw outage data from utility providers via a communication network, each of the utility providers providing utility service to respective utility recipients, the raw outage data corresponding to multiple outages of each of the utility providers, wherein during each of the outages, provision of the utility by a respective one of the utility providers to one or more of the respective utility recipients is unavailable for a respective duration of time before being restored, the utility providers comprising a first utility provider and other utility providers different than the first utility provider;
determining benchmarking data for each of the utility providers based on the corresponding raw outage data; and
providing a report comprising the benchmarking data to the utility provider, the report:
providing the benchmarking data of the utility provider with an indication identifying that the utility provider is the source of the benchmarking data of the utility provider;
providing the benchmarking data of other utility providers without an indication identifying that the other utility providers are the sources of the benchmarking data of other utility providers; and
providing analytics data to the first utility provider, the analytics data comprising:
a trend analysis identifying reliability performance during a time period;
an economic analysis identifying outage costs and potential savings based on improving reliability;
a failure pattern analysis;
a forecast analysis; or
a target metric analysis.

* * * * *

UNITED STATES PATENT AND TRADEMARK OFFICE
CERTIFICATE OF CORRECTION

| | | |
|---|---|---|
| PATENT NO. | : 10,592,564 B2 | Page 1 of 1 |
| APPLICATION NO. | : 15/400633 | |
| DATED | : March 17, 2020 | |
| INVENTOR(S) | : Alvin M. Razon, Eduardo Ilao and John Ilao | |

It is certified that error appears in the above-identified patent and that said Letters Patent is hereby corrected as shown below:

In the Specification

Column 20, Line 20 reads:
"FIG. 34 shows exemplary screen view 3400 of the Goal..."

It should read:
--FIG. 34 shows an exemplary screen view of a goal setting main menu.--

Column 20, Line 44 reads:
"FIG. 39, FIG. 40, FIG. 41 and FIG. 42 show exemplary"

It should read:
--FIG. 39, FIG. 40, FIG. 40A, FIG. 41 and FIG. 42 show exemplary--

Signed and Sealed this
Fifth Day of May, 2020

Andrei Iancu
*Director of the United States Patent and Trademark Office*